(12) United States Patent
Showalter

(10) Patent No.: US 10,259,699 B2
(45) Date of Patent: Apr. 16, 2019

(54) APPARATUS, SYSTEMS AND METHODS FOR DISPENSING DRINKS, FOOD, AND OTHER LIQUIDS

(71) Applicant: Edward Showalter, Taft, CA (US)

(72) Inventor: Edward Showalter, Taft, CA (US)

(*) Notice: Subject to any disclaimer, the term of this patent is extended or adjusted under 35 U.S.C. 154(b) by 0 days.

(21) Appl. No.: 15/975,700

(22) Filed: May 9, 2018

(65) Prior Publication Data

US 2018/0257920 A1    Sep. 13, 2018

Related U.S. Application Data

(60) Division of application No. 15/607,395, filed on May 26, 2017, now Pat. No. 9,994,437, which is a
(Continued)

(51) Int. Cl.
*B67D 1/08* (2006.01)
*B67D 1/04* (2006.01)
(Continued)

(52) U.S. Cl.
CPC .......... *B67D 1/0804* (2013.01); *A47J 31/407* (2013.01); *A47J 31/46* (2013.01); *B01F 3/04794* (2013.01);
(Continued)

(58) Field of Classification Search
CPC ........ B65D 35/14; B65D 35/20; B65D 35/24; B65D 35/242; B65D 35/28; B65D 35/285; B65D 35/44; B67D 1/00; B67D 1/0418; B67D 1/0804; B67D 1/10; B67D 1/1858; B67D 1/1252; B67D 1/0462; B67D 2001/0811; B67D 2001/0827; B67D 2001/0828; B67D 1/0042; B67D 1/0406; B67D 1/0871; B67D 1/0001; B67D 1/0004; B67D 1/0005; B67D 1/0021; B67D 1/0425; B67D 1/0431; B67D 1/0858; B67D 1/0864; B67D 1/0043; B67D 1/0829; B67D 2001/0821; B67D 1/0841; B67D 2001/0098; B67D 2001/0097; B67D 1/125; B67D 1/0809; B67D 1/0888; B67D 1/0078; B67D 1/0057; B01F 3/04794;
(Continued)

(56) References Cited

U.S. PATENT DOCUMENTS 2,894,270 A    7/1959    Manthos
2,944,616 A    7/1960    Bernard
(Continued)

FOREIGN PATENT DOCUMENTS

CN    201771434    3/2011
JP    3080422    9/2001

*Primary Examiner* — Joseph W Drodge
(74) *Attorney, Agent, or Firm* — Cionca IP Law P.C.; Marin Cionca

(57) ABSTRACT

An adapter for an airtight connection to a container and for airtight dispensing of the container's contents, the adapter having: a gate valve, a tube extending from the gate valve to a female coupling, the female coupling being configured for insertion in a mouth of the container, the female coupling having a dispensing valve for opening when dispensing the container's contents and closing when dispensing is finished as needed, such that air is prevented from entering the container, and an airtight connector for connecting the adapter to the container.

4 Claims, 54 Drawing Sheets

Related U.S. Application Data continuation-in-part of application No. 14/586,782, filed on Dec. 30, 2014, and a continuation-in-part of application No. 14/586,741, filed on Dec. 30, 2014, now Pat. No. 10,040,042.

(51) Int. Cl.

| | | |
|---|---|---|
| *B01F 7/20* | (2006.01) | |
| *B01F 15/00* | (2006.01) | |
| *A47J 31/40* | (2006.01) | |
| *A47J 31/46* | (2006.01) | |
| *B67D 1/10* | (2006.01) | |
| *B67D 1/12* | (2006.01) | |
| *B67D 1/00* | (2006.01) | |
| *B01F 7/00* | (2006.01) | |
| *B01F 15/02* | (2006.01) | |
| *B01F 3/04* | (2006.01) | |

(52) U.S. Cl.
CPC .............. *B01F 7/0025* (2013.01); *B01F 7/20* (2013.01); *B01F 15/00538* (2013.01); *B01F 15/00837* (2013.01); *B01F 15/0212* (2013.01); *B67D 1/0001* (2013.01); *B67D 1/0004* (2013.01); *B67D 1/0005* (2013.01); *B67D 1/0021* (2013.01); *B67D 1/0043* (2013.01); *B67D 1/0418* (2013.01); *B67D 1/0425* (2013.01); *B67D 1/0431* (2013.01); *B67D 1/0462* (2013.01); *B67D 1/0858* (2013.01); *B67D 1/0864* (2013.01); *B67D 1/0871* (2013.01); *B01F 2215/007* (2013.01); *B01F 2215/0022* (2013.01); *B01F 2215/0068* (2013.01); *B67D 1/0057* (2013.01); *B67D 1/0078* (2013.01); *B67D 1/0809* (2013.01); *B67D 1/0829* (2013.01); *B67D 1/0841* (2013.01); *B67D 1/0888* (2013.01); *B67D 1/10* (2013.01); *B67D 1/125* (2013.01); *B67D 1/1252* (2013.01); *B67D 2001/0097* (2013.01); *B67D 2001/0098* (2013.01); *B67D 2001/0811* (2013.01); *B67D 2001/0821* (2013.01); *B67D 2001/0827* (2013.01); *B67D 2001/0828* (2013.01)

(58) Field of Classification Search
CPC .......... B01F 7/0025; B01F 7/20; B01F 15/00; B01F 15/0212; B01F 15/00538; B01F 2215/0022; B01F 2215/007; B01F 2215/0068; A47J 31/4403; A47J 31/4492; A47J 31/407; A47J 31/46; F16L 21/00; F16L 21/08; B65B 69/00
USPC ...... 220/560.03; 222/95, 96, 153.01, 153.05, 222/226, 236, 239, 240, 241, 251, 335, 222/394, 396, 397, 408.5, 511, 512, 516; 366/101, 102, 279, 292, 293, 314, 325.1, 366/325.94
See application file for complete search history.

(56) References Cited

U.S. PATENT DOCUMENTS

| | | | | |
|---|---|---|---|---|
| 3,127,061 | A | * | 3/1964 | Patch ................. A23G 9/281 222/146.1 |
| 3,141,573 | A | * | 7/1964 | Patch ................. A23G 9/281 222/129.1 |
| 3,441,952 | A | | 4/1969 | Strader |
| 3,530,800 | A | | 9/1970 | Watkins |
| 3,752,362 | A | | 8/1973 | Risener |
| 3,758,219 | A | * | 9/1973 | Stasio ................. B42F 13/408 402/24 |
| 3,874,314 | A | | 4/1975 | Sanders |
| 3,880,182 | A | * | 4/1975 | Johnston .............. B67C 3/30 137/212 |
| 3,913,608 | A | * | 10/1975 | Johnston .............. B67D 1/0831 137/322 |
| 3,964,636 | A | | 6/1976 | Rehrig |
| 4,440,319 | A | | 4/1984 | Nitchman |
| 4,722,001 | A | | 1/1988 | Rohrich |
| 5,152,244 | A | | 10/1992 | Jarmillo |
| 5,957,328 | A | * | 9/1999 | Osgar .................. B67D 7/344 222/1 |
| D458,320 | S | | 6/2002 | Domingues |
| 8,336,734 | B2 | * | 12/2012 | Ware .................. B67D 7/0261 137/210 |
| 8,662,352 | B1 | * | 3/2014 | des Jardins .......... B05B 15/25 222/167 |
| 9,994,437 | B2 | * | 6/2018 | Showalter ......... B01F 15/00837 |
| 10,040,042 | B2 | * | 8/2018 | Showalter ......... B01F 15/00538 |
| 2008/0050211 | A1 | | 2/2008 | Showalter |
| 2008/0229845 | A1 | * | 9/2008 | Minard ................ B67D 1/0855 73/861.08 |
| 2008/0276641 | A1 | * | 11/2008 | Wolski ................ B67D 1/0003 62/390 |
| 2010/0252583 | A1 | | 10/2010 | Maas |
| 2011/0024423 | A1 | * | 2/2011 | Erspamer ........... B65D 41/3428 220/266 |
| 2012/0217265 | A1 | | 8/2012 | Edwards |
| 2016/0183715 | A1 | | 6/2016 | Showalter |
| 2016/0185586 | A1 | | 6/2016 | Showalter |

* cited by examiner

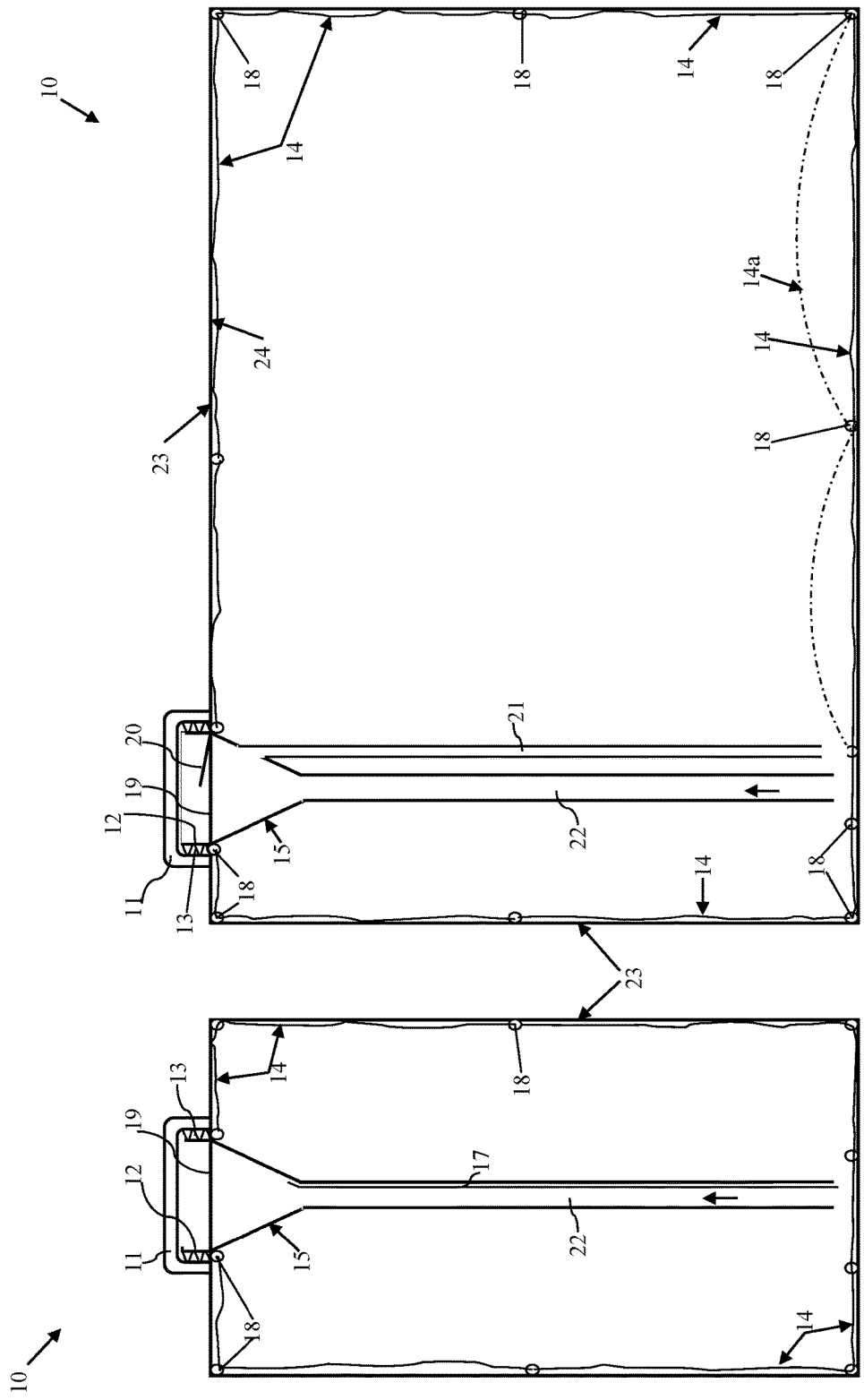

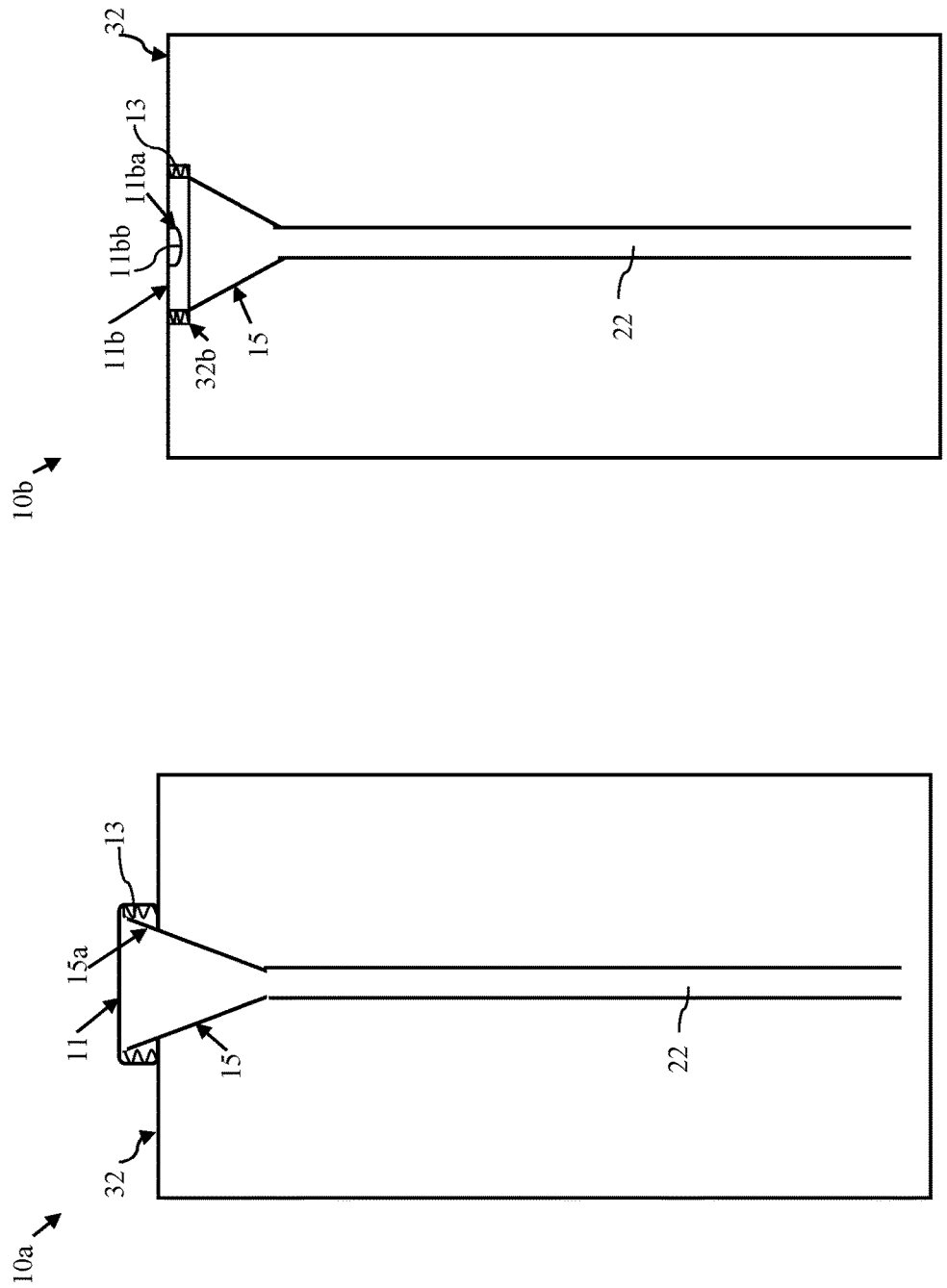

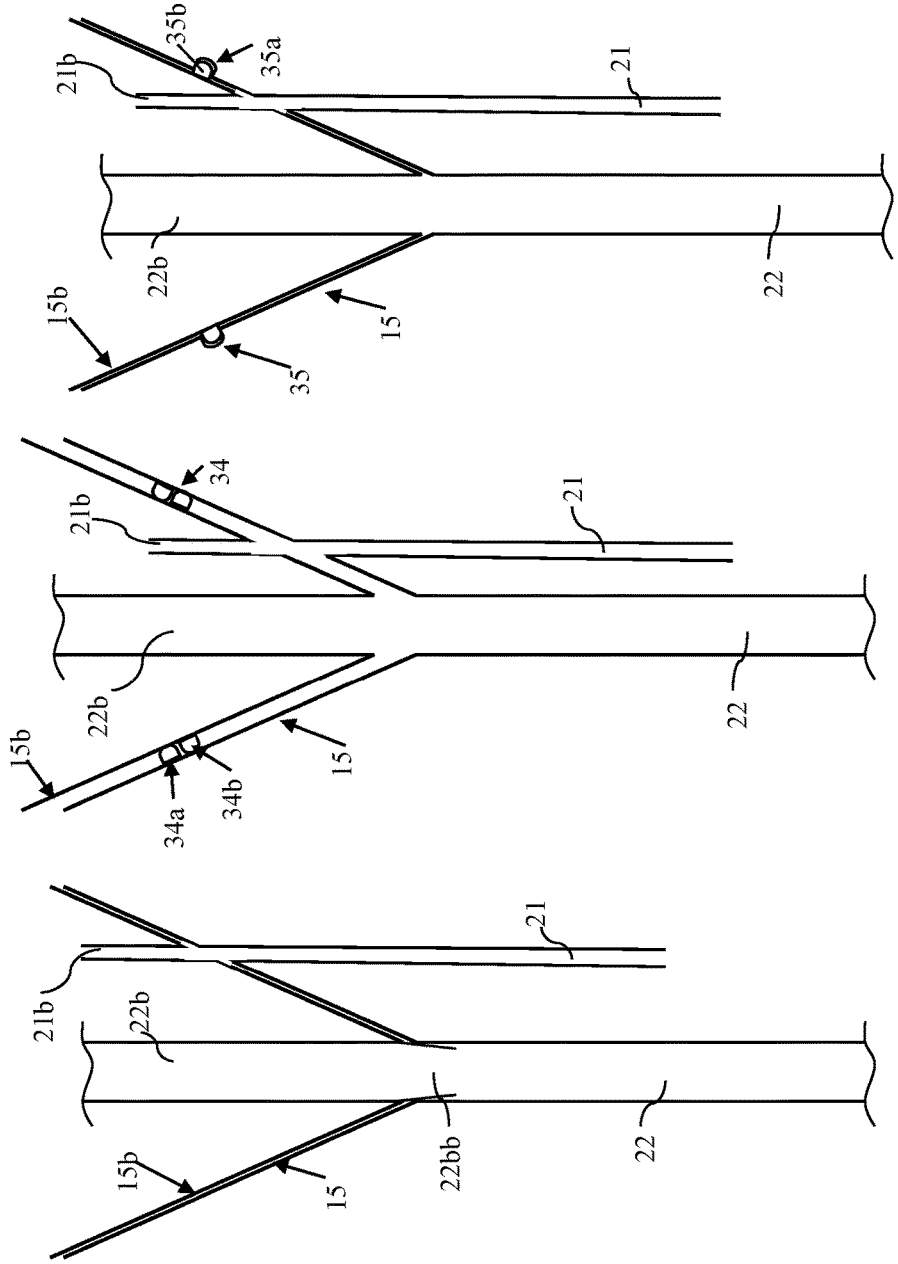

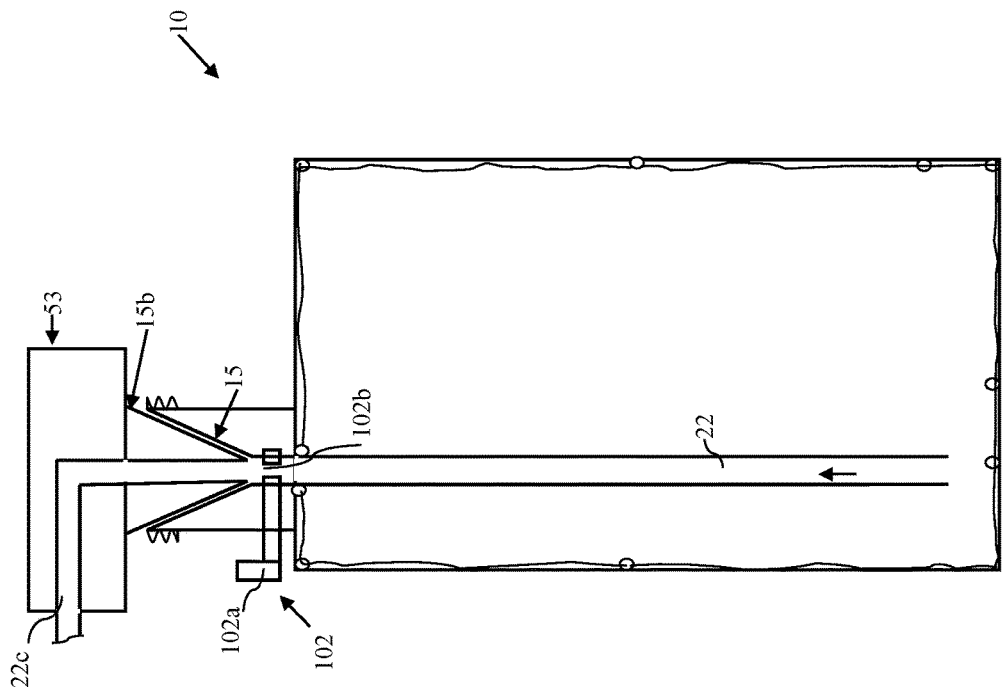
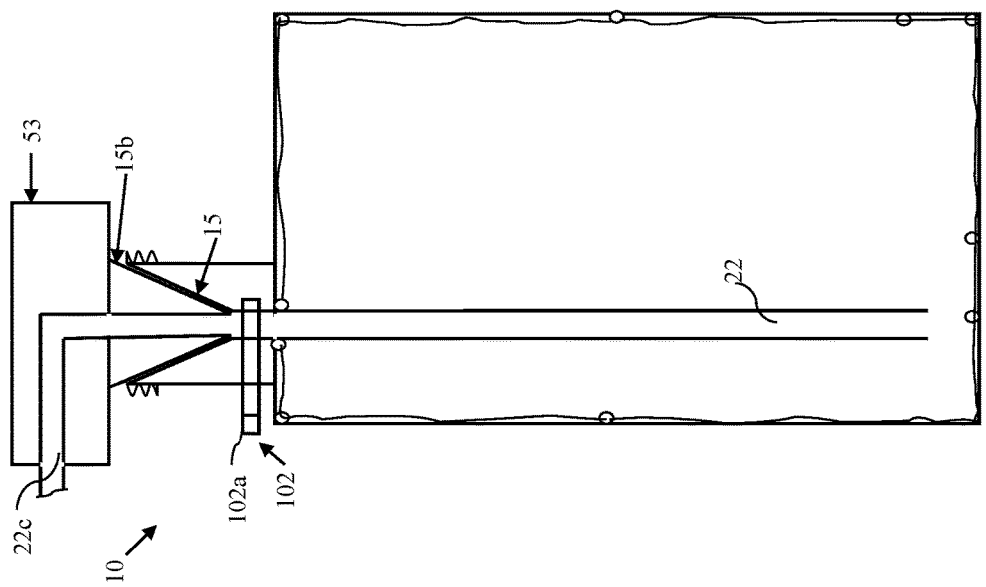

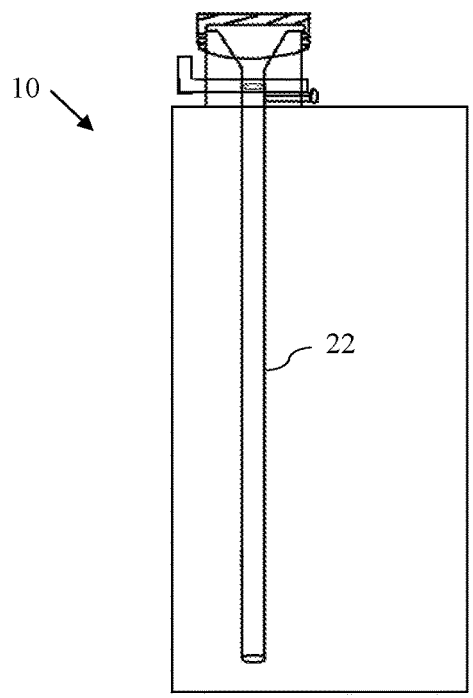
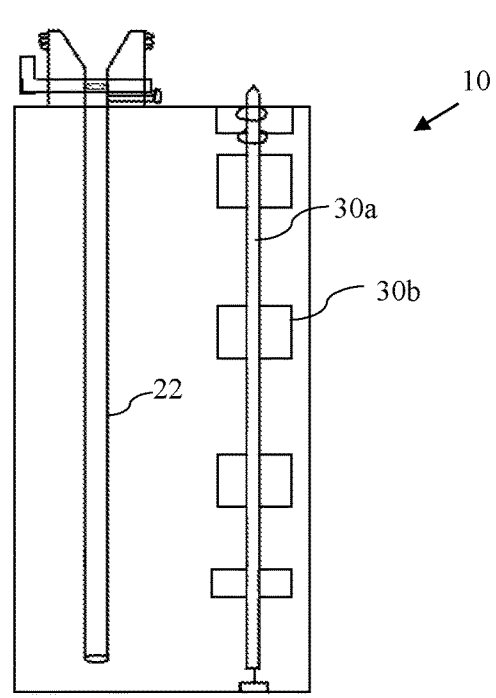
FIG. 35A  FIG. 35B
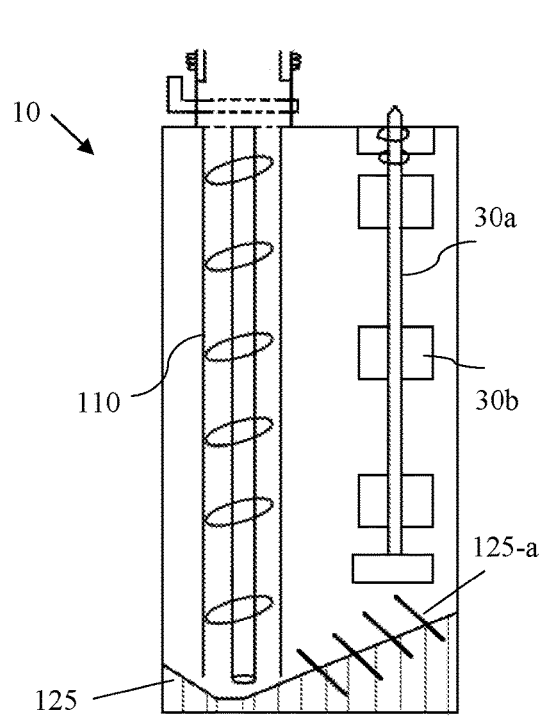
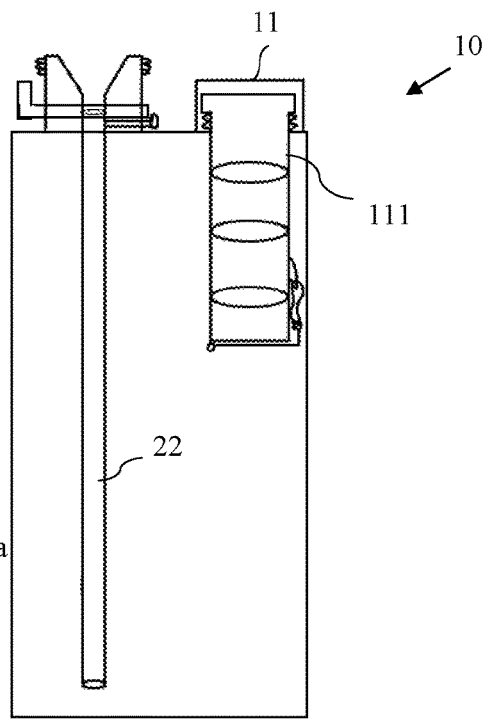
FIG. 35C  FIG. 35D

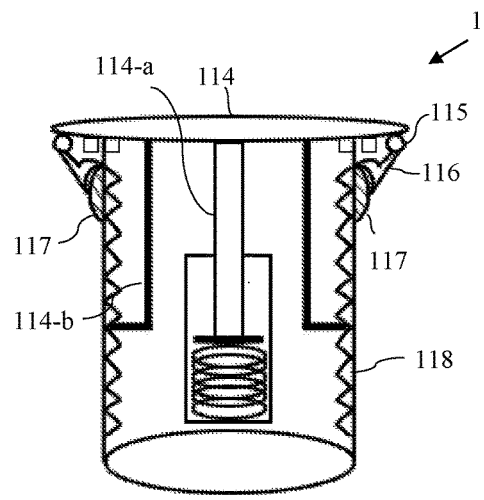
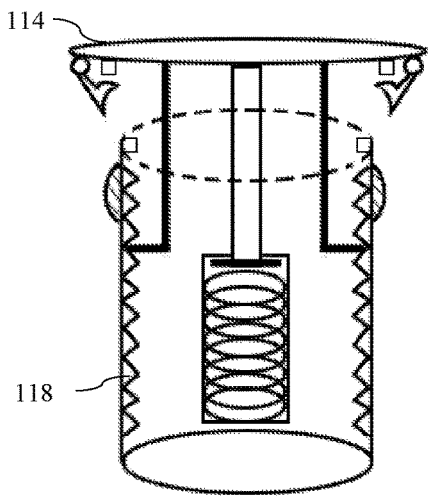
FIG. 37A
FIG. 37B
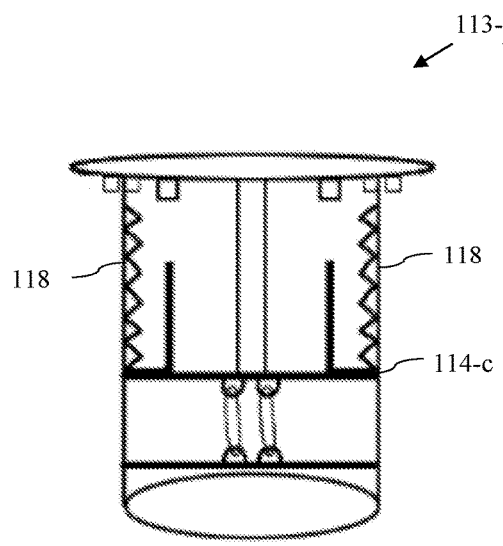
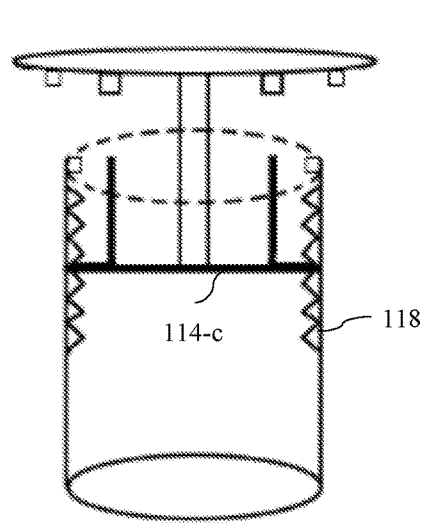
FIG. 37C
FIG. 37D

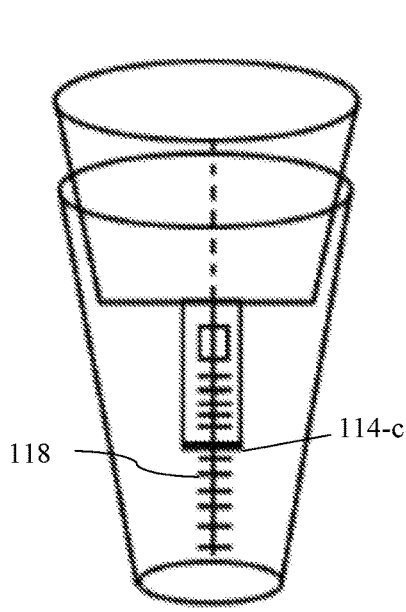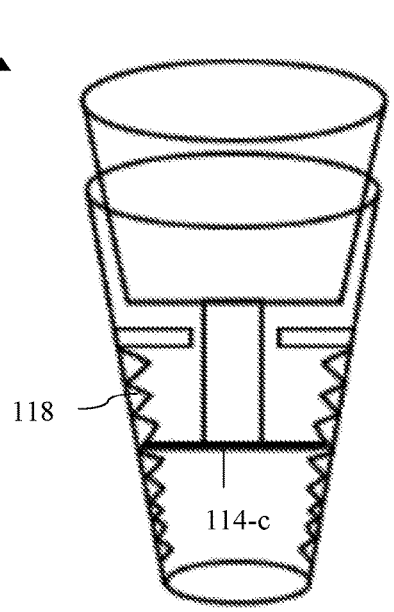
FIG. 37E  FIG. 37F
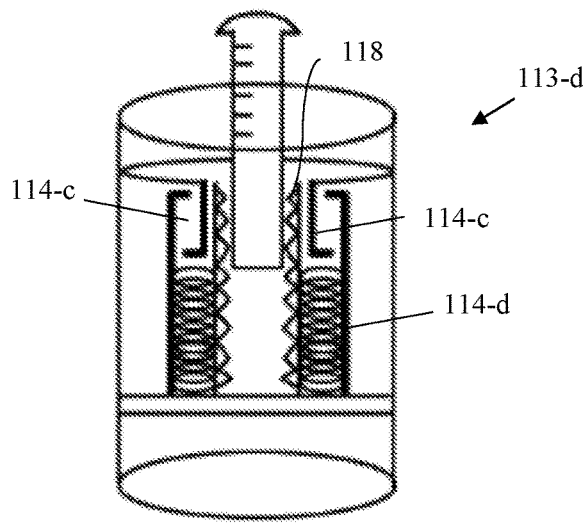
FIG. 37G

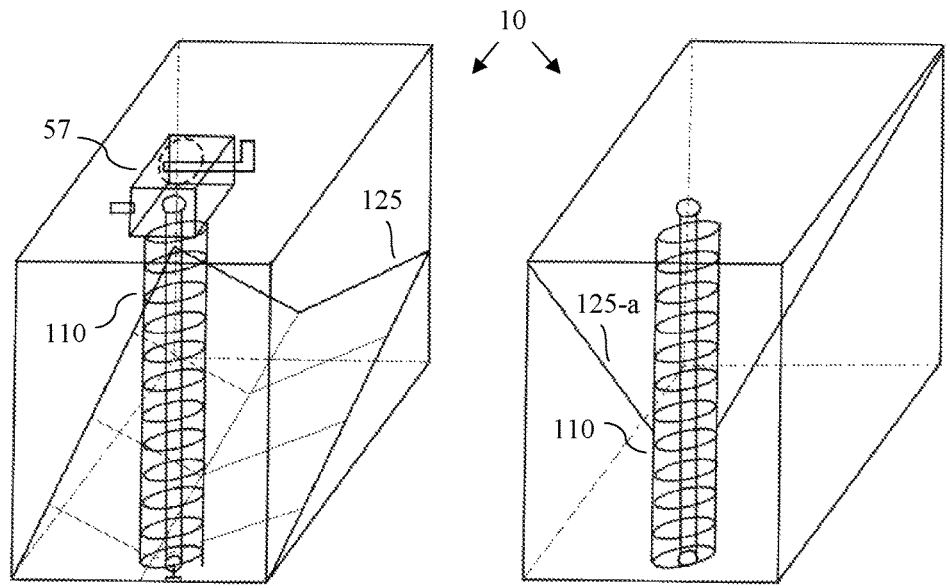
FIG. 39A    FIG. 39B
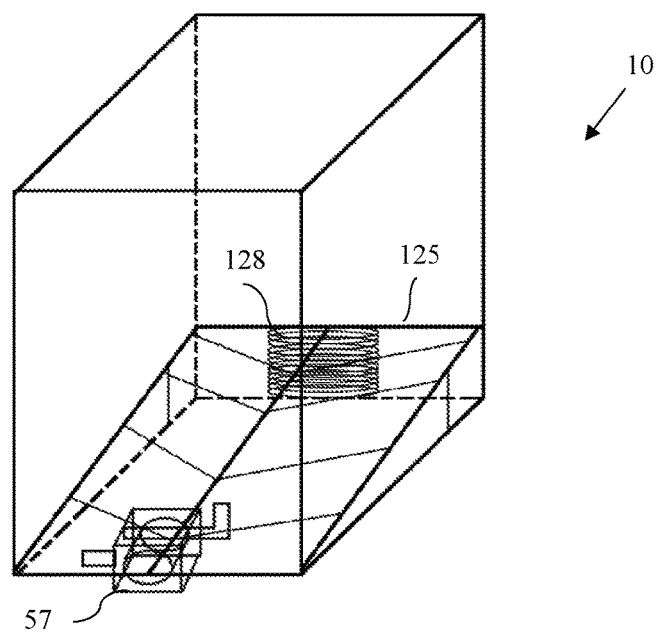
FIG. 39C

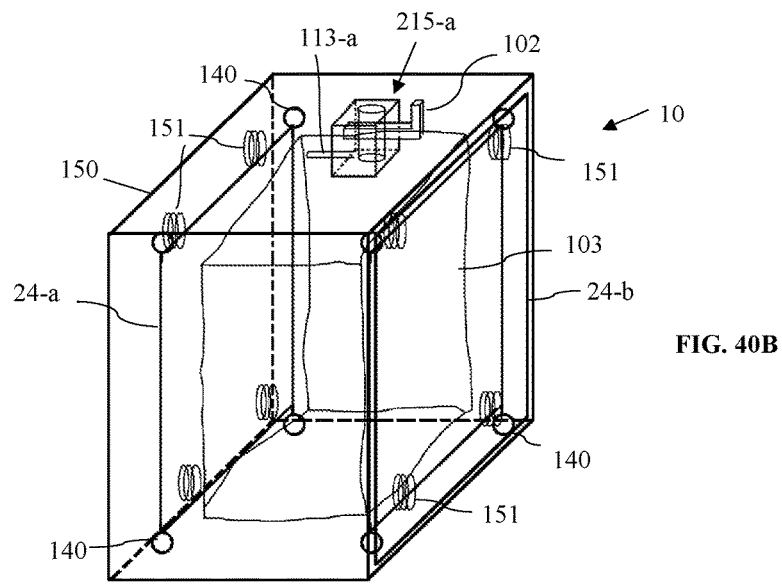
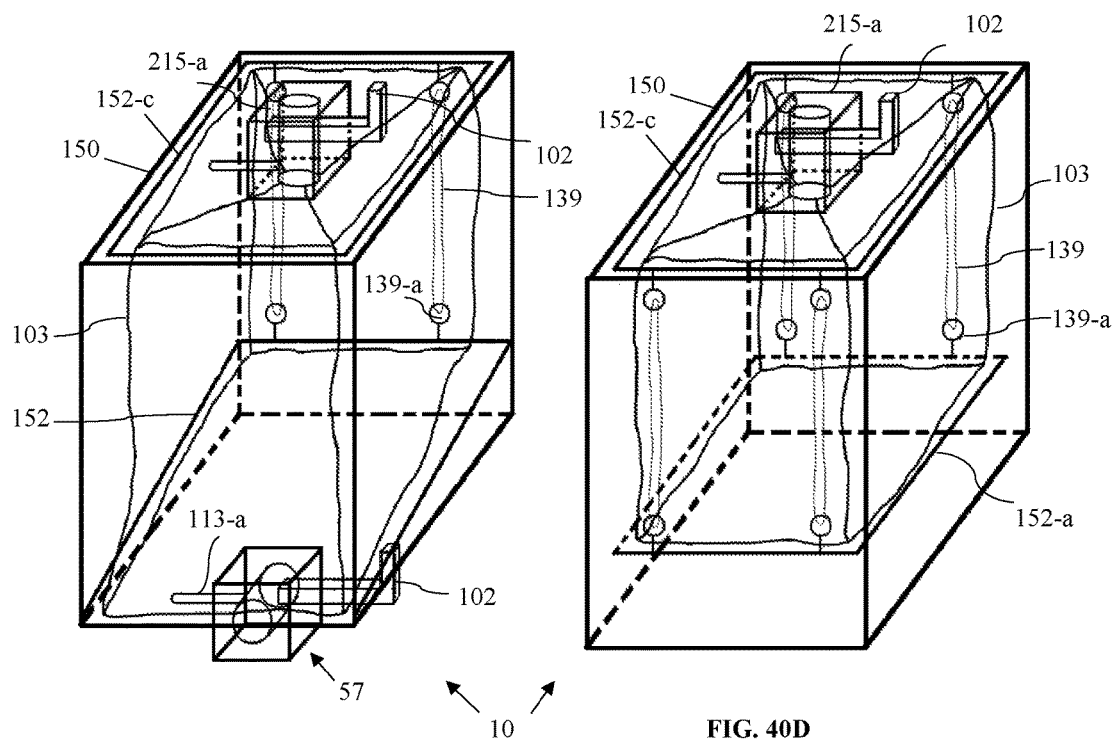
FIG. 40A
FIG. 40B
FIG. 40C
FIG. 40D

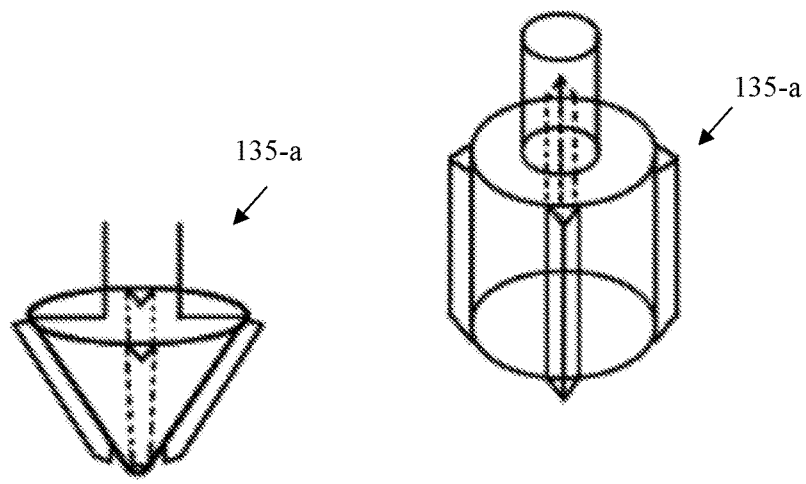
FIG. 42B
FIG. 42C
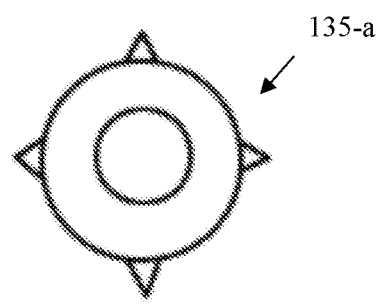
FIG. 42D

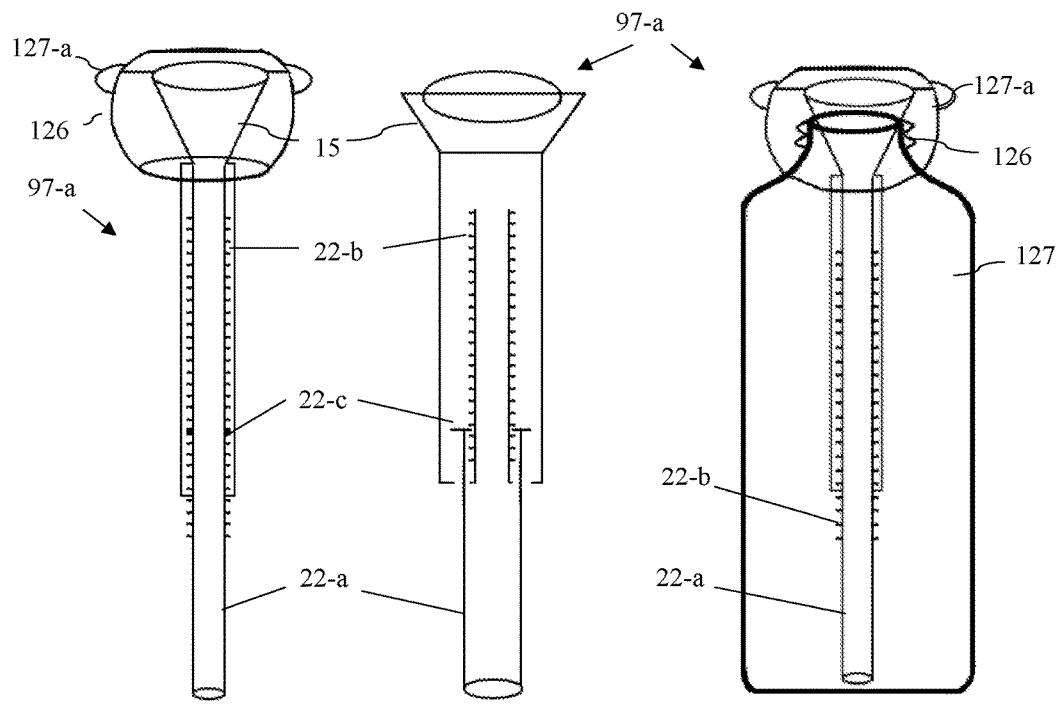
FIG. 47A  FIG. 47B  FIG. 47C
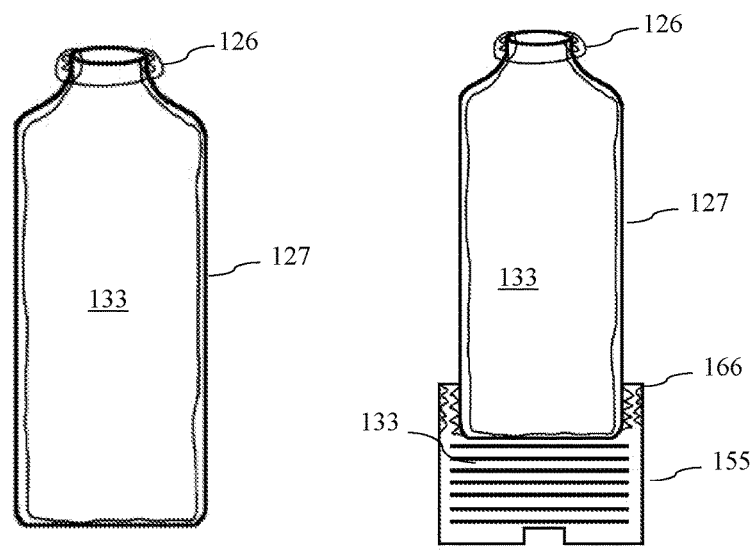
FIG. 47D  FIG. 47E

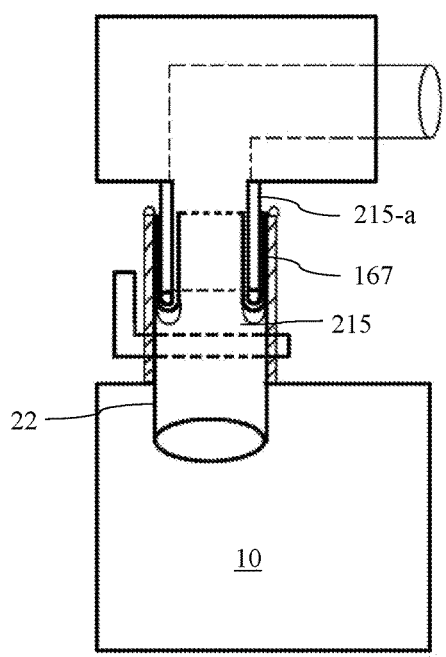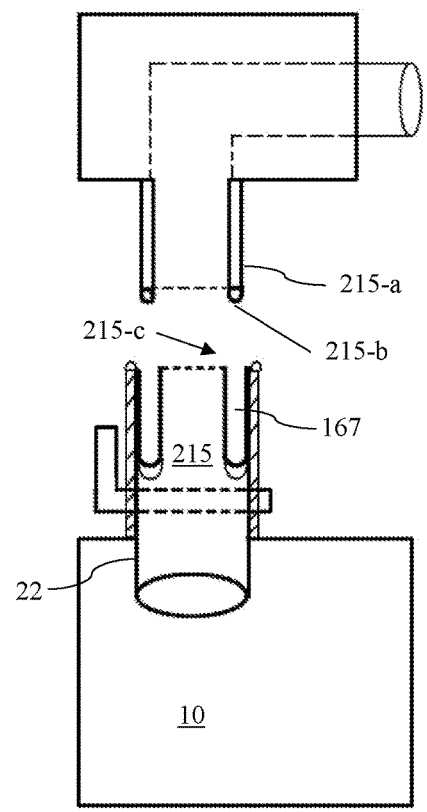
FIG. 49A
FIG. 49B

APPARATUS, SYSTEMS AND METHODS FOR DISPENSING DRINKS, FOOD, AND OTHER LIQUIDS

CROSS-REFERENCE TO RELATED APPLICATIONS

This application is a divisional of and claims the benefit of U.S. Non-Provisional application Ser. No. 15/607,395, filed on May 26, 2017, which is a continuation-in-part of U.S. Non-Provisional application Ser. No. 14/586,741, filed on Dec. 30, 2014, and a continuation-in-part of U.S. Non-Provisional application Ser. No. 14/586,782, filed on Dec. 30, 2014, which are hereby incorporated by reference, to the extent that they are not conflicting with the present application.

BACKGROUND OF THE INVENTION

1. Field of the Invention

The invention relates generally to apparatuses, systems and methods for making and dispensing liquids and more particularly to apparatuses, systems and methods for making and dispensing drinks and soft serve foods (e.g., soup, yogurt, etc.).

2. Description of the Related Art

There are several apparatuses, systems and methods for making and dispensing drinks available on the market today. However, they have several limitations. For example, some must use ice to chill the beverages as they are not equipped with refrigeration systems to cool the beverages and/or keep them at a set or selected temperature. Others cannot brew hot beverages. Others can't mix beverages. Likewise, other beverage dispensers can't dispense both hot and chilled beverage from same spout. To accommodate all beverages, users might have to purchase four, five, six, seven, eight or more dispensers. That can be very expensive and also very inconvenient, to, for example, store all of those dispensers.

Some require steel kegs that need to be returned for washing and refilling. Large amounts of dollars are spent with water waste, carbon footprint and transportation. Because of high transportation costs, it is typically cost prohibitive for a beer brewery to ship draft beer from one location to around the world. The same can be true for wineries using wine steel and/or plastic kegs.

The global beverage industry can have a negative environmental impact. For example, many consumers do not separate materials before putting them into a recycling bin, rendering it costly to separate at the recycler. The result is that these materials may possibly be unrecyclable.

Thus, there is a need for new and improved apparatuses, systems and methods for making and dispensing drinks that solve the problems described above, by giving the user the versatility, convenience and the efficiency the user needs, while enabling the user to be environmentally responsible, by providing a one-size-fits-all, all-in-one beverage dispensing system that is eco-friendly. That way, the user only needs one apparatus to dispense any beverage.

There is also a need for easily recyclable beverage and food packaging, allowing the user to dispose of the package in single-stream recycling without the need to separate materials.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In one exemplary embodiment, a V-friction coupling is provided that establishes airtight seal that allows beverage pumps to pump the beverage or food and that also prevents air contamination or spoilage of beverage in the provided beverage container or keg. The air tight seal also stops beverage spoilage by oxidation or beverage to go flat in taste. Further, it may prolong the life of beverage in some cases, like in the case of wine, beer or soda. Another advantage is that the same beverage pour spout of the provided dispensers may be operated with hot or chilled, carbonated or non-carbonated beverage.

In another exemplary embodiment, beverage flavor pods are provided, which could be coffee, tea, coco, soda, flavored powder for fruit flavored beverage, and so on, so that the user could use for example coffee flavored pod in a spout pour housing to mix with soda for example. Further, the beverage flavor pods may have a bar code that can be scanned by the dispenser to retrieve for example pour instructions. The dispenser may have spikes (e.g., four spikes) to pierce the pod, allowing water/beverage to absorb flavor from the pod, and pour resulting beverage in a user's glass.

In another exemplary embodiment, the beverage pour housing of the dispenser can be used with or without the flavored pod. For example, the user could place a wine keg in a bay chamber of the dispenser, set the temperature for that chamber at preferred level and dispense wine. If user decides to remove the wine box from that chamber and install a box of spring water, the user can make and dispense hot beverage or cold beverages.

In another exemplary embodiment, the beverage heater and the pump are part of top lift lid of dispenser, such that the beverage pump draws the beverage from the keg/beverage container and pushes it through the heater. User however can select hot or chilled beverage via dispenser's controls or via smart phone app controls. If chilled beverage is selected, the beverage heater is not turned on. If user selects hot beverage, heater turns on making the beverage hot.

In another exemplary embodiment, a $CO_2$ control valve selector is provided allowing for carbonation to flow into beverage keg, or stopping flow of $CO_2$ gas, allowing for the dispensing of a non-carbonated beverage, such as milk or wine.

In another exemplary embodiment, each chamber of the dispenser is independently controlled, so that each chamber can be set to maintain different temperatures.

In another exemplary embodiment, the beverage container is a disposable, one-way container, made of biodegradable materials. Among other advantages, this provides the advantage of lower shipping cost due to less weight of packaging.

The above embodiments and advantages, as well as other embodiments and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which:

FIG. 1 illustrates a front sectional view of a drink container, according to an aspect.

FIG. 2 illustrates a side sectional view of the drink container from FIG. 1, according to an aspect.

FIGS. 8-9 illustrate front sectional views of alternative embodiments of a drink container.

FIGS. 16-19 illustrate sectional views of male-female couplings, according to several embodiments.

FIG. 31 illustrates a side sectional view of the drink container from FIG. 30 placed in a dispenser, according to an aspect.

FIG. 32 illustrates a side sectional view of the drink container from FIG. 31 in a different state, according to an aspect.

FIGS. 35A-35D illustrate side sectional views of four examples of a drink container, having parts such as a water filter, mixing paddles, sloped floor, and an auger lift, according to an aspect.

FIGS. 37A-37K show sectional top perspective views of examples of a bioplastic pressure relief safety valve, which may be manually adjusted for different PSI, and may be reset if activated to release pressure inside of the keg, according to an aspect.

FIGS. 39A-39C illustrate various examples of a keg that may self-propel liquids or soft-serve foods with or without an external energy source, according to an aspect.

FIG. 40A illustrates an example of layered board that may be used for the construction of a keg.

FIG. 40B illustrates an example of a keg that may self-propel beverages or foods using side wall pressure plates, according to an aspect.

FIG. 40C illustrates an example of a keg that may self-propel beverages or foods using a gravity flow sloping floor plate to lift one end of the beverage bag at the bottom of the keg, according to an aspect.

FIG. 40D illustrates a self-propelling keg having a lifting floor plate, according to an aspect.

FIGS. 42B-42D illustrate a side top perspective view, a top perspective view, and a top plan view, respectively, of an example of a motor coupling having a ridged cylinder design, according to an aspect.

FIGS. 47A-47C illustrate a side view of a female V-friction coupling adapter, a detailed view, and a side view, respectively, of the adapter inside of a bottle, according to an aspect.

FIG. 47D illustrates a side view of a bottle with a bio-plastic bladder bag liner having an expansion membrane top, such that the opening of the bio-plastic bag liner may be able to stretch over the top of any size container, according to an aspect.

FIG. 47E illustrates the side view of the bottle with a bio-plastic bladder bag liner having an expansion membrane top of FIG. 47D, also having a magazine for holding extra bladder bag liners, according to an aspect.

FIGS. 49A-49B illustrate side views of a cylindrical friction coupling in a coupled state and uncoupled state, respectively, that may be used with a keg, according to an aspect.

DETAILED DESCRIPTION

Figures 3, 4, 5:
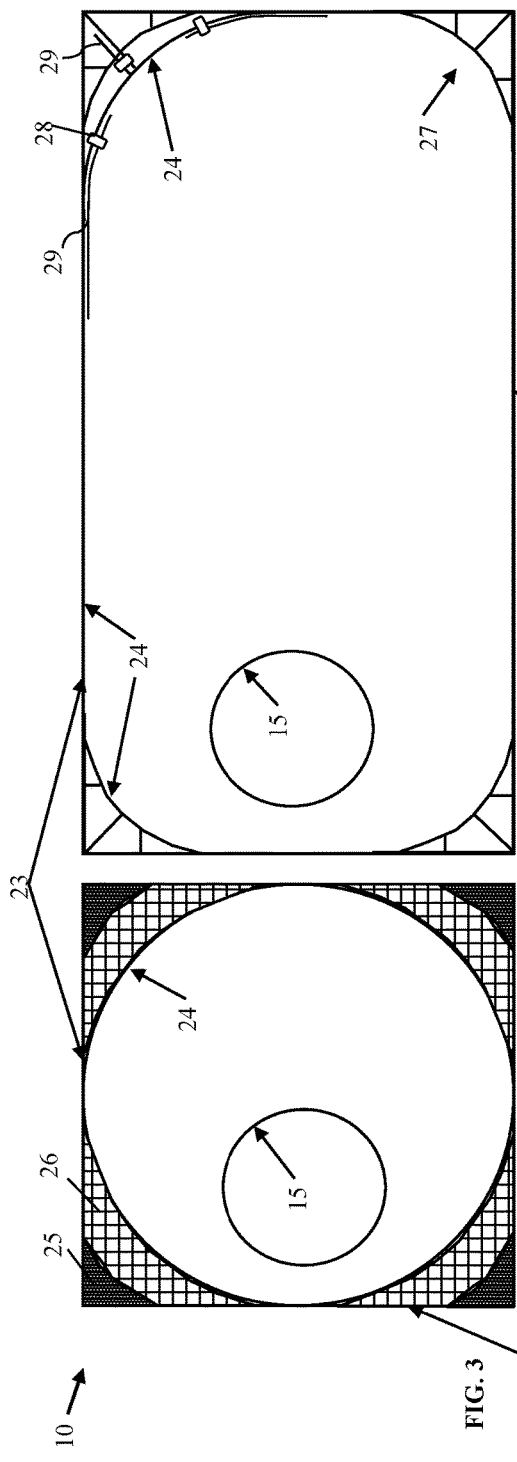
FIGS. 3-5 illustrate top sectional views of the drink container from FIG. 1, depicting certain aspects, according to several embodiments.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

For the following description, it can be assumed that most correspondingly labeled elements across the figures possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

FIG. 1 illustrates a front sectional view of a drink container, according to an aspect. FIG. 2 illustrates a side sectional view of the drink container from FIG. 1, according to an aspect. It should be understood that while the container 10 will be described herein as a drink container, its uses may be expanded to other liquids (e.g., cooking oil, motor oil), pastes or viscous materials (e.g., liquid soap, ketchup), or soft serve foods (e.g., soups, smoothies, ice cream, yogurt, etc.) to take advantage of its unique features, such as the V-coupling. As shown, the drink container 10 may be a rectangular box or keg having an exterior surface 23 and an interior surface 24. The drink container 10 may also be square. The drink container 10 may be made from biodegradable cardboard or recyclable plastic that is strong enough to maintain the container's shape. It should be understood that the container 10 and all other components described herein may be made from biodegradable materials. The drink container 10 may have a spout 12, which, after filling the container with the drink, is preferably air tight sealed by a foil seal 19 and more preferably also using a petcock valve 102 (see FIG. 29). The valve 102 holds the seal until user installs container 10 into the dispenser, as shown, and as it will be described in more details later when referring to FIGS. 29-32. The foil seal 19 may be removed by a user by pulling on the seal tab 20. On the outside, the spout 12 may have threads 13 corresponding with the threads of a cap 11, such that to allow a user to fasten the cap 11 onto the spout 12 or to remove it when necessary.

The container 10 further includes a V-shaped female coupling 15 made of hard plastic for example, which communicates at its upper end with the spout 12 and at its lower end with a beverage well tube 22. As it will be described in more details later in this disclosure, the V-shape (e.g., funnel shape) female coupling 15 is configured to receive a corresponding V-shape male coupling 15*b* (see FIG. 16 for example) to quickly create a friction air tight seal under the influence of a weight load applied to the V-shape male coupling.

A plastic liner bag 14, preferably biodegradable, is also preferably provided to receive and hold the drink (e.g., wine) stored in container 10. As shown, the plastic liner bag 14 is preferably fasten, using glue for example, to the interior wall 24 of the container 10 at several fastening locations 18, including the corners of the container 10. During the removal (e.g., pumping it out by suction) of the liquid/drink from box 10, the liner bag 14 may have the tendency to move away from the interior wall 24 of container 10, as shown at 14*a*. Thus, without the fastening points 18, the liner bag 14 may clog the well tube 22. The clogging of the well tube 22 is prevented by the fastening points 18, and as such, the drink is able to flow easily through the well tube 22 out of container 10.

As shown, the container 10 may be equipped with a beverage level sensor strip 17, which, as it will be described in more detail later when referring to FIG. 22, may assist a user in knowing the level of beverage remaining in the container 10 during use and/or alert the user to acquire a new/filled container. Furthermore, the container 10 may be also equipped with a container $CO_2$ line 21 for use with carbonated beverages. The operation and functions of these two features of the container 10 will also be described in more details later in this disclosure.

The container 10 may be used as a mini keg ranging in size from, for example, ½ gallons to 2.5 gallons, or 6 or 10 gallons, or it may be used as larger kegs. The container 10 may be for example 4 inch wide, 12 inch long and 8 inch high.

Figure 7:
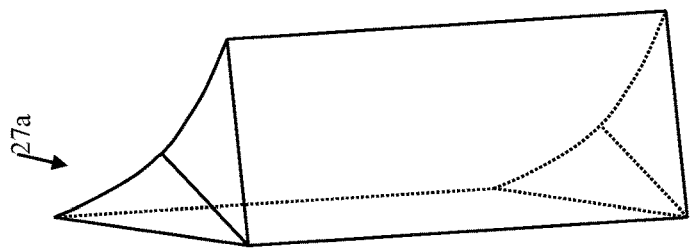
FIG. 7 illustrates a fixed, non-adjustable corner brace for the drink container from FIG. 1, according to an aspect.
Figure 6:
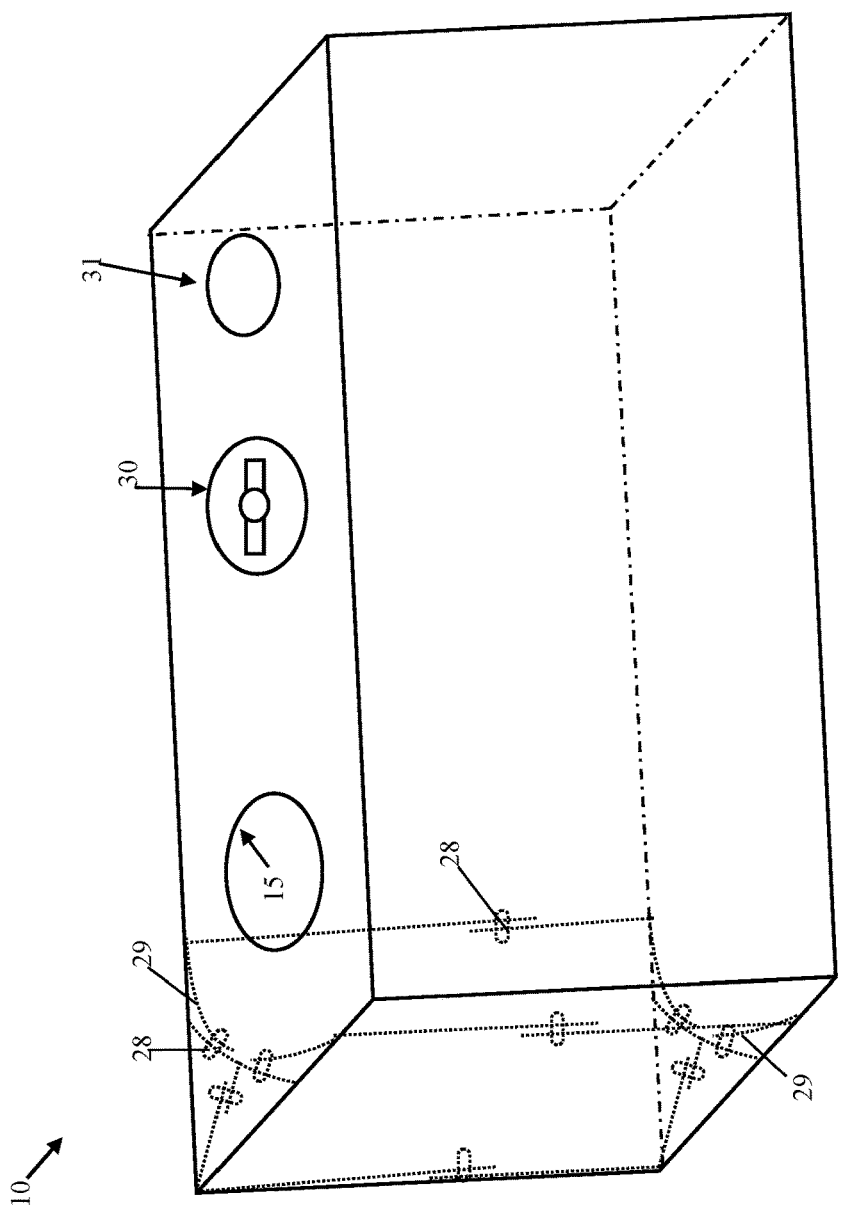
FIG. 6 illustrates a top-side perspective view of the drink container from FIG. 1, depicting certain aspects, according to several embodiments.

FIGS. 3-5 illustrate top sectional views of the drink container from FIG. 1, depicting certain aspects, according to several embodiments. FIG. 6 illustrates a top-side perspective view of the drink container from FIG. 1, depicting certain aspects, according to several embodiments. FIG. 7 illustrates a fixed, non-adjustable corner brace for the drink container from FIG. 1, according to an aspect. The corner brace may also be provided in an adjustable form, and may fit into different sizes of containers. It is known that $CO_2$ (carbon dioxide) and other gases, such as compressed air are typically stored/packaged in cartridges or canister cylinders or the like, so that gas is evenly distributed on the wall of packaging. This is why cylinder shapes of gas containers are typically used, to obtain and maintain equal wall PSI. Right angles in gas containers are typically avoided also because, for example, the gas can be trapped in right angle pockets. Round corners allow the gas to flow easily out of the container.

Thus, when the container 10 is intended to be used for example for carbonated drinks, it may be constructed with fixed or adjustable interior curved corners (see FIGS. 3-7) that are reinforced to hold for example up to 35 PSI. This creates a cylinder effect inside the container/box/keg 10. Thus, the container 10 may be constructed with right angles on the outside, which may be useful for stacking and transportation purposes for example, and round corners on the inside to accommodate the equal distribution of the gas inside. In other words, the inside of the box 10 may be cylinder (see FIG. 3) or oblong (see FIGS. 4-5) shaped, depending on the configuration of the outer skeleton of the container (square, rectangular, etc).

To reinforce the corners of the container 10 and to obtain the round corners desired, plastic 25 and/or corrugated cardboard 26, or a combination thereof, preferably biodegradable, may be used to fill the corners as shown in FIGS. 3-4 and/or to construct fixed or adjustable braces. The fixed or adjustable corner braces may have solid walls made from plastic and/or cardboard, sample structures of which are shown in FIG. 5 at 27 and in FIG. 7 at 27*a*.

A container may be made with all corners having fixed corner braces 27, 27*a*, fastened (e.g., by glue) to them, to obtain inside the cylinder or oblong shape needed to protect the right angle interior corners of the container from gas pressure. Thus, for example in FIG. 3, the exterior surface 23 of the container has a square shape while the interior surface 24 has a cylindrical shape.

Again, the corner braces may also be adjustable to accommodate various container sizes. To accomplish this, as shown for exemplification purposes in FIGS. 5-6, they may be constructed from a plurality of solid walls 29 made from plastic or cardboard that can slide with the aid of the sliding braces 28. The sliding braces 28 also keep the movable walls 29 in place after their sliding in or out. The adjustable corner braces offer the advantage of being capable of being used in different size boxes. Thus, a manufacturer would need only to manufacture a universal, one-size-fits-all adjustable corner brace. It should be observed also that container 10 having a rectangular (or square) shape on the outside and round corners on the inside has the advantage of having more interior volume than a container/box/keg that is round inside and outside (see FIG. 10). Thus, container 10 can carry more beverage than a container/box/keg that is round inside and outside. Further, the manufacturing costs are likely lower for container 10 than a container that is round inside and outside.

It should be noted that, when beverage or CO2, air, or gas is placed inside bladder 14, because of the interior box rounded corner construction, the plastic liner or bladder 14 takes the shape of a balloon which forms a cylinder like beverage packaging similar to a traditional steel keg, plastic soda or beverage bottle, glass bottle, can, etc. The unique rounded and reinforced corners of the container 10 prevent collapse of the container's walls and corners.

At 30 a beverage mixer and at 31 an opening for adding ingredients to the drink inside container are depicted. Both elements will be described in detail later in this disclosure.

FIGS. 8-9 illustrate front sectional views of alternative embodiments of a drink container. The drink container 10*a* has the V-shape female coupling 15 extending out of the container, above the upper surface 32 of the container 10*a*. The thread element 13 for fastening cap 11 is provided as shown outside and around the portion 15*a* of the V-shape female coupling extending out of the container. This configuration may be advantageous for, for example, making it easier for the corresponding V-shape male coupling to slide into the V-shape female coupling 15, without the interference of spout 12 (FIG. 1).

The drink container 10b has a recess 32b, which has the thread element 13 on its vertical surface to enable the receipt and fastening of cap 11b for closing the container 10b. The cap 11b may have a concave portion 11ba divided by a separator 11bb to enable a user to screw/unscrew cap 11b. As shown, V-shape female coupling 15 extends upwards only to the bottom of recess 32b. This configuration may be advantageous for, for example, maximizing the space inside drink dispensers' chambers and for easy stacking of the containers during transportation or storage. This is facilitated by the fact that, as shown, the upper surface of cap 11b is even in this configuration with the upper surface 32 of the container.

It should be understood that the container alternative embodiments depicted in FIGS. 8-9 are shown as examples only. Various other similar alternatives may be adopted without departing from the scope of the invention. What is important is the V-shape (e.g., funnel shape) female coupling 15, which is configured to receive a corresponding V-shape male coupling 15b (see FIG. 16 for example) to quickly create a friction air tight seal under the influence of a weight load applied to the V-shape male coupling.

Figure 10:
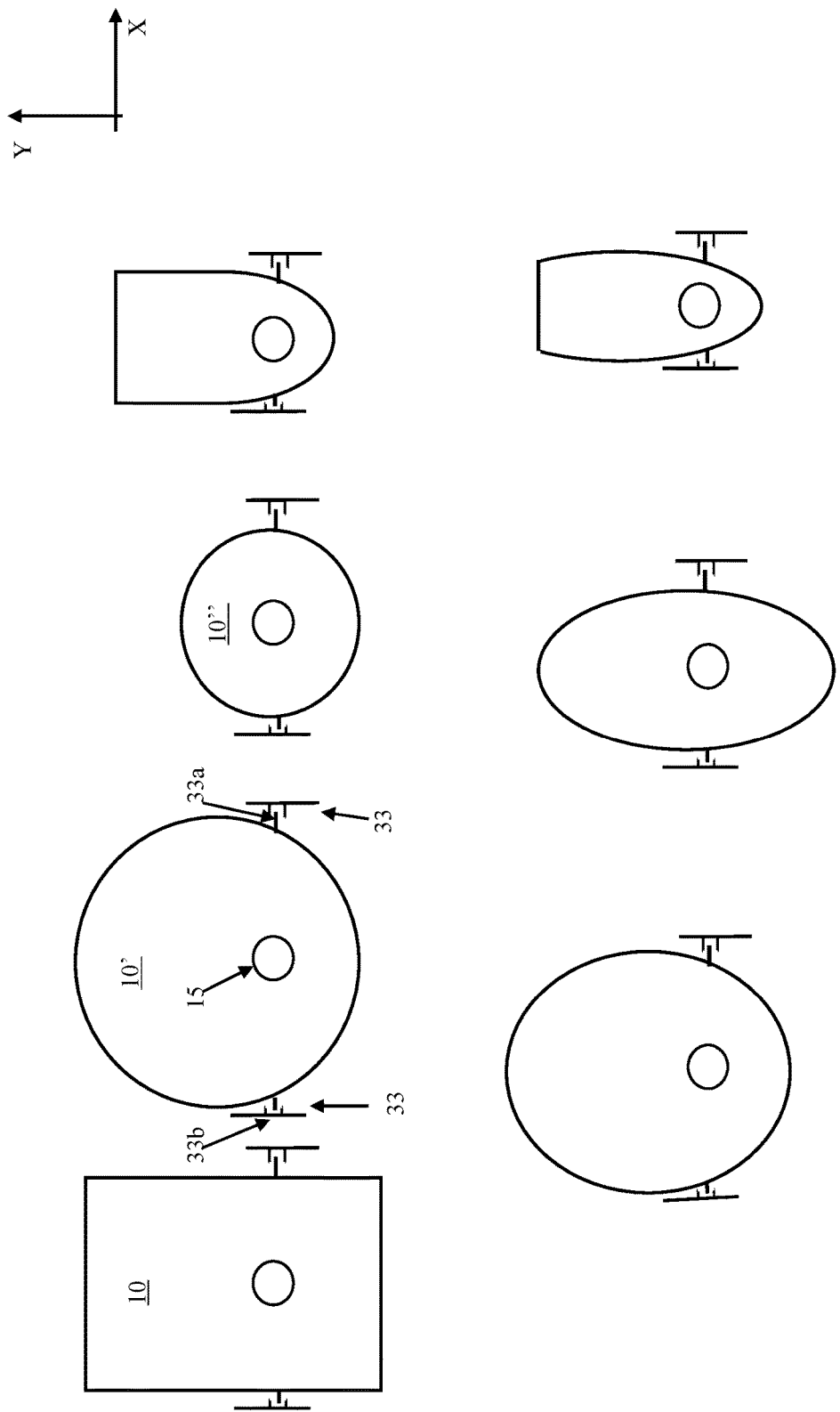
FIG. 10 illustrates top views of alternative embodiments of a drink container.

FIG. 10 illustrates top views of alternative embodiments of a drink container. As illustrated, the drink container may have various sizes and shapes, such as a rectangular (or square) box shape 10, a cylindrical shape 10' and 10" and other shapes as shown in FIG. 10 for exemplification purposes. A rectangular box may be adopted for example for a flat drink, while a container having round corners (e.g., a cylindrical container) may be adopted to carry carbonated drinks, to accommodate the pressurized gas inside as described earlier when referring to FIGS. 3-7. To accommodate for the variation in the drink container's sizes and shapes, while still ensuring proper alignment between the V-shape female coupling 15 of the container and the corresponding V-shape male coupling 15b (see FIG. 16 for example) of a drink dispenser, the container may be equipped with a guiding fin 33a to be received by a guiding slot 33b associated with the interior wall of the dispenser's chamber which receives the container (see 33 in FIG. 13). The guiding mechanism 33 including the guiding fin 33a and the guiding slot 33b ensures alignment of the V-shape couplings in a direction (Y), while the central location widthwise of the V-shape female coupling 15 in the container 10 ensures alignment in another, perpendicular direction (X). The combined effect is to ensure proper alignment between the female and male coupling.

Figure 11:
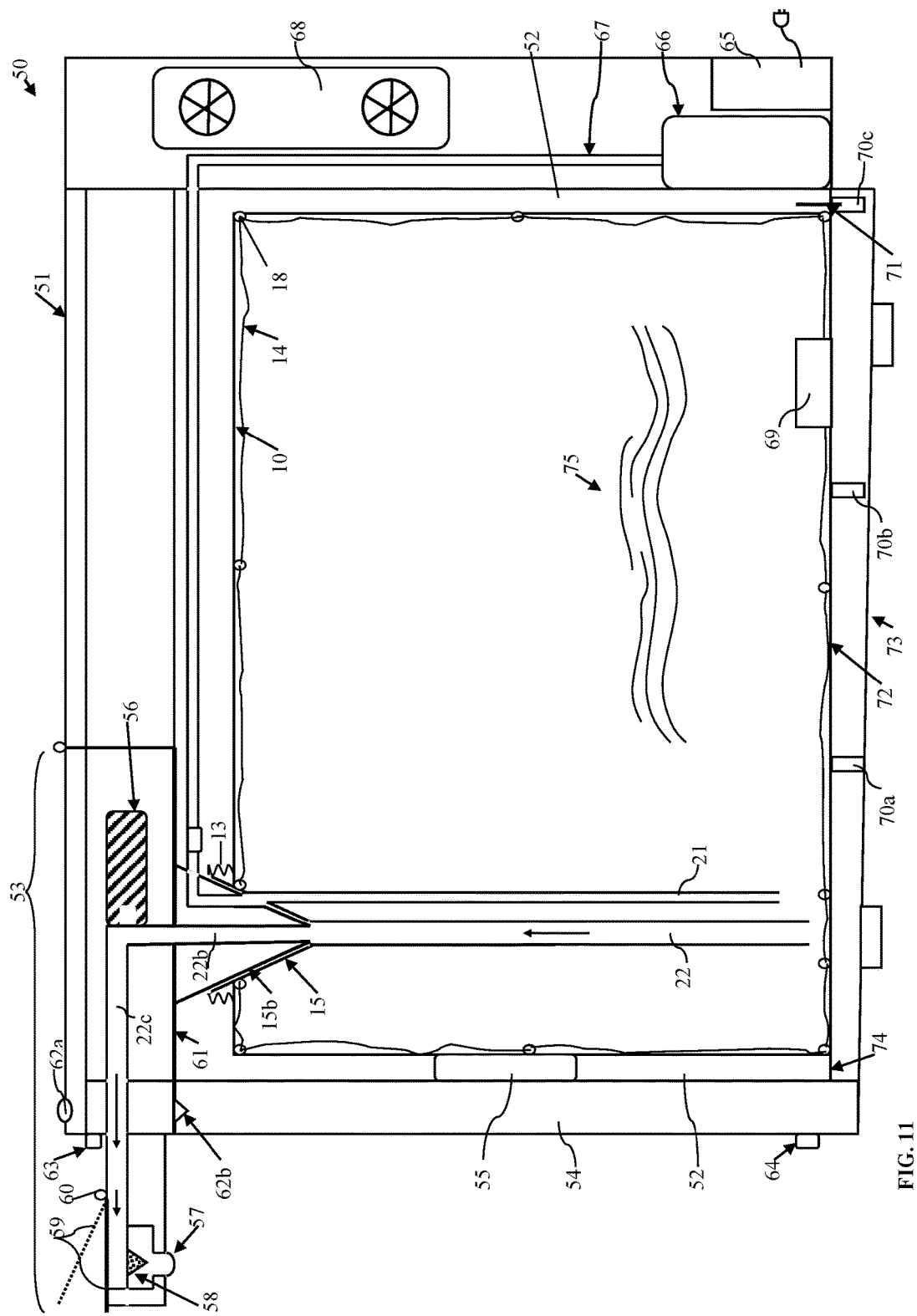
FIG. 11 illustrates a side sectional view of a countertop drink dispenser, according to several embodiments.
Figure 12:
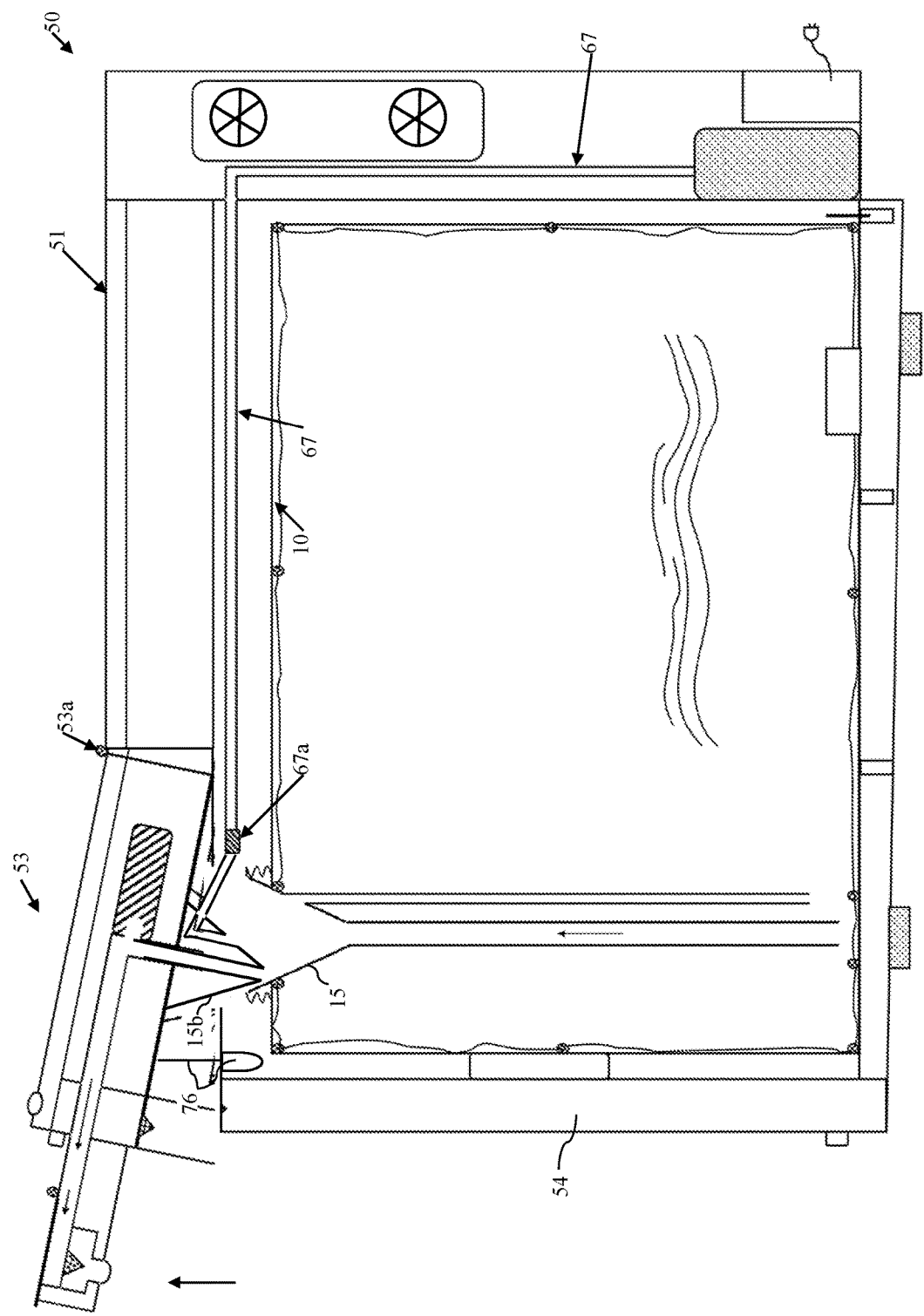
FIG. 12 illustrates the countertop drink dispenser from FIG. 11 in a different state.

FIG. 11 illustrates a side sectional view of a countertop drink dispenser, according to several embodiments. FIG. 12 illustrates the countertop drink dispenser from FIG. 11 in a different state. As shown, dispenser 50 may have a housing 51, a front door 54, a top lid housing 53 and a power source 65. Inside the housing 51, dispenser 50 may have one or more chambers 52 for receiving one or more containers 10 filled with liquid 75. It should be noted that front door 54 will have to be open and top lid housing 53 lifted up (see FIG. 12) high enough, such that the V-shape male coupling 15b escapes from the V-shape female coupling 15, in order for container 10 to be pushed in or pulled out of dispenser chamber 52 successfully.

After a container 10 is inserted in chamber 52, front door will need to be closed, such that for example a door fin 55 attached to the door can hold the front of container 10 in place. Several (one is shown only for drawing simplicity) adjustable lateral guide fins 69 (similar to those of a printer drawer for example) may be provided to ensure that irrespective of the width of the container 10, the V-shape female coupling 15 is aligned widthwise with the V-shape male coupling 15b, to make an air tight seal.

The guide fins are adjustable on the sides 69 as well as rear/back 71, to accommodate different sizes of beverage keg boxes or packaging and ensure that the V-shape female coupling 15 is aligned widthwise and lengthwise with the V-shape male coupling 15b, to make an air tight seal. Guide fins also allow cool air to flow easily around beverage box/keg 10 by holding box/keg 10 away from the walls of chamber 52.

The guide fins 69 may have a pin latch 69a (see FIG. 20) fitting in corresponding holes 69b, to allow guide fin adjustment to be locked in place. Similarly, for lengthwise alignment of the two couplings, guiding apertures 70a-70c (see FIG. 11) corresponding with for example the standardized lengths of container 10 may be provided, to receive guiding pin 71 behind the back of container 10.

It should be noted that a back to front downward slope (e.g., ¼ inches per each 12 inches) is provided for the floor 74 of chamber 52 (it should be observed that floor 74 sits higher in the back with respect to bottom 73 of dispenser 50; this ensures that when dispenser 50 sits on a horizontal surface the desired slope of floor 74 is obtained). This means that, when placed inside chamber 52, container 10 and its floor 72 will also be inclined downward from back to front. Thus, the liquid 75 will have the tendency to flow toward the well tube 22, thus aiding pump 56 to draw all or substantially all liquid 75 from container 10.

A separation between the V-shape female coupling 15 and the V-shape male coupling 15b may be observed in FIG. 11 and in other figures of this disclosure. It should be understood that the separation is depicted only to properly illustrate the individuality of the two V-shape couplings. However, in reality, when the top lid housing 53 is closed as seen in FIG. 11, there is no separation between the V-shape female coupling 15 and the V-shape male coupling 15b. They engage each other to create a friction seal. The force necessary to create the friction seal is preferably provided by the weight of the top lid housing 53 and of all the elements (e.g., pump 56) house into it. It should be understood that the coefficient of friction between the two couplings and the weight applied to the V-shape male coupling 15b by the top lid housing 53 and of all of its elements have to be coordinated with the pressure necessary to be maintained inside container 10. For example, for the same coefficient of friction (e.g., plastic on plastic), a greater weight will be needed for a greater pressure needed inside container 10 (e.g. for carbonated drinks).

The dispenser 50 may be equipped with a replaceable CO2 tank 65, which, as shown, may communicate through a CO2 duct 67 with the V-shape male coupling 15b and further with the CO2 line 21 of the container 10, when the V-shape male coupling 15b engages the V-shape female coupling 15 to create the friction seal described above. Thus, the friction seal between the two V-shape couplings also create a friction seal between the CO2 duct 67 and CO2 line 21. The CO2 may be used to carbonate the beverage 75 inside container 10.

The dispenser 50 may be also equipped with a refrigeration unit 68 (including a compressor, and evaporator and a condenser, similar to that of a refrigerator) for providing cool air inside chamber 52 for keeping the container 10 and the beverage in it 75 cool. For this purpose, a seal 61 (e.g., rubber seal) may be provided between the top lid housing 53 and the chamber 52, so that, upon closure of the top lid housing 53, the cool air does to escape from the chamber(s) 52. It should be understood that the entire chamber 52 will also have to be hermetically built and the door 54 hermetically closed to keep the cool air inside chamber(s) 52. The top lead housing 53 may be lockable with a latch 62b, which can be actuated (e.g., for release purposes) from a button 62a. Similar sealing and locking means (not shown) may be provided for the door 54.

The top lid housing 53 may have as shown the V-shape male coupling attached to it, so that the two lift and close together (see FIG. 12). When opening (lifting up) the top lid housing 53, again, the V-shape male coupling 15b escapes from the V-shape female coupling 15 of the container 10, so that for example an empty container may be removed by a user from chamber 52 and a new, full one inserted therein. This is a quick process by a user and thus an advantage of this coupling and dispensing system. A user does not need to go through the cumbersome and time consuming process of for example screwing couplings together.

The top lid housing 53 may be associated with the dispenser housing 51 through a hinge 53a (see FIG. 12), which may facilitate the opening and closing of the top lid housing 53. A lifting shock 76 may also be provided to aid the user in lifting the top lid housing 53. It should be noted that the CO2 duct 67 may need to be flexible enough, or a flexible joint 67a may need to be provided, such that to allow the lifting of the top lid housing 53.

Referring now to FIG. 11, as shown, the top lid housing 53 may house a pump 56, which can draw the liquid 75 from container 10 via well tube 22 and further through male coupling's pipe 22b and then push it toward drink dispensing/pour spout 57 via spout conduit 22c. It should be noted that the friction seal between the V-shape couplings 15, 15b, described earlier, also creates a seal between well tube 22 and pipe 22b.

Before reaching the pour spout 57, the liquid 75 (e.g., water) pumped out by pump 56 may be forced to pass through a beverage pod 58 (e.g., coffee or tea pod). This offers a myriad of possibilities to the user. Not only can a user make coffee and tea, but the user can customize any drink from the container 10 (e.g., lemon juice) with an aroma or flavor desired (e.g., strawberry) by inserting the appropriate flavor pod 58. A pod lid 59 associated with the top lid housing 53 through a hinge 60, so that it can be open (see dotted line) or closed, may be provided for facilitating the insertion and removal of the beverage/flavor pod 58. The pod lid 59 may have similar sealing and locking means (not shown to prevent drawing clutter) as those shown (61, 62a, 62b) and described earlier for the top lid housing 53.

The dispenser 50 may have also a power switch 64 and a control panel 63 to give the option to the user to make several selections (e.g., temperature selection, carbonated/non-carbonated drink, etc).

Figure 13:
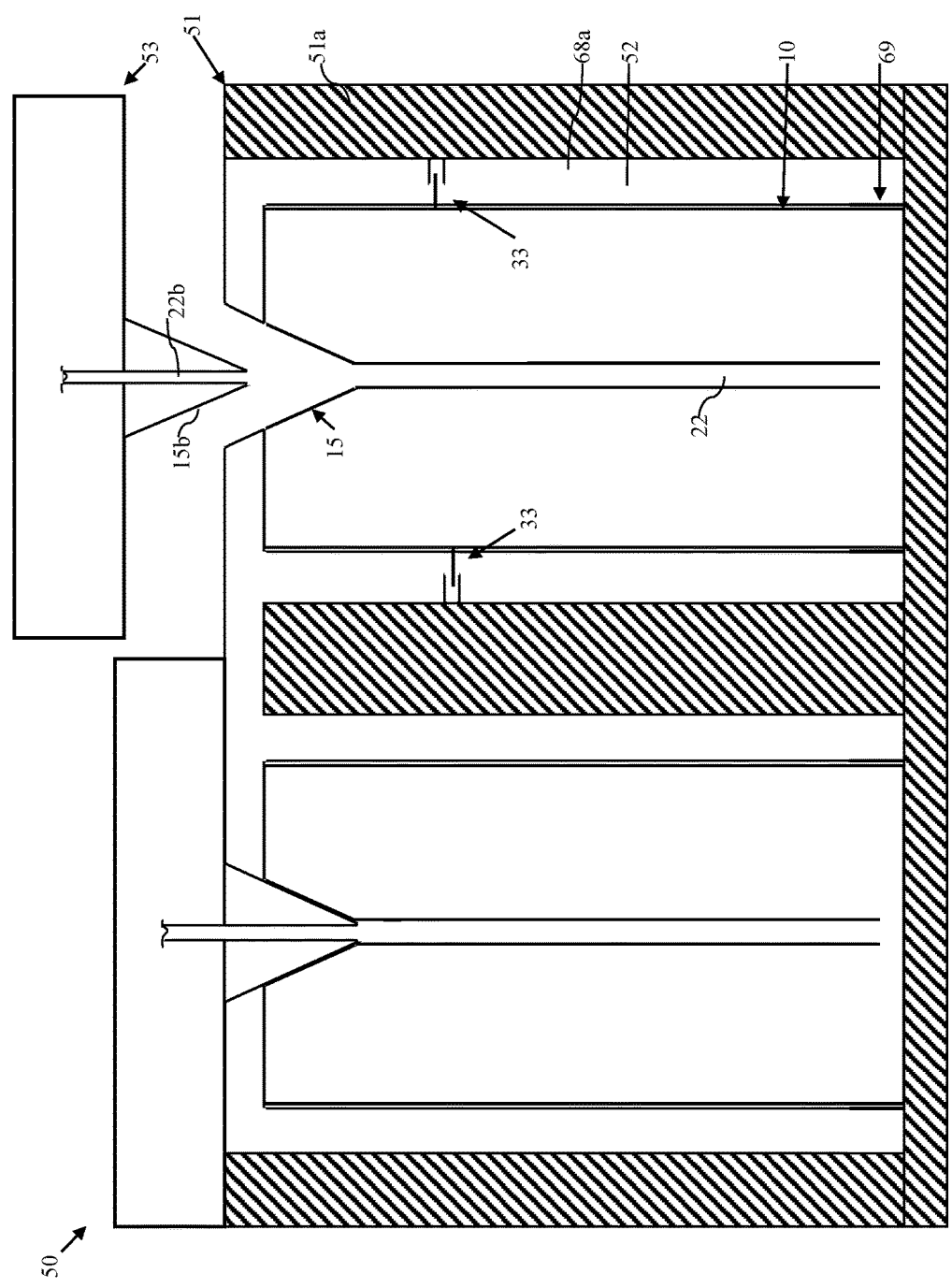
FIG. 13 illustrates a front sectional view of a drink dispenser having two chambers, according to an aspect.

FIG. 13 illustrates a front sectional view of a drink dispenser having two chambers, according to an aspect. A dispenser 50 may have one or more chambers 52. It should be apparent that a dispenser 50 that has more than one chamber 52 may receive a container 10 in each chamber and thus offer more options to a user. For example, a container may contain flat cold water, another may contain a carbonated drink, another may contain a juice, and so on. As stated earlier when referring to FIG. 11, one or more chambers 52 may be filled with cold air 68a provided by a refrigeration system 68 (FIG. 11) to keep the respective drink at a set temperature or at a temperature selected by a user. For energy saving purposes, the walls 51a of the dispenser housing 51 may be thermally insulated. And again, as shown in FIG. 13 and as stated earlier when referring to FIGS. 11-12, the top lid housing 53 has to be lifted high enough, such that the V-shape male coupling 15b retreats completely from the V-shape female coupling 15, in order for the container 10 to be removed from or inserted into chambers 52.

Figure 14:
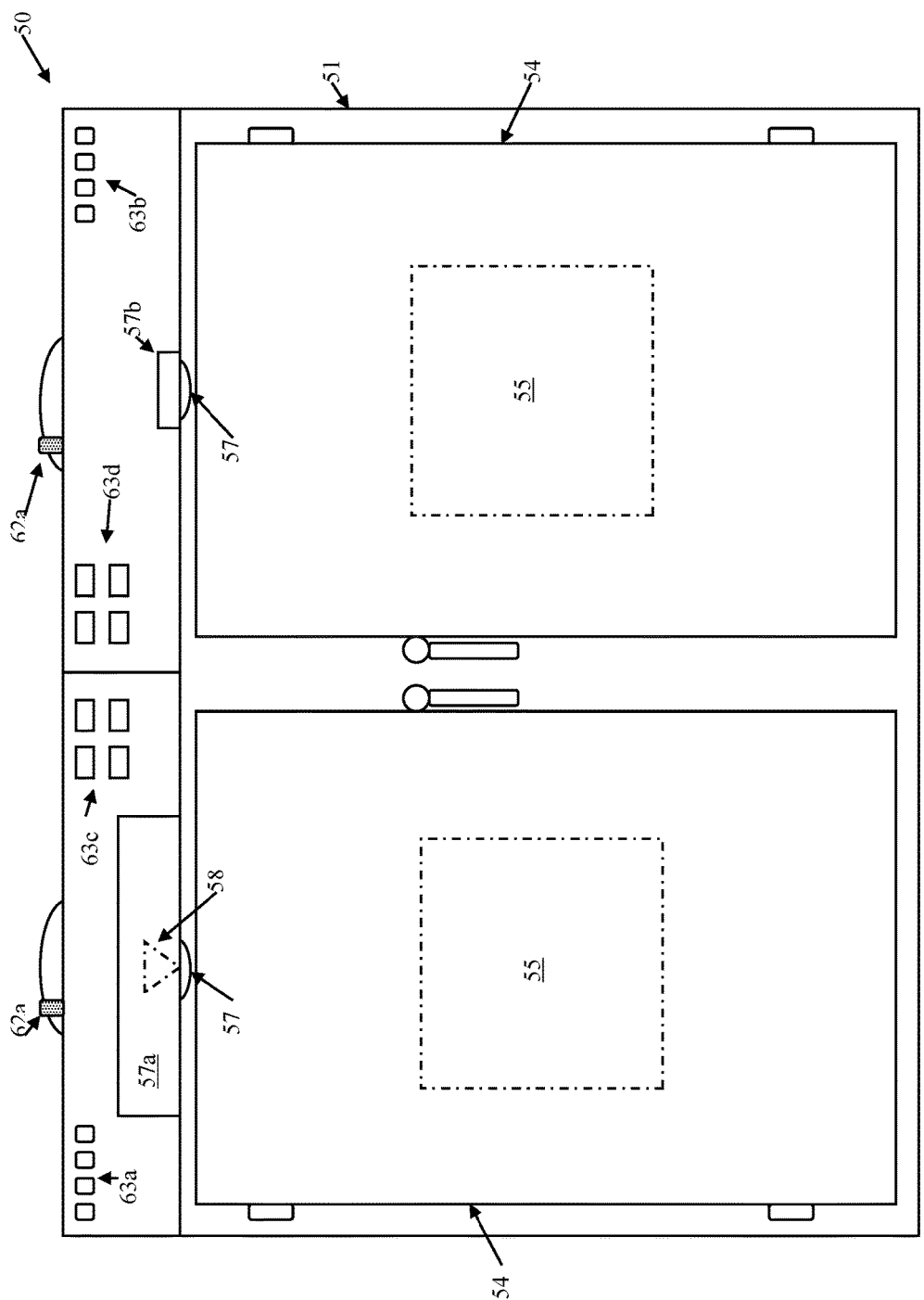
FIG. 14 illustrates a front view of a drink dispenser having two chambers, according to an aspect.
Figure 15:
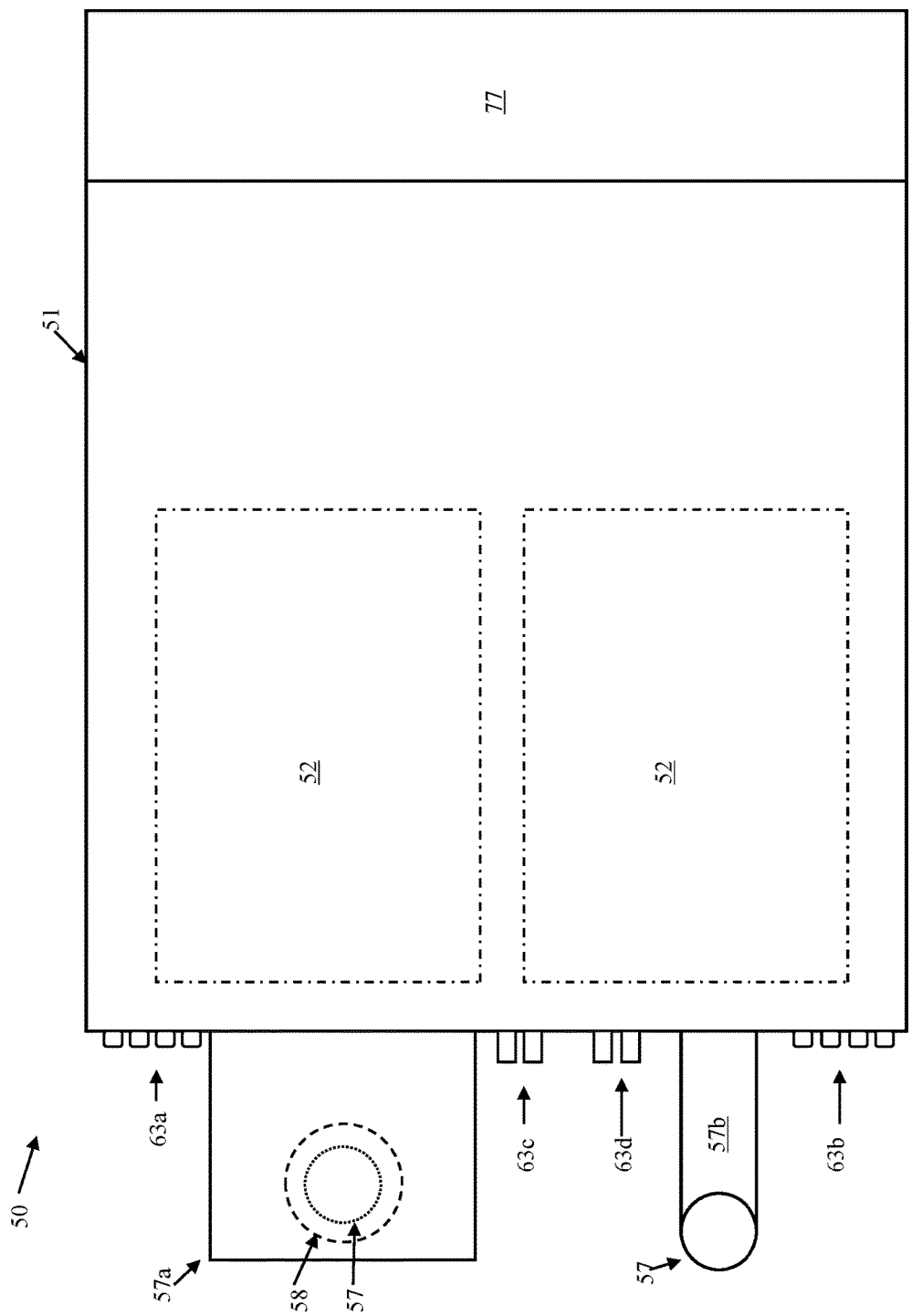
FIG. 15 illustrates a top view of a drink dispenser having two chambers, according to an aspect.

FIG. 14 illustrates a front view of a drink dispenser having two chambers, according to an aspect. FIG. 15 illustrates a top view of a drink dispenser having two chambers, according to an aspect. It should be understood that a dispenser may have one chamber only, or it may have three, four (see FIG. 24 for example), six or more chambers. It should be noted that preferably each of the two chambers 52 has its door to allow for independent replacement of containers 10 (see FIG. 13). It should also be noted that, for example, one spout module 57a may be larger to accommodate the housing of the flavor/beverage pod 58 and other elements (e.g., heating elements; see 78 in FIG. 20), while the other may be smaller (57b). Through the spout 57 of the smaller spout module 57b, with no beverage/flavor pod, the user may get the unmodified drink (e.g., juice) from the respective container and chamber. It should be apparent that other combinations may be adopted, such as when both (or all if more than two), or none of the spouts modules are configured to accommodate the housing of a beverage or flavor pod 58, and/or heating. In addition, the spout module(s) 57a may be configured to also allow for the option of pouring the drink out of container 10 without adding flavor and/or heating and/or cooling.

Further, it should be noted that preferably each chamber 52 of dispenser 50 has its own flow controls, or other controls described herein 63a-b, for a user to select for example how much drink to pour, and/or temperature control and reader/display 63c-d to display for example the temperature in each chamber. Lastly, it should be noted that, as shown in FIG. 11, the refrigeration unit 68, CO2 tank 66 and power supply 65 are preferably located in the back portion 77 (FIG. 14) of housing 51.

FIGS. 16-19 illustrate sectional views of male-female couplings, according to several embodiments. In FIG. 16 the V-shape female 15 and male 15b coupling is depicted as earlier described when referring to the precedent figures. In FIG. 17 an alternative embodiment is depicted in which a ridge system 34 may be employed to create the seal between the male and female coupling. A ridge 34a may be present all around the interior surface of the V-shape female coupling 15, and similarly, ridge 34b may be present all around the exterior surface of the V-shape male coupling 15b. When the V-shape male coupling 15b descends, as earlier described when referring to FIG. 11-12, into the V-shape female coupling 15, as shown, ridge 34b is preferably configured to pass ridge 34a, such that the two ridges sit next to each other, to create a seal. It should be noted also that the two ridges 34a-b are squeezed between the two couplings proportionally with the weight applied to the male coupling. This is because the V-shape (e.g., funnel) is narrower at the bottom. Thus, in this embodiment as well, the seal is stronger if more weight is applied to the male coupling 15b.

In FIG. 18, a channel 35a may be present all around the interior surface of the V-shape female coupling 15, and a ridge 35b may be present all around the exterior surface of the V-shape male coupling 15b. When the V-shape male coupling 15b descends, as earlier described when referring to FIG. 11-12, into the V-shape female coupling 15, as shown, channel 35a is preferably configured to receive ridge 35b, to lock the couplings and create a seal in addition to the seal between the interior surface of the V-shape female coupling 15 and the exterior surface of the V-shape male coupling 15b. This embodiment may be preferred when for example the strength of the seal between the two couplings has to be controlled. The locking aspect of the channel-ridge system 35 makes that possible.

FIG. 19 is offered as an example to illustrate that the male-female friction coupling described herein may have other shapes, besides the V-shapes (e.g., funnel shape). For example, the male-female friction couplings may have a U-shape or bullet shape as shown in FIG. 19. Other shapes may be adopted, such as cylindrical shape, prism shape, and so on. An advantage of the V-shape is that it also aids to guide and center the V-shape male coupling 15b as it enters the V-shape female coupling 15. Further, the V-shape coupling lends itself to a tighter seal. In addition, when, for example, the male coupling's pipe 22b has a beveled lower end or is extended with a beveled nose 22bb (see FIG. 16), it can slide inside well tube 22 creating an even tighter seal, and thus allowing better suction for the pump 56 (see FIG. 11).

Figure 20:
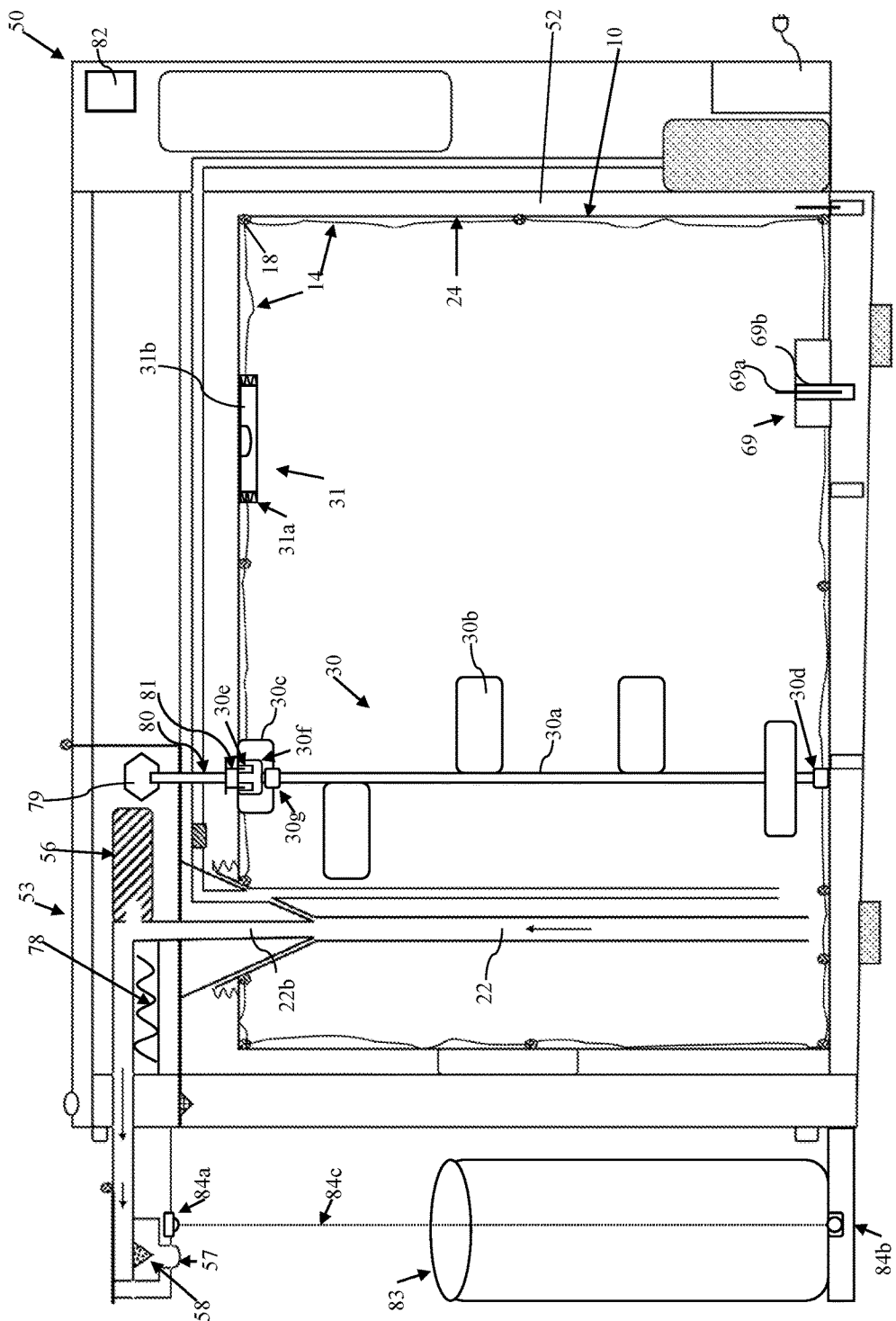
FIG. 20 illustrates a side sectional view of a dispenser system having a mixer and other features, according to several embodiments.

FIG. 20 illustrates a side sectional view of a dispenser system having a mixer and other features, according to several embodiments. As shown, a mix/stir motor 79 may be part of lift lid housing 53 and may be placed next to beverage pump 56 and behind the beverage heater 78. As it is the case with all the functions and elements of the dispenser 50 described herein, the mix/stir motor 79 may be controlled via dispenser controls (see for example 63a in FIG. 14) or a smart phone app communicating with a computer 82 of the dispenser 50. Upon its actuation, motor 79 spins a shaft 80. Associated with the shaft 80 two or more drive pins 81 may be provided. Thus, the motor 79, the shaft 80 and drive pins 81 will rise together with the top/lift lid housing 53 to allow the insertion of container 10 into chamber 52. Similarly, they will descend when the lift lid housing 53 will be lowered for closing (see FIGS. 11-12), such that the drive pins 81 can engage the corresponding apertures 30e of a top fin bar 30f, which can rotate inside a recess 30c at the top of container 10. It should be noted that other coupling means between drive shaft 80 and fin bar 30f may be used, such as friction/clutch means. The fin bar 30f may be attached to a mix/stir shaft 30a that goes down as shown into the container 10. The mix/stir shaft 30a may have several rotating paddle blades 30b to properly mix/stir beverages, cocktails or soft serve-food, ice cream, yogurt, soup, smoothie, juice, cocktails and so on. The rotation of the mix/stir shaft 30a may be eased by the use of bearings 30d and 30g. Bearing 30d will preferably be configured to provide also the sealing level corresponding to the pressure level desired to be maintained in the container 10 (i.e., higher pressure for carbonated drinks).

As shown, the container 10 may also be equipped with an ingredient access 31, which may be closed using an ingredient/screw cap 31b fastenable with the aid of, for example, threads 31a.

The screw cap 31b is preferably air tight preventing beverage from going flat or being spoiled. When screw cap 31b is opened, there is a possibility that a carbonated beverage could lose some of its carbonation. This is not a problem. As soon as top lid 53 and front doors 54 are closed, a CO2 sensor 86 (FIG. 22) may be provided to read the carbonation levels in the beverage container 10 an cause computer 82 to automatically add CO2 to container 10, via direction valve 85a (see FIG. 21), to re-carbonate to the proper level of carbonation for the beverage type in the respective container 10.

To create a mixed drink (e.g., cocktail, etc), a user may, before inserting container 10 into chamber 52, remove ingredient cap 31b from top of box/container 10, which allows user to add ingredients (e.g., juice, cut up fruit, etc) into the beverage (e.g., spirit, etc) present inside container 10. Next, the user would fasten ingredient cap 31b, thus closing ingredient access 31. Next, a user would insert container 10 into chamber 52, while lift lid housing 53 is lifted up (see FIG. 12).

Next, the user would close the lift lid housing 53, which will cause drive pins 81 to engage the apertures 30e of the top fin bar 30f. Next, the user would actuate the motor 80 via dispenser controls (see for example 63a in FIG. 14) or a smart phone app as described above. That would cause the stir shaft 30a and paddles 30b to spin and thus mix the added ingredient with the beverage inside container 10.

As shown in FIG. 20, the dispenser 50 may be equipped with cup controls sensors 84a-b that, via for example light beam 84c, can read if a beverage container/cup/glass 83 is in place for automatic pour when, for example, user sets dispenser 50 to pour at a certain time, in commercial use setting or home use. For example, the night before user goes to bed, user may set dispenser 50 via dispenser controls (see for example 63a in FIG. 14) or a smart phone app to pour coffee and/or chilled orange juice at 7:00 am. If the glass/container 83 is in place to receive the beverage, dispenser 50 will pour the beverage at 7:00 am. Further, computer 80 may be configured to notify user via your smartphone app or flashing light on control panel and/or audio signal that beverage is ready.

Figure 21:
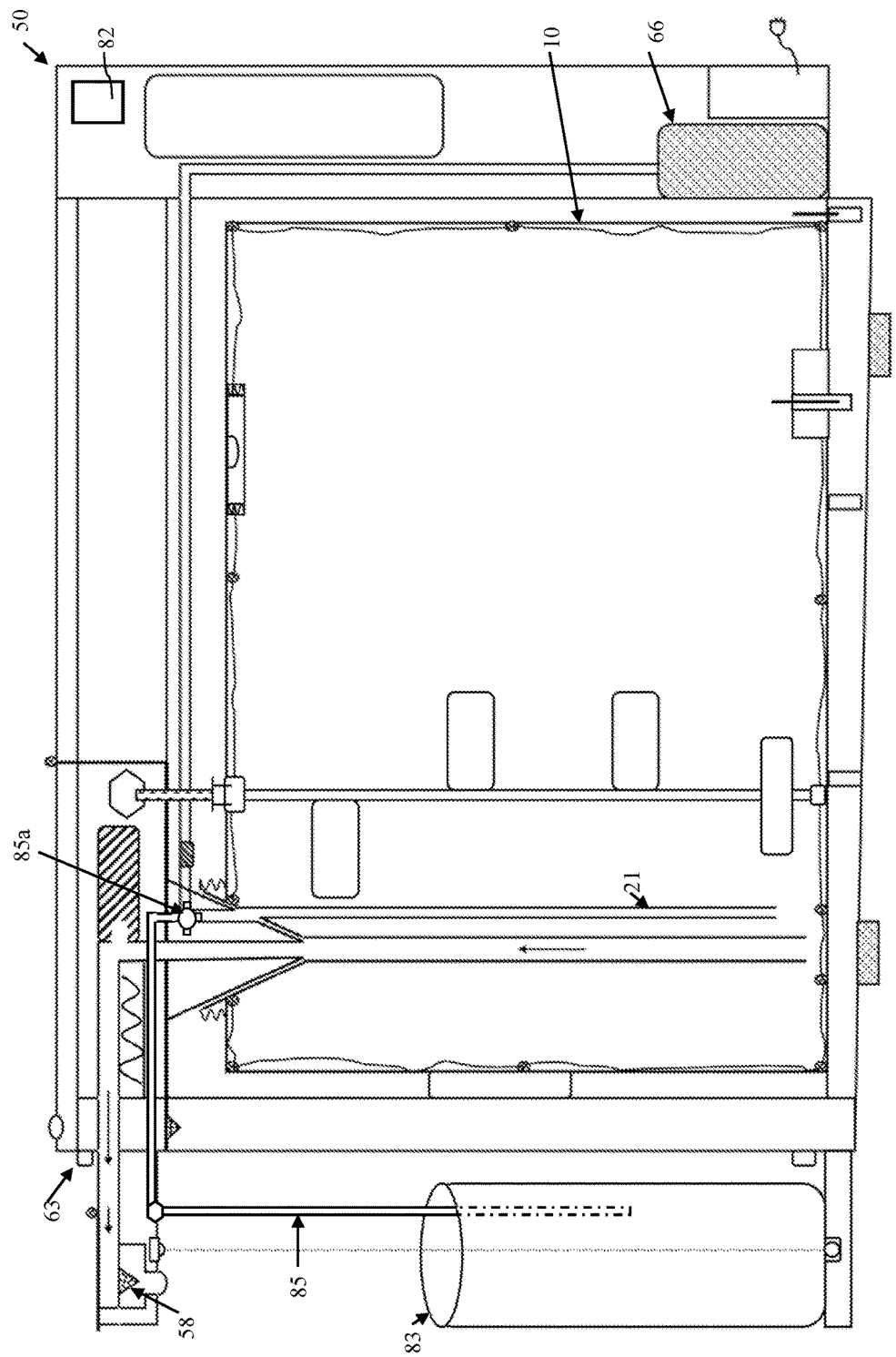
FIG. 21 illustrates a side sectional view of a countertop drink dispenser having a $CO_2$ line for the beverage glass, and other features, according to several embodiments.

FIG. 21 illustrates a side sectional view of a countertop drink dispenser having a $CO_2$ line for the beverage glass, and other features, according to several embodiments. As shown, the CO2 from the CO2 tank 66 may be passed through a direction valve 85a (e.g., a solenoid valve) electrically-actuable for example by computer 82 based on for example instructions received from a user via controls 63 or a scanner 90 of a bar code 89 on pod 58 (see FIG. 22). The direction valve 85a may send CO2 either to glass/cup 83 via cup CO2 line 85 or to container 10 via container CO2 line 21. This versatility of dispenser 50 is very important. For example, let's say that the container 10 is filled with spring (flat) water, to make coffee, tea or other non-carbonated drinks using drink/flavor pod 58. If now the user wants a glass 83 of carbonated water, user can for example press the appropriate control 63 to send CO2 just into the glass of water 83, leaving container 10 with non-carbonated water.

Figure 22:
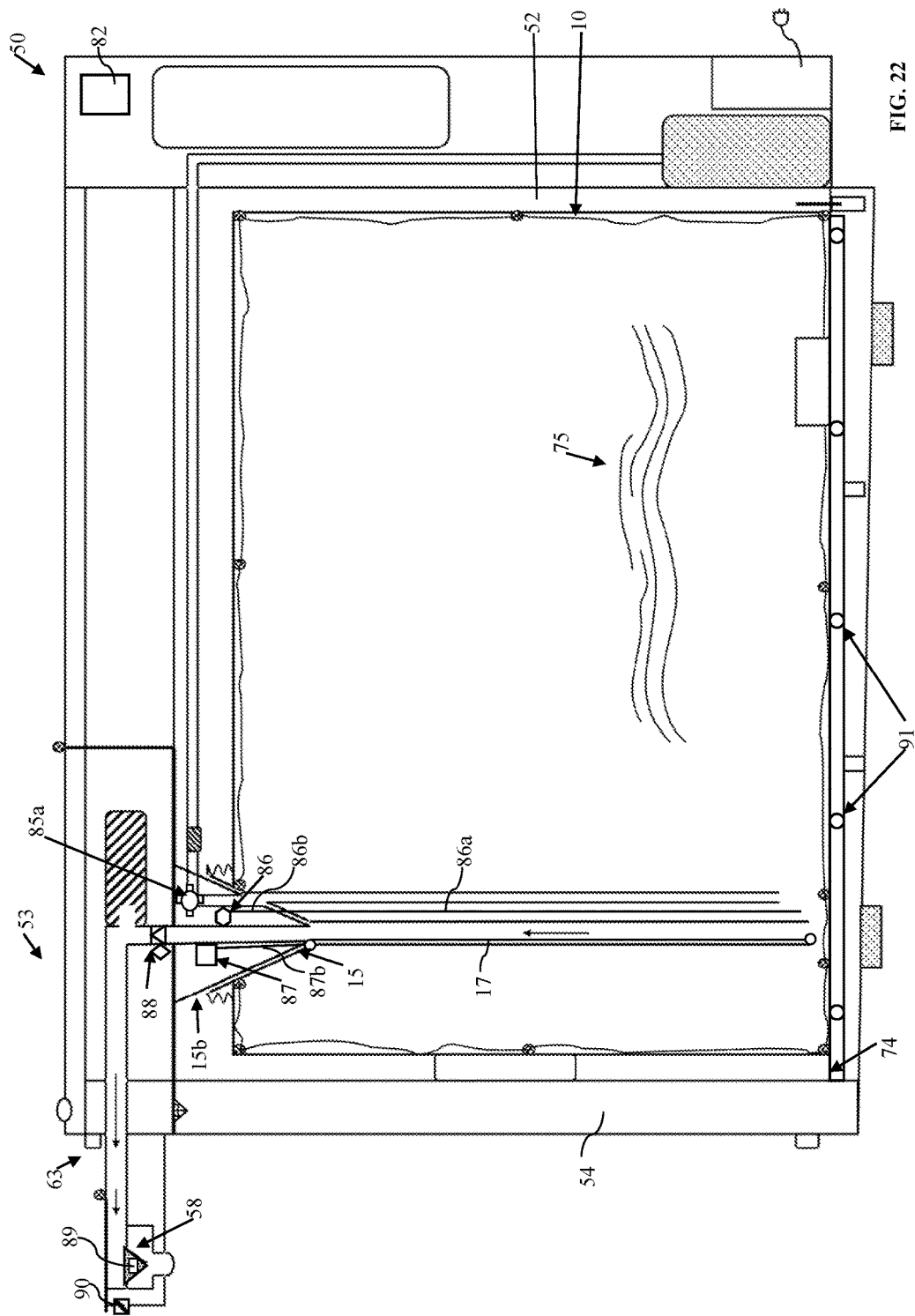
FIG. 22 illustrates a side sectional view of a countertop drink dispenser having a $CO_2$ sensor, and other features, according to several embodiments.

FIG. 22 illustrates a side sectional view of a countertop drink dispenser having a $CO_2$ sensor, and other features, according to several embodiments. Again, as mentioned earlier when referring to FIG. 20, a CO2 sensor 86 (FIG. 22) may be provided to read the carbonation levels in the beverage container 10 an cause computer 82 to automatically add CO2 to container 10, via direction valve 85a (see FIG. 21), to re-carbonate and maintain the proper level of carbonation for the beverage type in the respective container 10.

The CO2 sensor 86 may be connected to a male CO2 sensor strip 86b, which may reside as shown inside V-shape male coupling 15b. During the coupling of the female and male V-shape couplings 15, 15b as earlier described herein, the male CO2 sensor strip 86b is preferably configured to connect with a CO2 sensor strip 86a, with which container 10 may be equipped, if, for example, the beverage 75 inside container 10 is a carbonated beverage.

The dispenser 50 may have a smart beverage volume pour flow control valve 88 (e.g., a solenoid valve) controlled by computer 82, so that for example the user can set, from controls 63 or a smartphone app, the volume of beverage desired to be poured in user's cup 83 (FIG. 21). Dispenser 50 may also have a beverage volume level sensor 87 which may communicate with computer 82 to alert the user when for example beverage volume is low in container 10. The alert may be communicated to user via user's smart phone app and/or visual and/or audio alert signal on/from the front of control panel 63. The beverage volume sensor 88 may be connected to a male volume sensor strip 87b which may reside as shown inside V-shape male coupling 15b.

During the coupling of the female and male V-shape couplings as earlier described herein, the male volume sensor strip 87b is preferably configured to connect with the beverage level sensor strip 17 of container 10. Again, as stated earlier when referring to FIG. 1, the container 10 may be equipped with a beverage level sensor strip 17, which may assist a user as described above, in knowing the level of beverage remaining in the container 10 during use and/or alert the user to acquire a new/filled container.

As shown in FIG. 22, each beverage flavor pod 58 may have a scannable bar code 89. The dispenser 50 may have a bar code scanner 90 that can read the bar code 89 and then communicate the data to the computer 82. The bar code 89 may contain data regarding to, for example, what kind of beverage to pour: hot, cold, carbonated, non-carbonated, ounces of beverage, and so on. In addition, the bar code may contain data of interest to user, such as nutrition data, which computer 82 may communicate to user, for example, on a display (see for example 63c-d, FIG. 14) of the dispenser 50 and/or on user's smart phone.

Preferably, all bay chambers 52 have a floor 74 that can slide out on roller wheels 91 (FIG. 22), similarly to, for example, a kitchen cabinet drawer. This feature of dispenser 50 allows easier loading of beverage container 10 into chamber 52. For example, top lid 53 may not be able to open to a 90 degree angle because of various restrictions, such as the upper kitchen cabinets, when dispenser 50 is used on a kitchen countertop. However, as described earlier, top lid 53 will lift/open enough to disconnect the male and female V-shape couplings, 15b, 15, allowing a beverage box 10 to slide into chamber 52 when front cabinet door 54 is open. However, for example, some beverage boxes 10 that are heavy or with for example irregular or odd shapes may need to be top loaded and adjusted into bay chamber guide fins 69, 71 (FIG. 11) to ensure proper alignment of the V-shape couplings 15, 15b. Therefore, preferably, all cabinet floors 74 slide outward of bay chambers 52.

Figure 23:
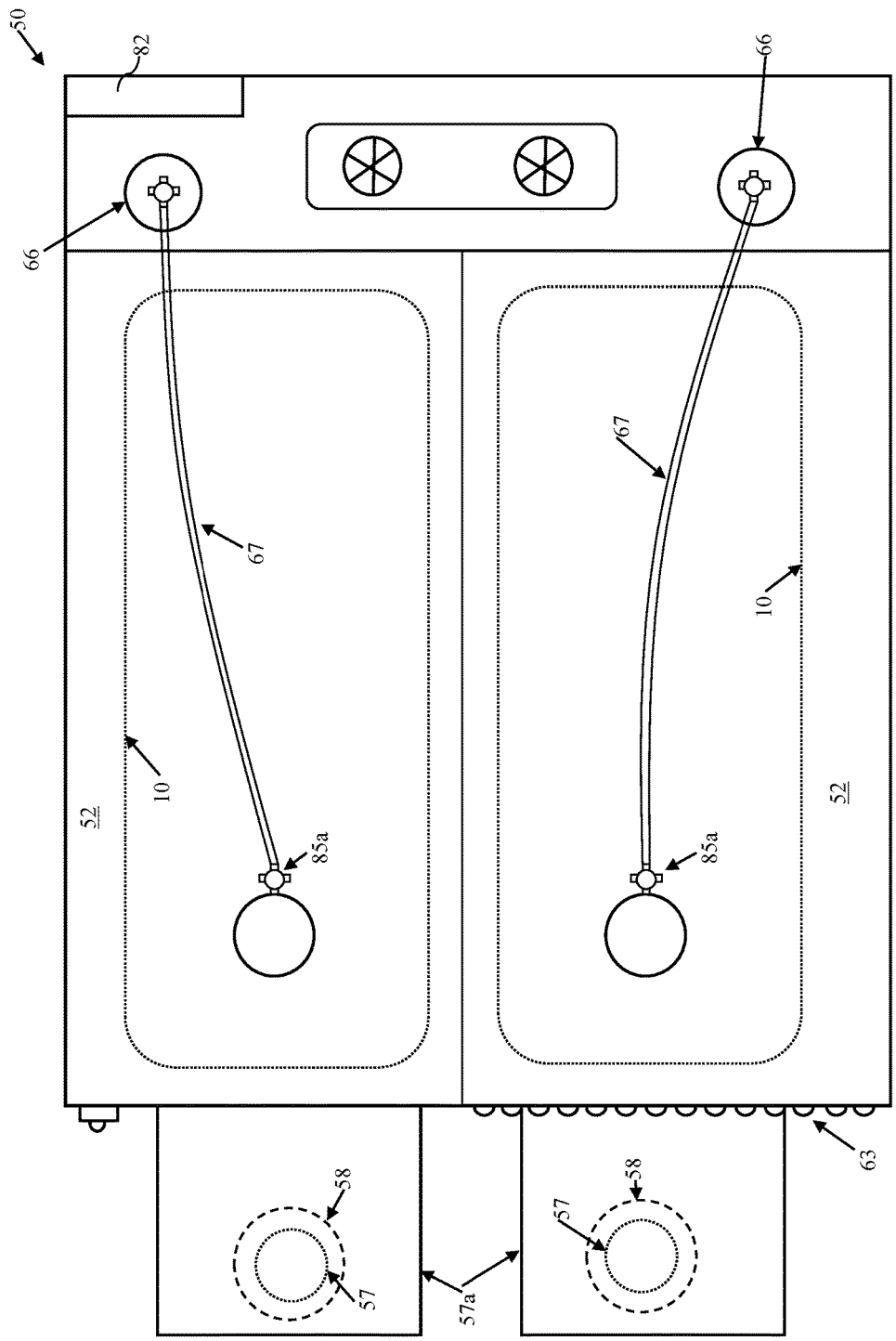
FIG. 23 illustrates a top view of a drink dispenser having two chambers, according to another embodiment.

FIG. 23 illustrates a top view of a drink dispenser having two chambers, according to another embodiment. As stated earlier in this disclosure, each dispenser 50 may have one, two or more chambers 52. In this embodiment two chambers are shown, each having an independent $CO_2$ supply via $CO_2$ lines 67 from $CO_2$ tanks 66. As described earlier when referring to FIGS. 21-22, the $CO_2$ supply is controlled via a directional/smart valve 85a by computer 82. In this embodiment, as shown, each spout housing 57a may accommodate a beverage pod 58. Thus, the dispenser 50 provides the versatility the user may need, such as pouring via each of the spouts 57 hot or cold, carbonated or non-carbonated beverage, which pouring user can control from control panel 63 or a smartphone app as described earlier.

Figure 24:
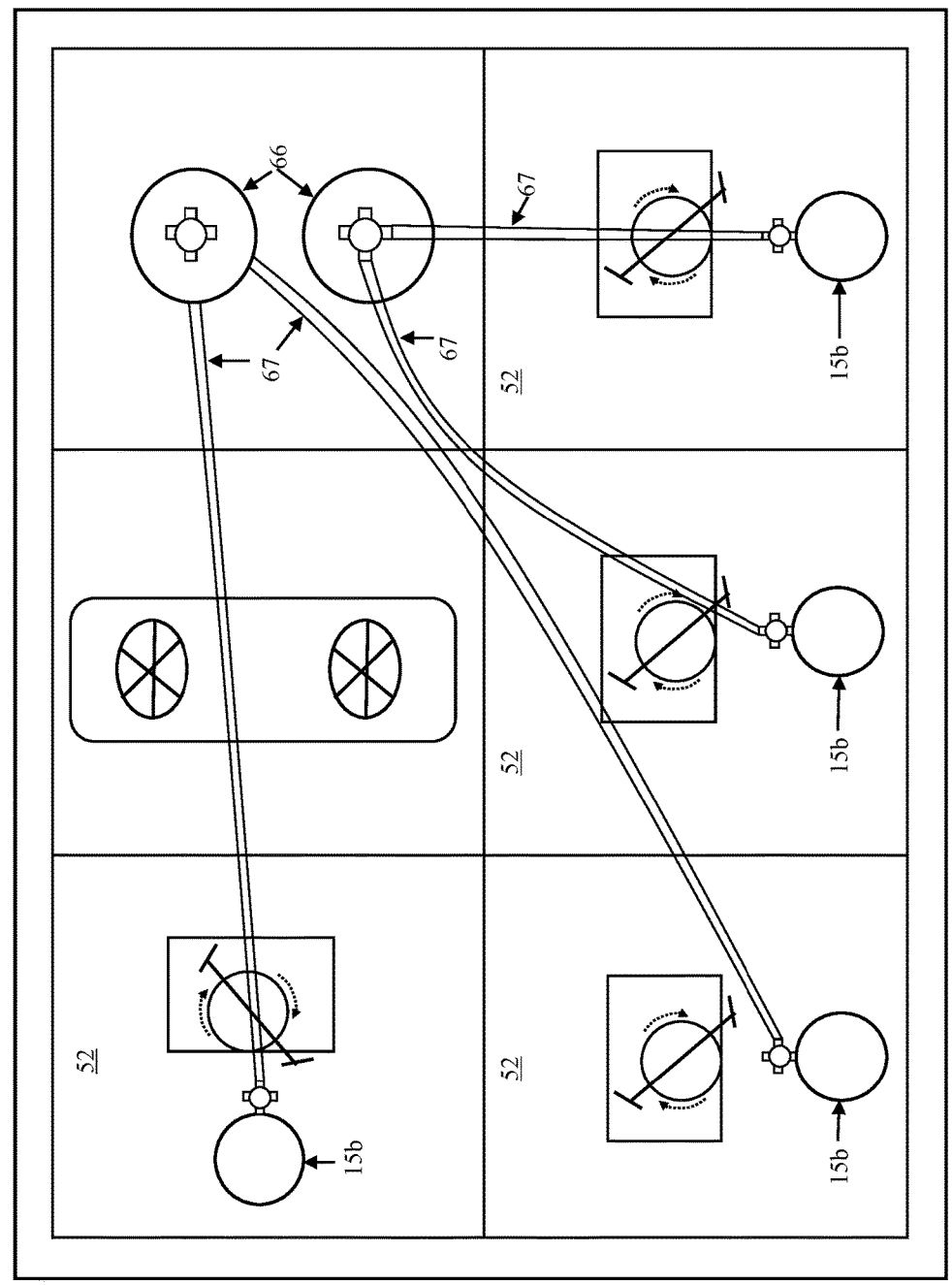
FIG. 24 illustrates a top sectional view of a drink dispenser having four chambers, according to an aspect.

FIG. 24 illustrates a top sectional view of a drink dispenser having four chambers, according to an aspect. This dispenser can be used as a larger floor model or corner top model. This is an example of a dispenser 50 having four chambers 52 and configured to fit a corner space, such that pouring can be done from two sides, left and front in this example. This two-side access may be advantageous in a commercial setting for example, when the dispenser may be a floor model accommodating larger containers/kegs.

Figure 25:
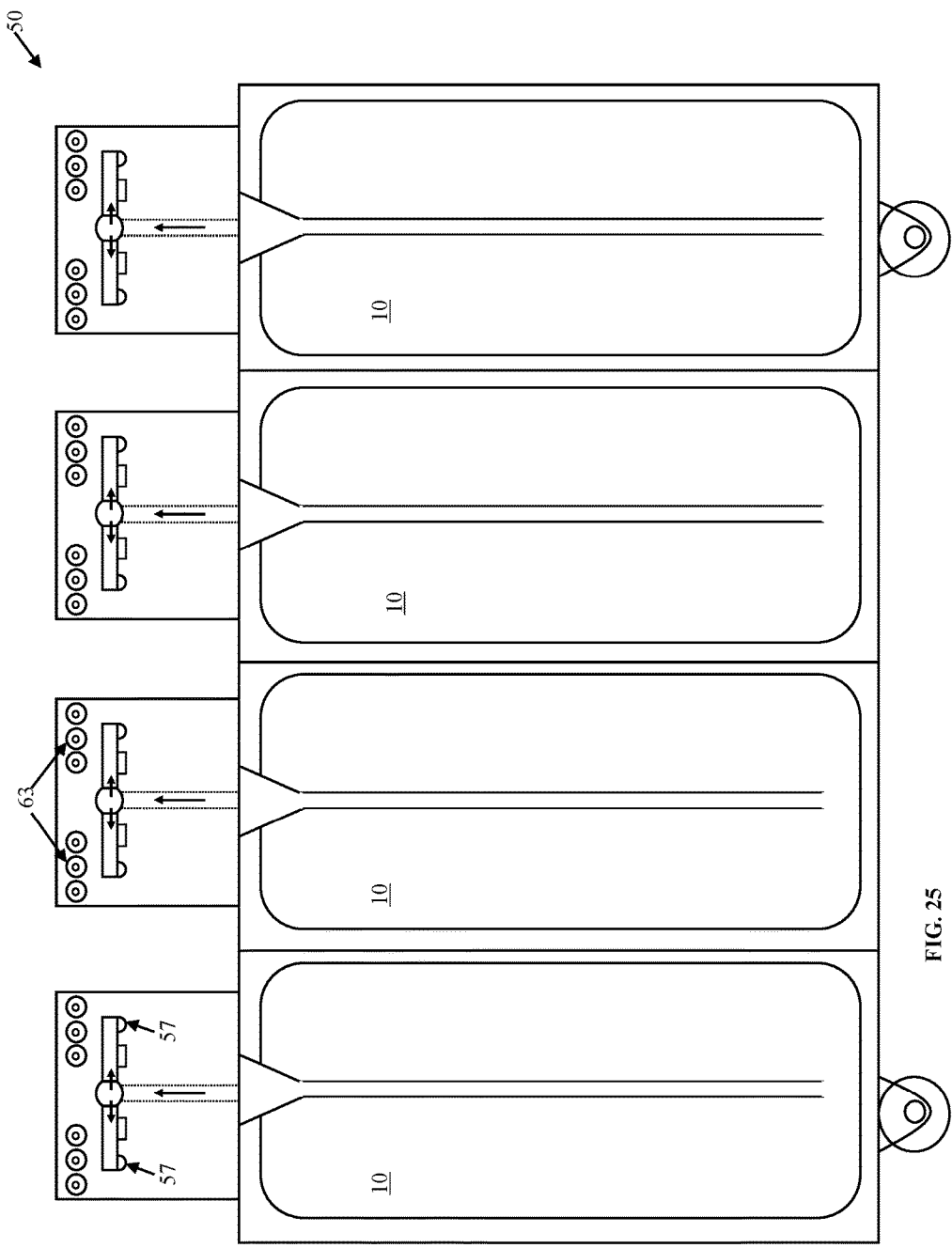
FIG. 25 illustrates a front sectional view of a drink dispenser having four chambers, according to an aspect.

FIG. 25 illustrates a front sectional view of a drink dispenser having four chambers, according to an aspect. What should be noted here that the dispenser 50 may be configured such that to provide the option of pouring at the same time via two spouts 57 from each beverage container 10. Thus, eight glasses could be filled at the same time. This arrangement may be advantageous in a commercial setting for example, when a bartender needs to serve several customers at the same time. This dispenser can also be used as a larger floor model or as corner top model too.

Figure 26:
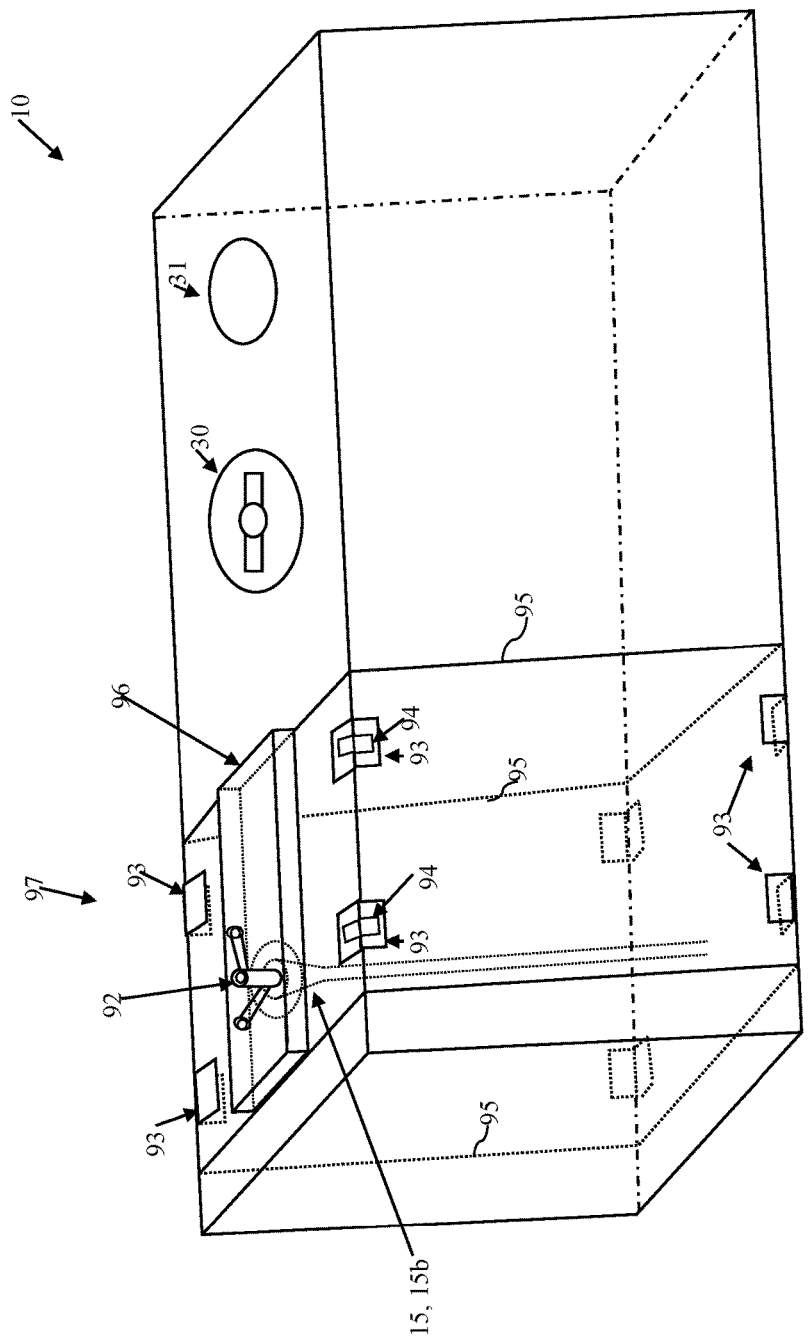
FIG. 26 illustrates the perspective view of a drink container equipped with a coupling adapter, according to an aspect.

FIG. 26 illustrates the perspective view of a drink container equipped with a coupling adapter, according to an aspect. The cost of a commercial size container/keg 10 as described herein, versus the cost of traditional stainless steel kegs is significantly lower. This is because the container 10 is preferably made from biodegradable materials and as such is a one-way keg. There is no need to return the container/keg 10 to the drink manufacturer. Further, there is no need to or expense with washing the keg. The container 10 can simply and safely be discarded after use. Thus, besides making the container 10 work with the dispenser 50 disclosed herein, there may be a need to make container 10 having the V-shape female coupling 15 and all of its other elements disclosed herein work also with traditional keg system tri-clove fitting used in beer and wine industry today. This is simply because for example some user would not want to incur the expense associated with the replacement of their existing keg systems. For this purpose, a coupling adapter 97 may be provided, which can be configured to adapt to any existing keg systems, the uniqueness being the adapter's V-friction male coupling 15b, creating a friction seal with the V-friction female coupling 15 of container 10 as described earlier in this disclosure.

The coupling adapter 97, as shown in FIG. 26 may include a strap 95, made from stainless steel for example, and having hinges 93 on all four corners of container 10 and snap closed/open buckles 94 on one of the corners, to close/lock the strap 95. Preferably, eight hinges 93 total are provided. As shown, the coupling adapter 97 may include a traditional keg system coupling 92 (tri-clove) on top, so that existing line couplings can fasten into it. The traditional coupling 92 communicates preferably with a V-shape male coupling 15b placed underneath of strap 95 and secured by it after entering the V-shape female coupling 15 of container 10. A plate 96 may also be provided to provide depth and to reinforce the fastening of the traditional keg coupling 92 to the adapter strap 95. The corner hinges 93, snap closed/open buckles 94 and strap 95 create pressure on the underside V-shape male coupling 15b to create the friction seal with the V-shape female coupling 15 of the container 10.

Figure 28:
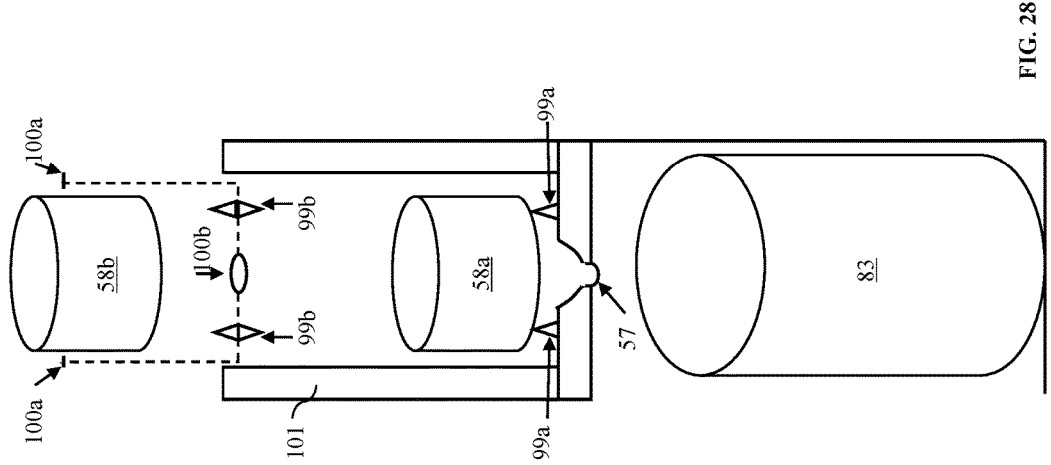
FIG. 28 illustrates the process of loading the spout housing from FIG. 27 with beverage pods, according to an aspect.
Figure 27:
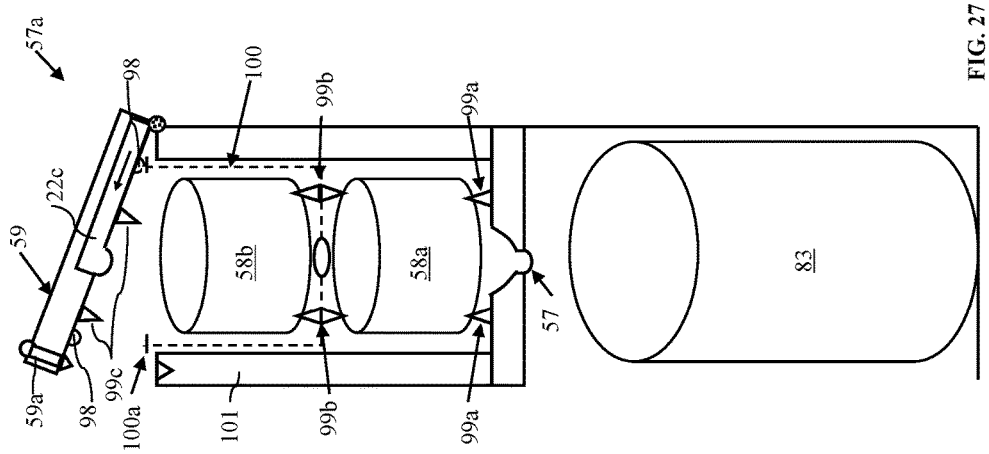
FIG. 27 illustrates the side sectional view of a spout housing of a drink dispenser, according to an aspect.

FIG. 27 illustrates the side sectional view of a spout housing of a drink dispenser, according to an aspect. FIG. 28 illustrates the process of loading the spout housing from FIG. 27 with beverage pods, according to an aspect. So far in this disclosure, reference was made to a spout housing 57a of dispenser 50 accommodating one beverage or flavor pod 58 (see FIG. 15 for example). In FIGS. 27-28 it is illustrated that the spout housing 57a may be adapted to accommodate two beverage/flavor pods, 58a, 58b, preferably in a stacked arrangement as shown. Similarly, it should be understood that spout housing 57a may be adapted to accommodate three or more pods, stacked similarly as shown in FIGS. 27-28.

To accommodate two pods 58a-b in a stacking arrangement as shown, the spout housing 57a has to have the appropriate height. Further, the pod lid 59 preferably have two protrusions 98, such that, upon closure of pod lid 59, the two protrusions 98 push down onto the flange 100a located at the top of a preferably perforated basket 100. The pod lid 59 may be locked into the spout housing frame 101 via a latch 59a. At its bottom, the basket 100 preferably has two double spikes 99b that can pierce the upper pod 58b and the lower pod 58a. As shown the two double spikes 99b have an upper end extending into the basket 100 and a lower end extending away from the bottom of basket 100.

Thus, to use two pods, a user may first place the lower beverage/flavor pod 58a into the spout housing 57a and on top of lower spikes 99a located at the bottom of spout housing 57a and oriented upwards as shown. The sharpness of the lower spikes 99a may be such that to prevent the piercing of the bottom of lower pod 58a yet. Next, the user may place the upper beverage/flavor pod 58b into the basket 100. Next, the basket 100 with upper pod 58b may be lowered on top of lower pod 58a. The sharpness of the double spikes 99b may be such that to prevent the piercing of the top of lower pod 58a and bottom of upper pod 58b yet.

Next, user can push down to close and lock pod lid 59. This will cause upper spikes 99c attached to the pod lid 59 to pierce the top of upper pod 58b and upper portion of double spikes 99b to pierce the bottom of upper pod 58b. Further, this will cause the protrusions 98 to push onto flange 100a of basket 100, and thus, to push basket 100 downward, causing the lower portion of double spikes 99b to pierce the top of lower pod 58a, and, because the basket 100 will push the lower pod 58a downward, causing the lower spikes 99a to pierce the bottom of lower pod 58a. Thus, now the beverage from spout conduit 22c may flow through upper beverage/flavor pod 58b and then through lower beverage/flavor pod 58a, before reaching user's cup 83 via spout 57.

To facilitate the flow, basket 100 has preferably a square shape (in cross-section), while the pods are preferably of round shape. This would allow more space at the corners of the basket 100 for the beverage to flow. In addition, as shown, to also facilitate the flow, the basket wall and bottom may be perforated and the bottom of basket 100 may also have a flow opening 100b.

Now, because of the two-pod configuration, the user can add to the existing beverage (e.g., water, juice, beer, wine, spirit, etc) in the container 10 any two flavors or beverages users want (e.g., tea, coffee, soft drink (e.g., Pepsi™, Coke™), cherry flavor, etc) to create their own concoction.

It should be understood that when the spout housing 57a is configured to accommodate only one beverage/flavor pod 58a, the height of the spout housing 57a is smaller, such that the upper spikes 99c can reach the top of pod 58a upon closure of pod lid 59.

Figure 29:
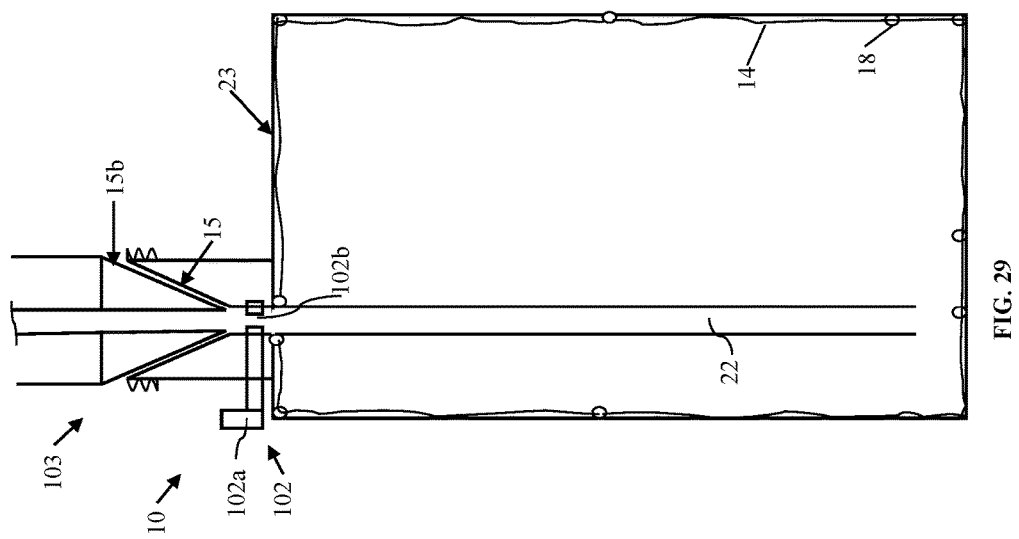
FIG. 29 illustrates a side sectional view of a drink container during filling at factory, according to an aspect.

FIG. 29 illustrates a side sectional view of a drink container during filling at factory, according to an aspect. It is well known that certain drinks such as wine are sensitive to air. For example, the taste of the drink may be negatively affected if air is allowed to mix with the drink. Further, air may contain chemical and/or biological elements that may contaminate the drink inside container 10. To prevent this, container 10 may be equipped with means that can be selectively engaged to prevent the air from entering container 10 and spoil the drink inside it. For example, container 10 may be equipped with a valve (e.g., a petcock valve) 102, which can close and open the well tube 22 of container 10.

As shown for exemplification purposes, if this approach is adopted, the well tube 22 may be extended above the upper surface 23 of container 10, to accommodate a placement of the valve 102 such that it can be easily accessed by a user for example. Thus, when container 10 is to be filled at the factory, lever 102a of valve 102 may be moved up for example, to open the valve 102, and thus well tube 22 (see valve opening 102b being aligned with well tube 22), such that liquid/beverage can be inserted in container 10 by factory equipment 103. It should be noted that preferably, in order to prevent air from entering container 10, valve 102 should be opened after the air tight friction seal is achieved between the V-shape female coupling 15 of container 10 and the V-shape male coupling 15b (similar to that of dispenser 50) with which the factory equipment 103 is preferably equipped.

It should be understood that valve 102, at the factory or when in the dispenser, may be opened or closed manually by a user, automatically through a mechanical leverage system (not shown), or, if the valve 102 is a solenoid valve, it could be actuated electrically (e.g., automatic command by computer 82).

It should be noted that all the other elements and functions of the container 10 disclosed herein remain otherwise the same if not conflicting with the modification(s) depicted in FIGS. 29-32 (raised well tube and coupling; valve on well tube). It should be further noted that all the elements and functions of dispenser 50 disclosed herein remain otherwise the same, with the exception of slight modifications that would be apparent to one of ordinary skills in the art, that may be needed to accommodate the raised well tube and valve and/or the presence of a valve.

Figure 30:
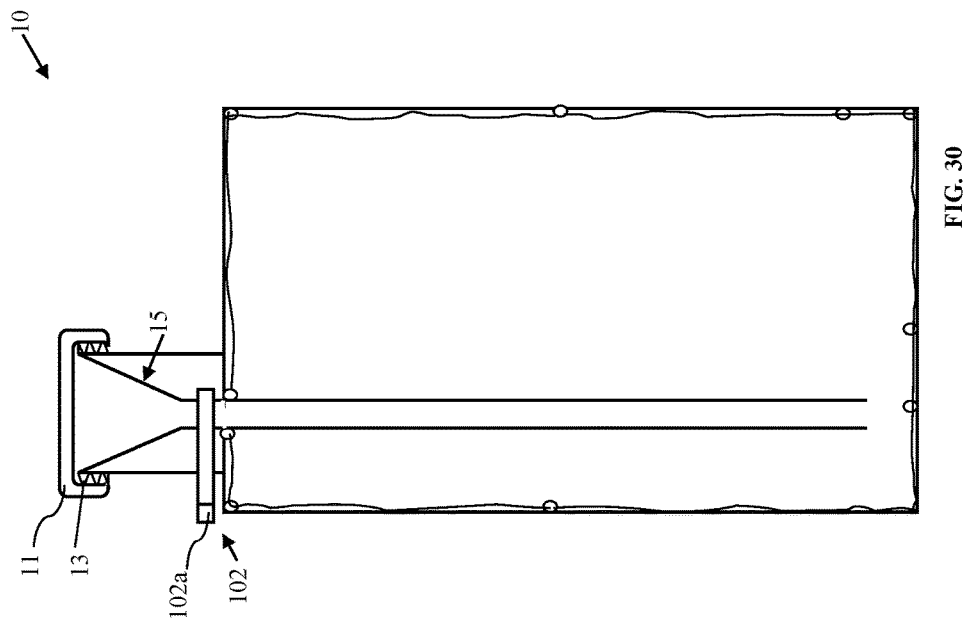
FIG. 30 illustrates a side sectional view of the drink container from FIG. 29 ready for shipping, according to an aspect.

FIG. 30 illustrates a side sectional view of the drink container from FIG. 29 ready for storage and/or shipping, according to an aspect. After container 10 is filled at the factory, valve 102 is preferably closed, by for example turning lever 102a down (see FIG. 30), such that to prevent air from entering via well tube 22 into container 10. Next, factory V-shape male coupling 15b is disconnected. Next, container 10 is preferably sealed with foil seal 19 (see FIGS. 1-2) and with cap 11, fastenable using threads 13 for example. The filled container 10 can now be shipped and/or stored.

FIG. 31 illustrates a side sectional view of the drink container from FIG. 30 placed in a dispenser, according to an aspect. When the filled container 10 arrives at the user, foil seal 19 (see FIGS. 1-2) and cap 11 may be removed and container 10 may be placed in the chamber 52 of a dispenser 50 as earlier described herein, while the valve 102 is still closed (see FIG. 31).

As described, the dispenser 50 (see FIG. 11 for example) preferably has a corresponding V-shape male coupling 15b, associated preferably with the top lid housing 53 of dispenser 50. After the airtight seal between the V-shape female coupling 15 and V-shape male coupling 15b is established as earlier described, valve 102 may be opened (see FIG. 32) by for example turning lever 102a upward as shown. The opening 102b of valve 102 is again aligned with the well tube 22 and thus pump 56 can draw the beverage from container 10 and pour it into user's glass 83 (see FIG. 20 for example).

It should be noted that this is a complete closed loop process, from the beverage factory to user, preventing air from spoiling or contaminating the beverage inside container 10. Again, FIG. 32 illustrates a side sectional view of the drink container from FIG. 31 in a different state (i.e., valve 102 open), according to an aspect.

Figure 33:
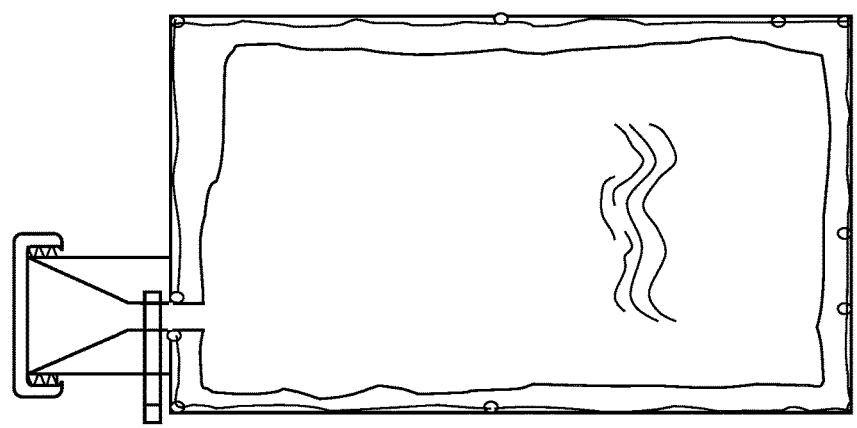
FIG. 33 illustrates a side sectional view of a drink container, ready for shipping or storage, according to another embodiment.

FIG. 33 illustrates a side sectional view of a drink container, ready for shipping or storage, according to another embodiment. As shown the drink container 10, may be adapted to be used for example for a picnic or a pool party, without the need of using a dispenser 50 described earlier in this disclosure. To that end, it should be noted that container 10 may have two bags inside, 14 and 103. Liner bag 14 was described earlier when referring for example to FIGS. 1-2. The inner bag 103 is sealed at the top as shown to a shortened well tube 22 and it is the bag that holds the beverage 75.

Container 10 may be equipped also with an air valve 104 (e.g., a typical bicycle air valve), which may be used to pump air in the space 109 between the liner bag 14 and inner bag 103, and thus force out the beverage 75 inside the inner bag 103. Any commonly available air pump (e.g., hand air pump, tire pump or compressor, etc) may be used to connect to air valve 104 and pump air in space 109. It should be understood that if container 10 is hermetically built, such as to prevent the escape of the air from its inside, liner bag 14 may be eliminated in this embodiment. It should be noted that well valve 102 is closed at this time, to prevent air from entering inside inner bag 103 and thus prevent spoilage or contamination of beverage 75, as earlier described when referring to FIG. 29-32.

Figure 34:
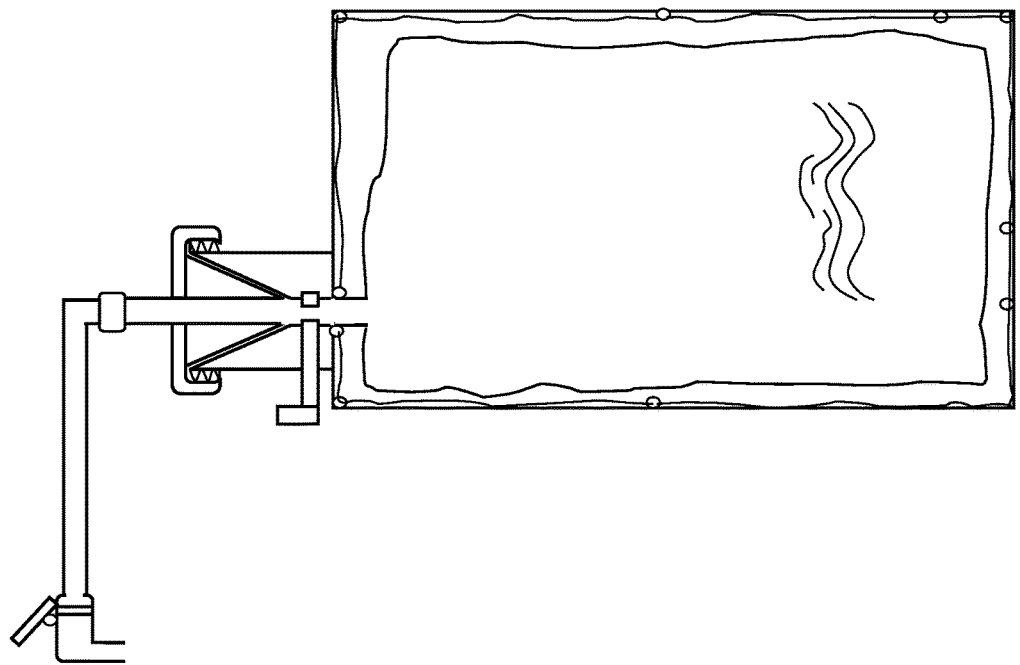
FIG. 34 illustrates a side sectional view of the drink container from FIG. 33, in use, according to an aspect.

FIG. 34 illustrates a side sectional view of the drink container from FIG. 33, in use, according to an aspect. Again, container 10 as described when referring to FIG. 33 is configured to be used without a dispenser 50. This may be very useful for example for limited budget parties, such as family picnics or pool parties, student parties, and so on. As shown in FIG. 34, when a user wishes to use container 10, user may first remove cap 11 (FIG. 33) and replace it with the picnic coupling 105. As shown, the picnic friction coupling 105 may include a male coupling's pipe 22b, a V-shape male coupling 15b and a picnic cap 11b.

The picnic friction coupling 105 may be fastened to the container 10 by simply screwing picnic cap 11b onto the threads 13. It should be noted that an air tight seal is created between V-shape male coupling 15b of the picnic coupling 105 and the V-shape female coupling 15 of the container 10, as earlier described in this disclosure. Next, the user may connect one end of a hose 107, using joint 106, to the upper end of male coupling's pipe 22b. The other end of hose 107, as shown, may have a beverage valve 108 associated with it. The beverage valve 108, may have a gate 108c, which may be lifted to allow beverage flow to picnic beverage spout 109, by pressing down a lever 108a, which is loaded with a spring 108b, to cause the lever 108a to return upon its release, and close the gate 108c.

Next, the user may open well valve 102, such that well valve opening 102a is aligned with the male coupling's pipe 22b. It should be noted that because of the previously established air tight seal between the V-shape couplings 15 and 15b, air will be prevented from entering inner bag 103 and beverage 75.

Next, the user may connect an air pump (shown as 120 in FIG. 38) to air valve 104, and use the pump to push air in the space 109, between the inner bag 103 and liner bag 14. The pumped air in the space 109 will press against inner beverage bag 103, propelling beverage 75 outward via male coupling's pipe 22b and hose 107. Beverage can now be poured via picnic spout 109 by simply pressing down lever 108a of beverage valve 108.

It should be understood that the order of the above steps is just an example. The user may for example pump the air inside container 10 at home, and then, when at the picnic site, open well valve 102 and pour the beverage by opening picnic valve 108.

It should be understood that picnic container 10 can be reusable, disposable and/or recyclable. Same may be true for the picnic friction coupling 105, hose 107 and/or picnic valve 108.

It should be noted that while this disclosure emphasized the use of the described systems and methods for dispensing drinks, similarly, they can be used for dispensing other liquids (e.g., liquid soap, soft serve foods, ice cream, yogurt, etc.).

The beverage container 10 disclosed herein can be made from cardboard, plastic, glass, metal or any combination of these or other suitable materials.

User may enter type of beverage and/or use by expiration date, via control panel or smart phone app, when installing new beverage box and packaging. Dispenser's computer 82 may then automatically calculate expiration date taking into account longer life of beverage because of airtight male and female V-friction coupling and/or not taking the beverage container in and out as it is the case when using a standard refrigerator. For example, open soda, wine, beer, will go flat after a short period when using a standard refrigerator. As another example, milk going in and out of refrigerator shortens beverage life. The airtight system and process disclosed herein extends the life of beverage.

It should be noted that the dispenser controls 63 of each chamber 52 or the smart phone app described earlier in this disclosure, which may be used for example to remotely set beverage pour, may be configured to control a variety of functions and display a variety of data, such as: beverage chamber temperature control setting (each chamber may be individually controlled for temperature); chamber temperature reading display; beverage selection (e.g., carbonated or non-carbonated; hot as in coffee or cold as in soda); beverage low volume alarm; beverage expiration date controls alarm; beverage container in place ready to pour (communicates to users that a mug, glass, cup, travel container or pitcher is in place to receive beverage; if no beverage container is in place dispenser will not dispense selected beverage); two station control valve and sensor for flow direction to pour spout (this multiple pour control allows one beverage keg box, packaging to supply beverage to move than one pour spout); auto select beverage, hot or cold (a hot beverage selection, causes pump to circulates beverage from chamber through element heating coils to heat beverage before entering cabinet housing where flavor pods are positioned, allowing flavored beverages, such as coffee, tea, hot cocoa, or even hot milk to be poured); CO2 PSI pressure control selector switch and gauge system showing PSI; child lock out control preventing children from pouring soda or energy drinks without parent permission; displaying what type of beverage is in which chamber after user enters beverage type (e.g., beer, lite beer, red wine, white wine, milk, soda, diet soda, water, coconut water, energy drink, orange juice, and so on); in a commercial setting, dispenser (see FIG. 25) may be set up to self-serve driver's license reading for age appropriate alcohol requirements (reader determines if self-serve customer is old enough to purchase alcohol; it can also accept self-serve customers credit card or beverage ticket for automated payment for beverage to relieve long beverage line at big event venues such as sporting events and concerts).

FIGS. 35A-35D illustrate side sectional views of four examples of a drink container 10, according to an aspect. As shown, the drink container 10 may be a rectangular box or keg. The keg 10 may be constructed of plant-based bio-plastic, bio-cardboard, regular plastic, regular cardboard, or steel. The keg 10 is preferably constructed from biodegradable materials.

FIG. 35A illustrates a keg 10 that may be used for water or another beverage that does not need to be mixed or stirred. A well tube 22 may extend down into the keg 10, through which liquids or soft serve foods may be drawn.

FIG. 35B illustrates a keg 10 with a mix/stir shaft 30a that may be used for beverages that may need to be stirred or mixed, such as, for example, juices, energy drinks, chocolate milk, pre-mixed cocktails, coffee, tea, lemonade, and so on. The mix/stir shaft 30a may extend down as shown into the container 10. The mix/stir shaft 30a may have several rotating paddle blades 30b to properly mix/stir beverages, cocktails or soft serve-food, ice cream, yogurt, soup, stews, pasta, rice and meat, poultry, fish, smoothies, juice, cocktails and so on.

FIG. 35C illustrates a keg 10 that may be used for soft serve foods such as, for example, ice cream, yogurt, soups, stews, macaroni and cheese, and so on. The keg 10 may include a mix/stir shaft 30a having paddle blades 30b and may have an auger conveyor/lifting silo 110, which may be capable of vertical or horizontal ushering of the food or liquid. The keg 10 may also have a sloped floor 125, which may assist in guiding the soft serve foods to the auger conveyor/lifting silo 110. The keg 10 may also include horizontal ushering 125-a to move soft serve food.

FIG. 35D illustrates a keg 10 that may be used for dispensing tap water, or water found at, for example, a camping site. The keg 10 may be fitted with a biodegradable water filter 111, such that water is poured into the keg 10 through the filter 111 and the keg 10 may then be closed with a removable cap 11. After water is poured into the keg 10 through the filter 111, it may be drawn out through the well tube 22. The well tube 22 may also include a second water filter (not shown), for added protection. The biodegradable water filter 111 may be single use or multiple use. An advantage of the single use filter may be that using the same water filter for an extended period of time may be unhealthy, and may collect impurities. The keg 10 may be constructed in sizes ranging from ½ gallon or smaller to 10 gallons or larger.

It should be understood that a keg may include a plurality of chambers, each of which may include the components shown in FIGS. 35A-35D. Each chamber may house a different type of liquid or food, and may include various components for mixing, for example. As an example, a keg may include two or four chambers with a beverage in some and soft serve food in the other chambers. The various chambers may be used with a dispenser, which may include a bar code reader, a microphone for voice commands, or a user ID scanner, for example. The various chambers may include barriers in between, such that heat or cold are shielded from other nearby chambers.

Figure 36A:
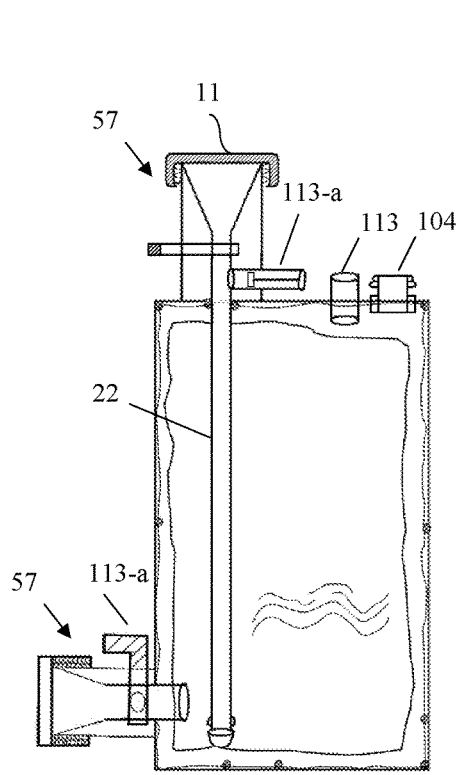
FIGS. 36A-36B illustrate side views of a drink container or keg with a screw-on cap, two couplings, two safety valves, and well tube, according to an aspect.
Figure 36B:
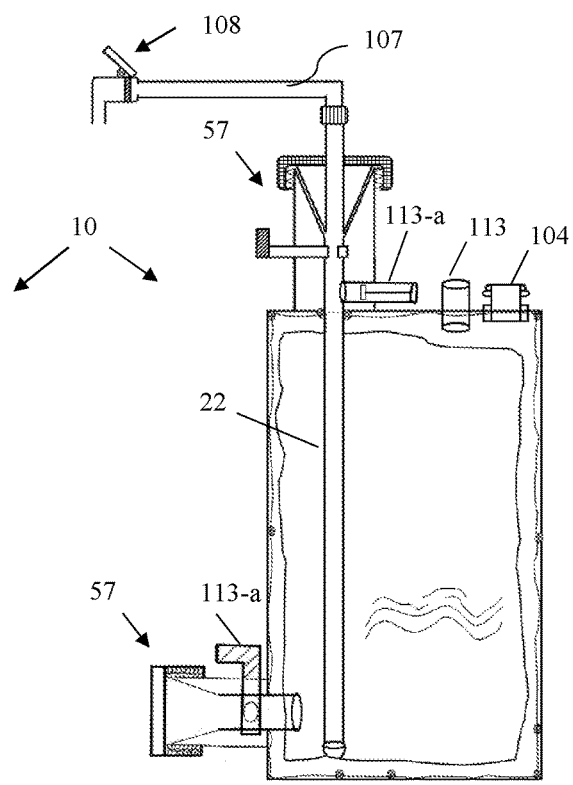

FIGS. 36A-36B illustrate side views of a drink container or keg with a screw-on cap, two couplings, two safety valves, and well tube 22, according to an aspect. The keg 10 may include a pressure relief safety valve 133, and another pressure relief safety valve 113-a at the pour spouts 57. The keg 10 may also include an air valve 104. Again, the user may connect one end of a hose 107, using joint 106, to the upper end of male coupling's pipe 22b. The other end of hose 107, as shown, may have a beverage valve 108 associated with it. The keg may include two pour spouts 57, a pour spout at the top, and another pour spout at the bottom.

Figure 36C:
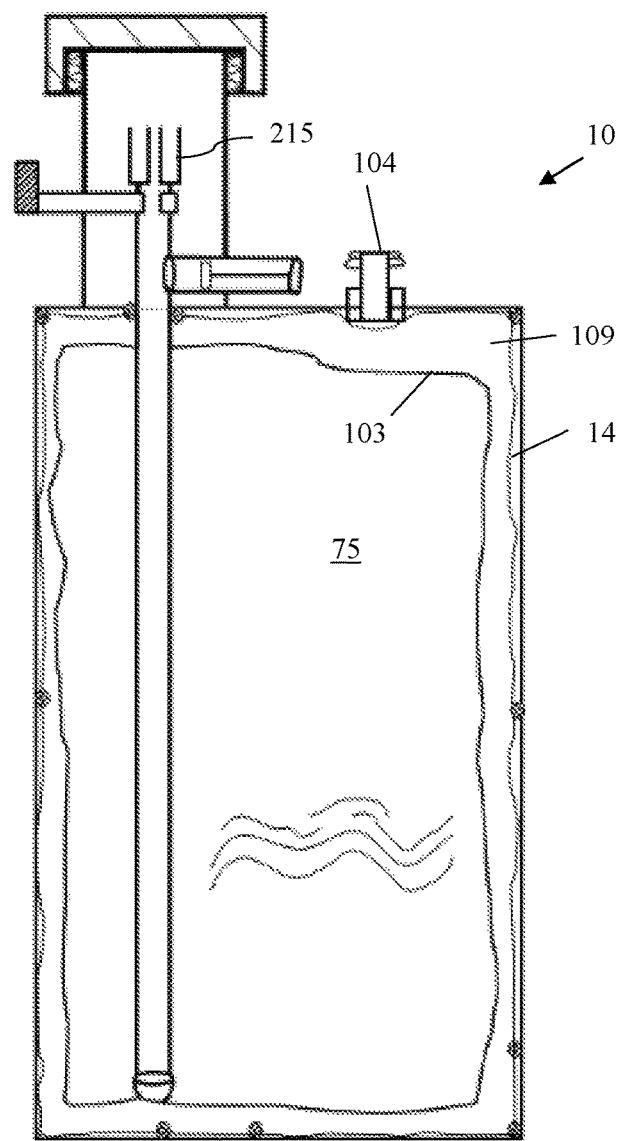
FIG. 36C illustrates a side view of a drink container or keg with a screw-on cap and female cylindrical coupling, according to an aspect.

FIG. 36C illustrates a side view of a drink container or keg 10 with a screw-on cap 11 and female cylindrical coupling 215, according to an aspect. The cylindrical coupling 215 may be a U-shaped channel as shown, which may accommodate a bull-nose male coupling (not shown), for example. The channel may have a concave bottom, or may have a flat horizontal level bottom, as shown. The keg may also include an air valve 104 for, again, pumping air in the space 109 between the liner bag 14 and inner bag 103, and thus force out the beverage 75 inside the inner bag 103.

Figure 36D:
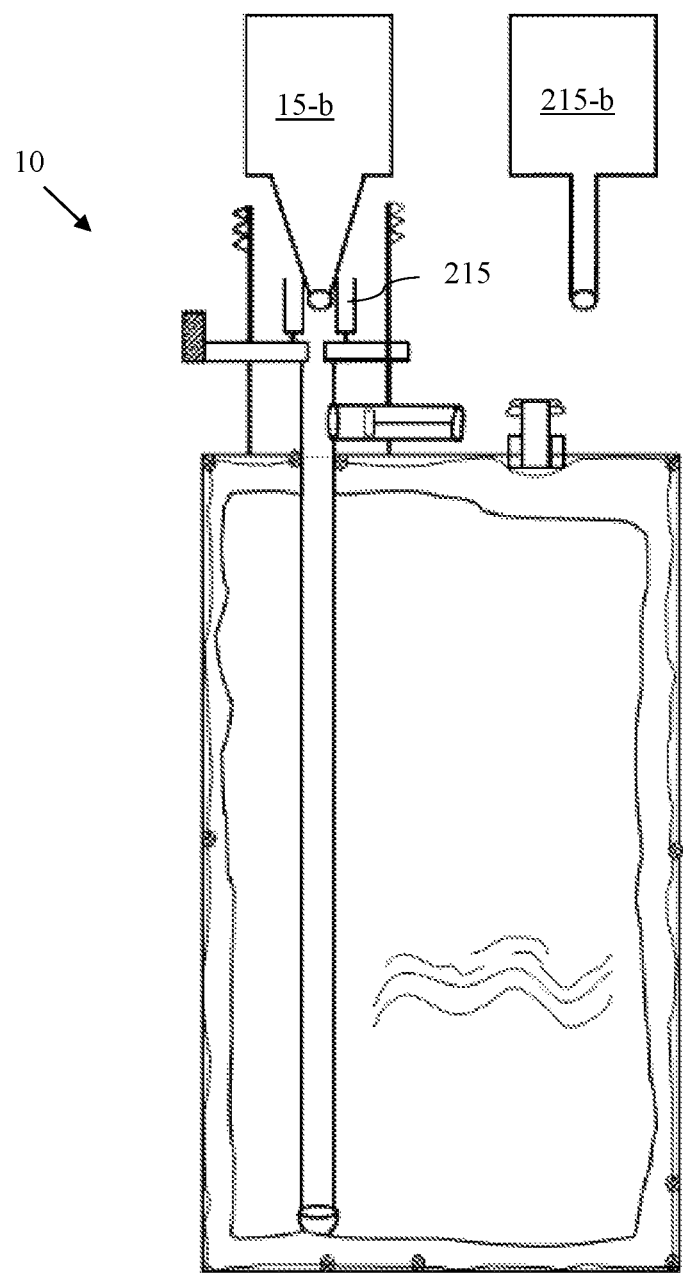
FIG. 36D illustrates a side view of a drink container or keg with a V-shape male friction coupling that may be a part of a factory filling line, according to an aspect.

FIG. 36D illustrates a side view of a drink container or keg 10 with a V-shape male friction coupling 15-b that may be a part of a factory filling line, according to an aspect. The V-shape male friction coupling may be used with a cylindrical female coupling 215. The lid and coupling may also be a male cylindrical coupling 215-b which may correspond to a female cylindrical coupling 215 as shown in FIG. 36C, according to an aspect.

Figure 36E:
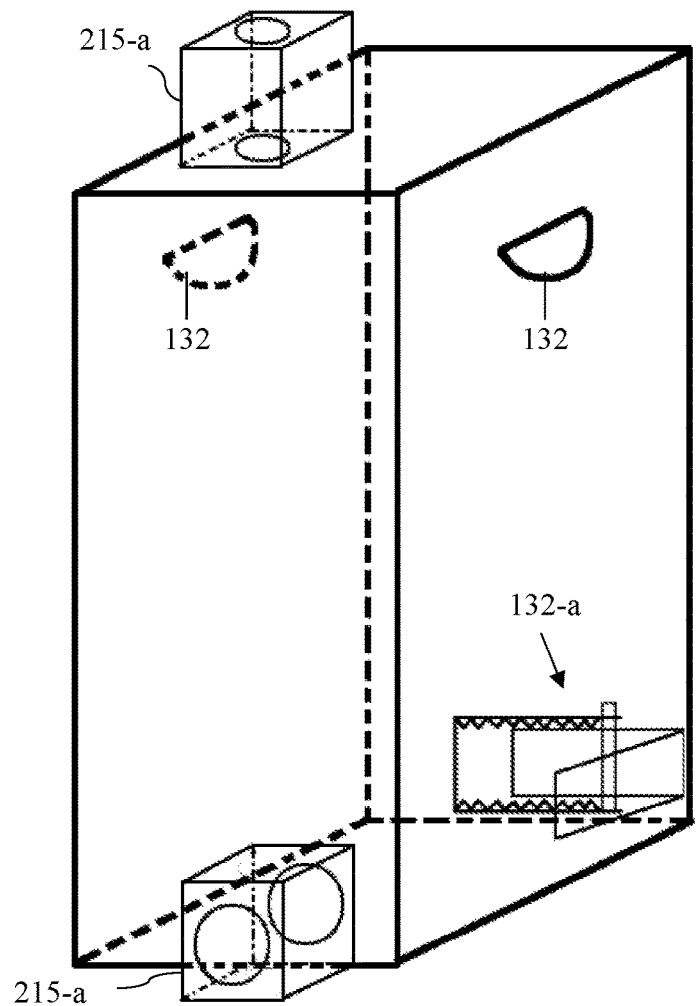
FIG. 36E illustrates a perspective view of a drink container or keg showing examples of where a V-shaped or cylindrical couplings may be placed, according to an aspect.

FIG. 36E illustrates a perspective view of a drink container or keg 10 showing examples of where a V-shaped or cylindrical coupling may be placed, according to an aspect. The female coupling for a receiving a corresponding male coupling, shown by 215-a, may be either V-shaped or cylindrical. The keg 10 may also include handles 132. The keg 10 may also include at least a corner brace 132-a (with some portions not shown for visual clarity, shown in more detail in FIG. 36F), which may be provided at one corner of the keg 10 or more than one corner.

Figure 36F:
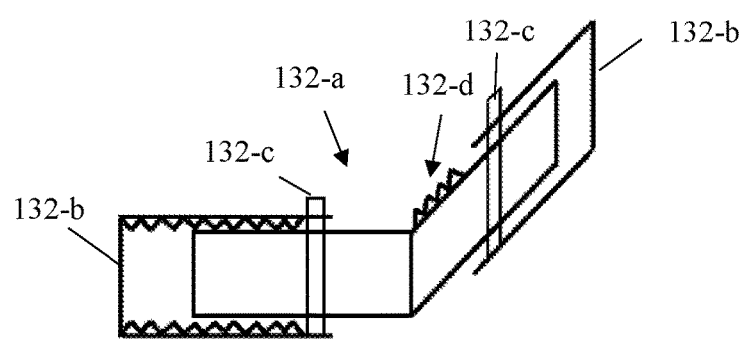
FIG. 36F illustrates a detailed perspective view of the corner brace of FIG. 36E.
Figure 37H:
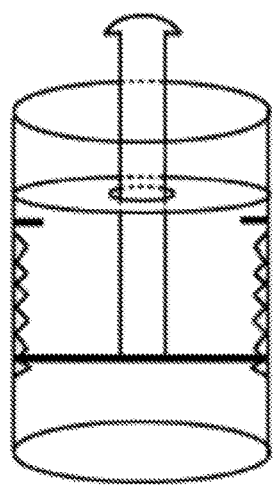
Figure 37I:
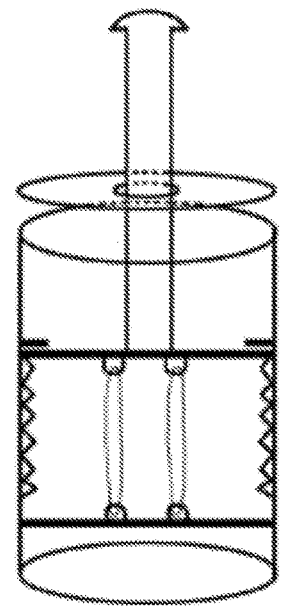
Figure 37J:
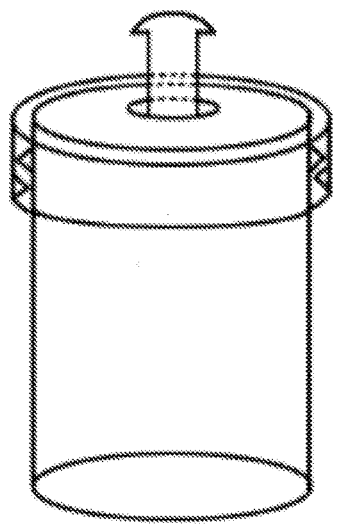
Figure 37K:
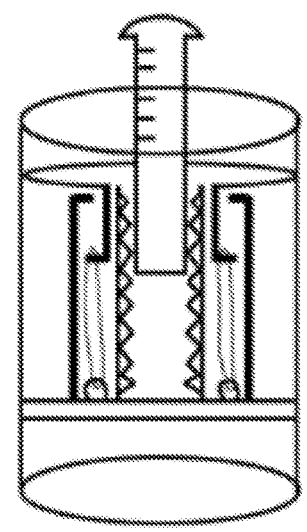

FIG. 36F illustrates a detailed perspective view of the corner brace 132-a of FIG. 36E. The corner brace 132-a may include sliding portions 132-b for extending or adjusting the size of the brace such that the corner brace may be used in different sizes or models of kegs, for example. The sliding portions 132-b may be locked into place with a pin 132-c, for example, or any other suitable means. The corner brace may also include teeth 132-d (not shown in all areas for visual clarity) for the sliding portions 132-b to grip with the main corner brace 132-a.

FIGS. 37A-37K show sectional top perspective views of examples of a bioplastic pressure relief safety valve 113, preferably biodegradable, which may be manually adjusted for different PSI, and may be reset if activated to release pressure inside of the keg, according to an aspect. The resetting may be automatic, and the pressure relief safety valve may "self-reset." As an example, the weight of the top of the safety valve may cause the top portion to be pushed downwards when not forced upwards by pressure inside of the keg. As another example, an actuator within the keg may reset the safety valve cap, and may do so when a sensor detects that the safety valve has been used to relieve pressure. As another example, the resetting may be performed manually by the user. Upon resetting, the safety valve may be configured to maintain the same PSI as previously, or a different PSI. More than one safety valve may be used in one container. For example, one safety valve may be used to release excess pressure in the beverage cavity of the keg 10 where the beverage is stored, and a second safety valve may be in an air cavity where air pressure is used to self-propel the beverage from the keg 10. The pressure relief safety valve 113 may be constructed in a variety of ways, and preferably constructed from the same material as the keg. An advantage may be that this aids in the ease of recycling, and single-stream regenerative recycling may be possible with the components of the safety valve, including springs and rubber bands, constructed entirely of the same bio-plastic material, for example. The user may recycle the entire container without separation of its parts.

FIGS. 37A-37B illustrate side views of a pressure relief safety valve 113-*a* in a closed sealed position and activated open position, respectively, according to an aspect. High pressure may force the valve open, by raising the lid 114 into the activated open position of FIG. 36B to release the excess high pressure. The lid 114 may include spring hinges 115 that may hold arms 116 against the side of the valve 113-*a*. The arms 116 may clip onto a padded or ridged area 117 attached to the side of the valve 113-*a*. The inside of the valve 113-*a* housing may have ridges 118, which may create a friction hold for the lid 114, which may extend down into the housing by a shaft 114-*a*. The lid 114 may also have hooks 114-*b* which may hook into the ridges 118, holding the lid 114 in place. This may also help to hold the lid 114 against seal rings 119. As an example, either the hooks 114-*b* or the ridges 118 may be flexible, such that the hooks 114-*b* may move upwards or downwards past the ridges 118 as needed.

FIGS. 37C-37D illustrate a side view in a closed state and front view in an open state, respectively, of a pressure relief safety valve 113-*b*, according to an aspect. The keg may include two pressure relief safety valves, such that one may be for releasing air and another may be for releasing gas resulting from fermentation. As an example, a pressure relief safety valve 113-*b* may include a long hook or rod 114-*c* that may hook into the ridges 118, holding the lid 114 in place. Again, as the long hook 114-*c* or the ridges 118 may be flexible, such that the long hook 114-*c* may move upwards or downwards past the ridges 118 as needed.

FIG. 37E-37F illustrate a side view and a front view, respectively, of another example of a pressure relief safety valve 113-*c*, according to an aspect. The pressure relief safety valve 113-*c* may include ridges 118 along the sides of the walls, which may catch a rod to keep the safety relief valve open or closed in a desired open or closed position.

FIG. 37G illustrates a front view of another example of a pressure relief safety valve 113-*d*, according to an aspect. The hooks 114-*c* of the safety valve may be raised and lowered by springs 114-*d*.

Figure 38:
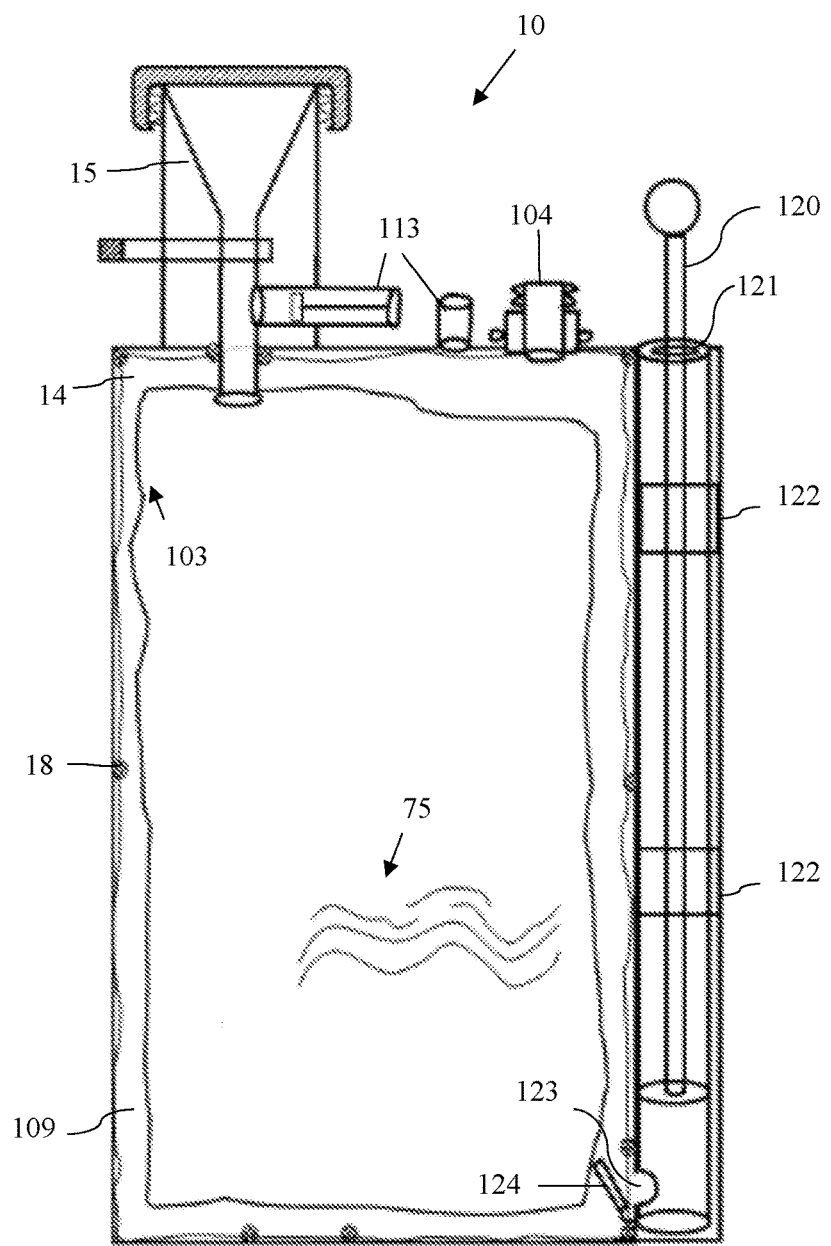
FIG. 38 illustrates a side sectional view of a keg that may self-propel beverages or foods without the need for electricity or carbon dioxide pressure, according to an aspect.

FIG. 38 illustrates a side sectional view of a keg 10 that may self-propel beverages or foods 75 without the need for electricity, according to an aspect. An advantage may be that additional expense for electricity may not be needed, and the keg may thus be portable. The keg may also reduce the carbon footprint by not using electricity or gas to propel a beverage. A user may pump an air pump handle 120, which may force air into the keg in the space 109, between the inner bag 103 (also "beverage bag") and liner bag 14. The pumped air in the space 109 will press against inner beverage bag 103, propelling beverage 75 outward via well tube 22. The air bag may keep air in the air bladder chamber, which may create air pressure against the beverage bag. As air pressure is increased, the pressure may push the beverage 75 up through the V-friction coupling 15. The air pump 120 may be held in place by straps 122, and may be built in to the keg and may be a part of the keg. The air pump 120 may have an intake hole 121 which provides the air needed for the air pump plunger action to fill the air bag inside of the keg. An air exit hole 123 and air pump gate flap 124 may restrict air from leaking out of the air bladder, which may maintain pressure against the beverage. This may aid in strong propulsion of the beverage. One-way air flow may also be provided by the air gate flap 124 as shown, or by a one-way air valve, or ball valve air lock, for example. As an example, the keg 10 may have an outer liner bag 14, or the outer shell may be rigid. The outer liner bag 14 may create a hermetically sealed chamber and may be connected to the keg's inner walls by glue or any other suitable means, and the keg may also include safety pressure relief valves 113. As an example, the keg may include a plastic, solid container instead of an outer liner bag, with a beverage bag 103 inside of it. As the beverage is emptied from the beverage bag 103, the beverage bag 103 will be reduced in volume and may slide up the wall of the keg, forcing the beverage towards the opening in the female V-friction coupling 15, or cylindrical coupling (as shown in FIG. 49A as 215). Again, the plastic liner bag 14 is preferably fastened, using glue for example, to the interior wall (as shown as 24 in FIG. 2) of the container 10 at several fastening locations 18, including the corners of the container 10. An air nipple or air valve 104 may be used in order to automatically keep air pressure in the air chamber at a constant automated pressure. The air nipple or valve 104 may be used in a keg with or without an air pump 120. It should be understood that the keg may be used with or without an electric air compressor, or with or without a hand air pump.

FIGS. 39A-39C illustrate various examples of a keg 10 that may self-propel liquids or soft-serve foods with or without an external energy source, according to an aspect. The keg 10 may include a pour spout opening 57 (not shown in FIG. 39B for clarity), which may accommodate a V- or cylindrically-shaped friction coupling (not shown for clarity). The keg may have a sloped floor 125 directing liquids or foods to the pour spout opening and an auger conveyer/lifting silo 110. As shown in FIG. 39A, the sloped floor 125 may be in a V-shape such that the liquid or food is directed to the center point of the pour spout. The sloped floor 125 may be fixed or may move. As shown in FIG. 39B, the interior of the keg 10 may be cone-shaped as shown by 125-*a* to direct food or liquids towards the auger screw conveyor 110. As shown in FIG. 39C, the sloped floor may also be raised by a spring 128. To lift and create a sloped adjustable floor inside of the keg 10 for gravity flow of liquids or foods, the bottom plate may increase its slope as the liquids or foods are drained from the keg. The lifting pressure may be created by the rubber bands or springs to lift the bottom plate. The examples of kegs shown in FIGS. 39A-39B may need an external energy source to power the auger, and the example of the keg shown in FIG. 39C may not need an external energy source.

FIG. 40A illustrates an example of layered board 150 that may be used for the construction of a keg 10. The layered board 150 may be constructed from bio-plastic, wood, cardboard, steel, or any other suitable materials. The layered board 150 may be used as a lifting pressure plate, and may be used to hold the top plate of the keg 10, coupled together for lifting strength. The layered board 150 (shown without layers in FIGS. 40B-40D for clarity) may form the top of the keg 10.

FIG. 40B illustrates an example of a keg 10 that may self-propel beverages or foods using side wall pressure plates 24-*a*, according to an aspect. The side wall pressure plates 24-*a* may be bio-plastic or any other suitable material. The keg 10 may include a V-shaped or cylindrical friction female coupling 215-*a* for receiving a corresponding male coupling. The coupling 215-*a* may include a safety relief valve 113-*a* and may include a petcock valve 102. It should be understood that all friction couplings may include a safety relief valve 113-*a* and may include a petcock valve 102. The side-to-side propulsion may be achieved by the side wall pressure plates 24-*a* pressing against the beverage bag 103. To assist the side wall pressure plates 24-*a* sliding along the top and bottom of the keg 10, the side wall pressure plates 24-*a* may be fitted with, for example wheels 140, or as another example, skis (not shown). The side wall pressure plates 24-*a* may also be assisted in sliding by fitting into guide pins (not shown), or be free floating, as shown. Side-to-side propulsion may also be achieved by springs 151 applying pressure to the beverage bag 103, which may be, for example, a plastic bag, or a balloon bladder, which may be similar to a water balloon. The springs 151 may push between the outer walls of the keg 10 and the side wall pressure plates 24-*a*. A second bio-plastic outer side wall 24-*b* (shown on the right side of FIG. 40B only for clarity) may be needed on the inside of the keg wall to press against the side wall pressure plates 24-*a* inside of the keg wall.

FIG. 40C illustrates an example of a keg 10 that may self-propel beverages or foods using a gravity flow sloping floor plate 152 to lift one end of the beverage bag 103 at the bottom of the keg 10, according to an aspect. The floor plate 152 may be lifted, such that the elevation may create a sloping floor to direct the liquid or food in the beverage bag 103 towards the pour spout 57, which may also include a safety relief valve 113-*a* and may include a petcock valve 102. The floor plate may be lifted using elastic bands 139 which may be bio-rubber or any other suitable material. The elastic bands 139 may be attached to eyehooks 139-*a*, which may be round as shown, or may any other suitable shape. The elastic bands 139 may, through pressure, lift the sloping floor plate 152 as the weight of the beverage bag 103 decreases when beverage is removed from the container. When the floor plate 152 is lifted, the beverage bag 103 may be pressed against a stationary top plate 152-*c*, to help release the bag's contents.

FIG. 40D illustrates a self-propelling keg 10 having a lifting floor plate 152-*a*, according to an aspect. The lifting floor plate 152-*a* may be positioned at the bottom of the keg 10 as a bottom plate, and may be raised and push the contents of the beverage bag 103 by pressure applied by elastic bands 139-*a*, which may be connected to eye hooks 139-*a*, as discussed when referring to FIG. 40C. The eye hooks 139-*a* may be attached to the top plate 152-*c* on the other end of the keg, which may be stationary. The weight of the beverage inside of the beverage bag 103 may be lessened as the petcock valve 102 of the coupling 215-*a* is opened, and thus the lifting floor plate 152-*a* may be raised. Again, when the lifting floor plate 152-*a* is raised, the beverage bag 103 may be pressed against a stationary top plate 152-*c*, to help release the bag's contents.

Figure 40E:
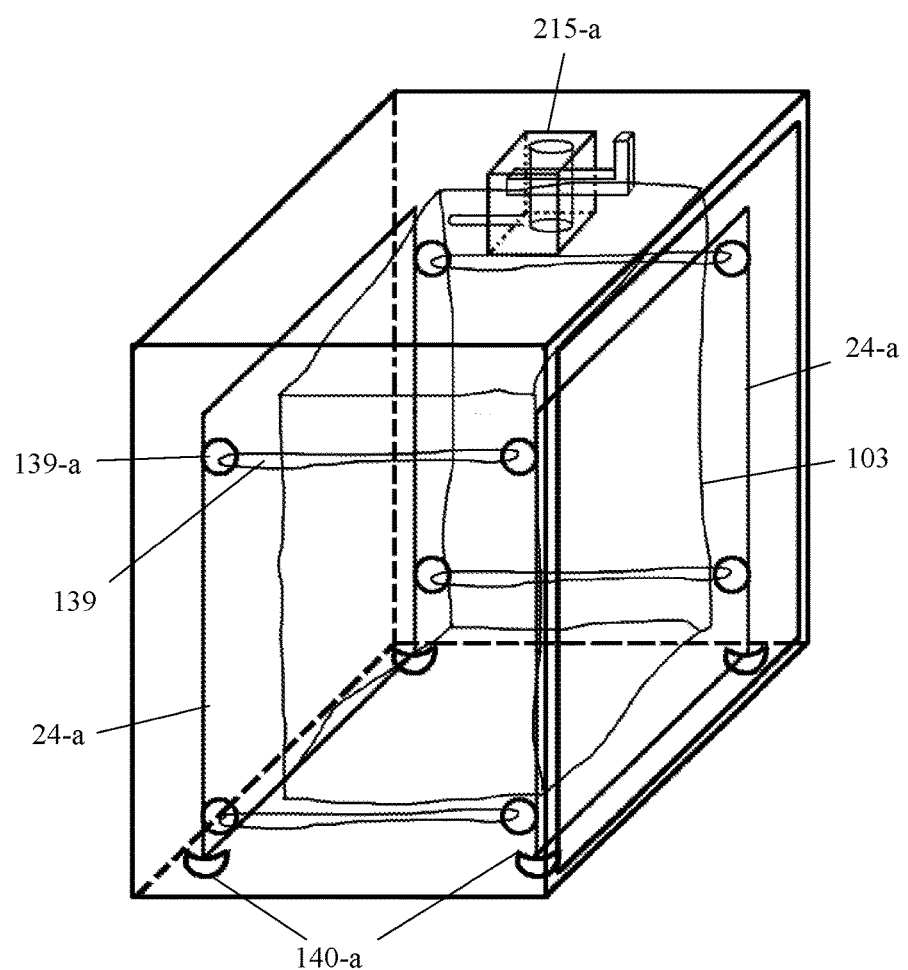
FIG. 40E illustrates a self-propelling keg having side walls, according to an aspect.

FIG. 40E illustrates a self-propelling keg 10 having side walls 24-*a*, according to an aspect. The keg 10 may contain a bio-plastic bladder-type bag 103 upon which the side walls 24-*a* may push from two sides, to evenly push liquid or beverage out from the friction coupling 215-*a*, which may be associated with a pour spout for pouring out the contents of the keg. The two side walls 24-*a* may be held together by elastic bands 139 hooked into eye hooks 139-*a*, for example, and be held in place by the inner bag 103 The side walls 24-*a* may then squeeze together as the contents of the inner bag 103 are released and the volume of the bag 103 decreases. The side walls 24-*a* may be on skis 140-*a* in order to facilitate sliding across the bottom of the keg 10. As another example, wheels 140 (as shown in FIG. 40B) may also be used for the side walls 24-*a*.

Figure 40F:
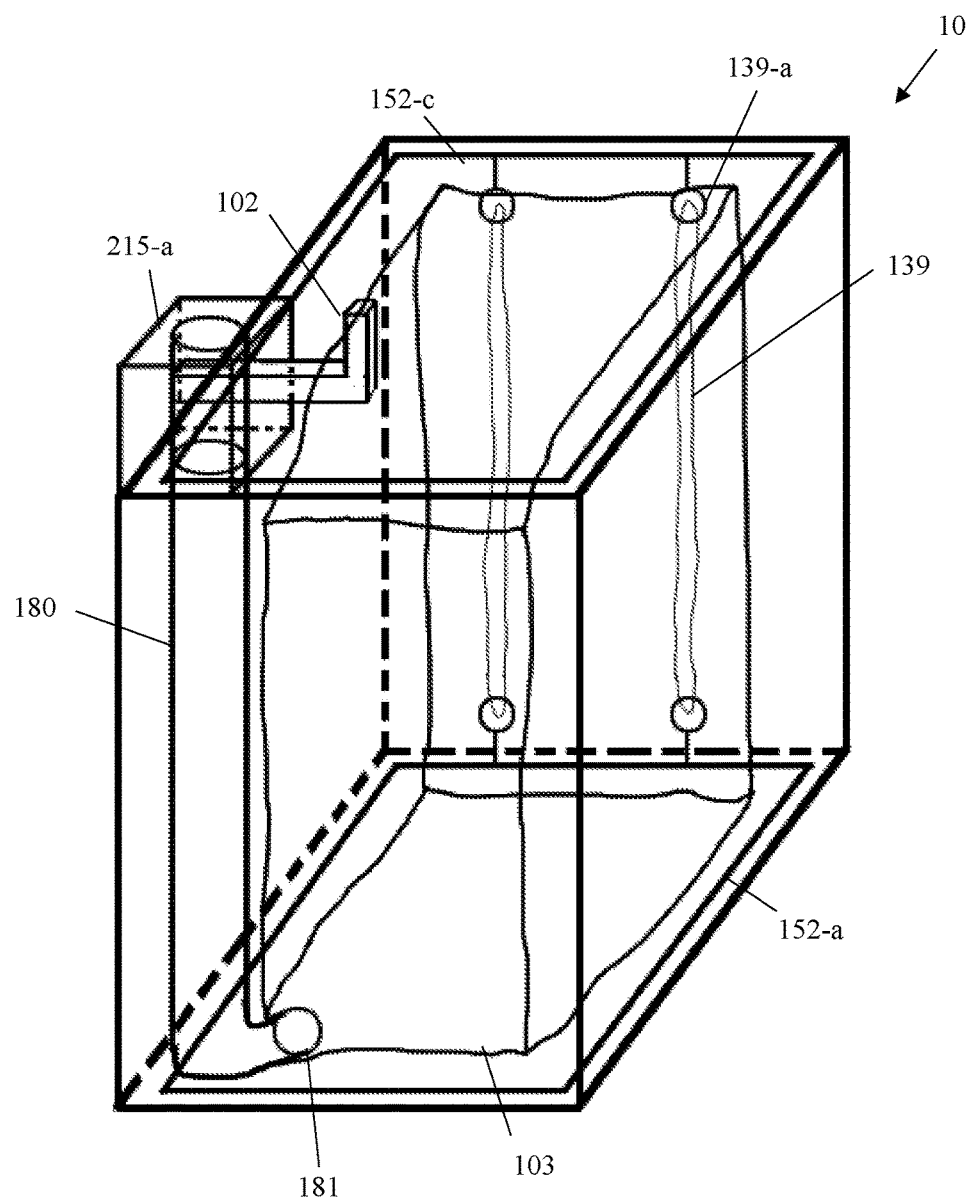
FIG. 40F illustrates a self-propelling keg having a moveable top plate at the top and a stationary bottom plate, and a flexible hose, according to an aspect.
Figure 40G:
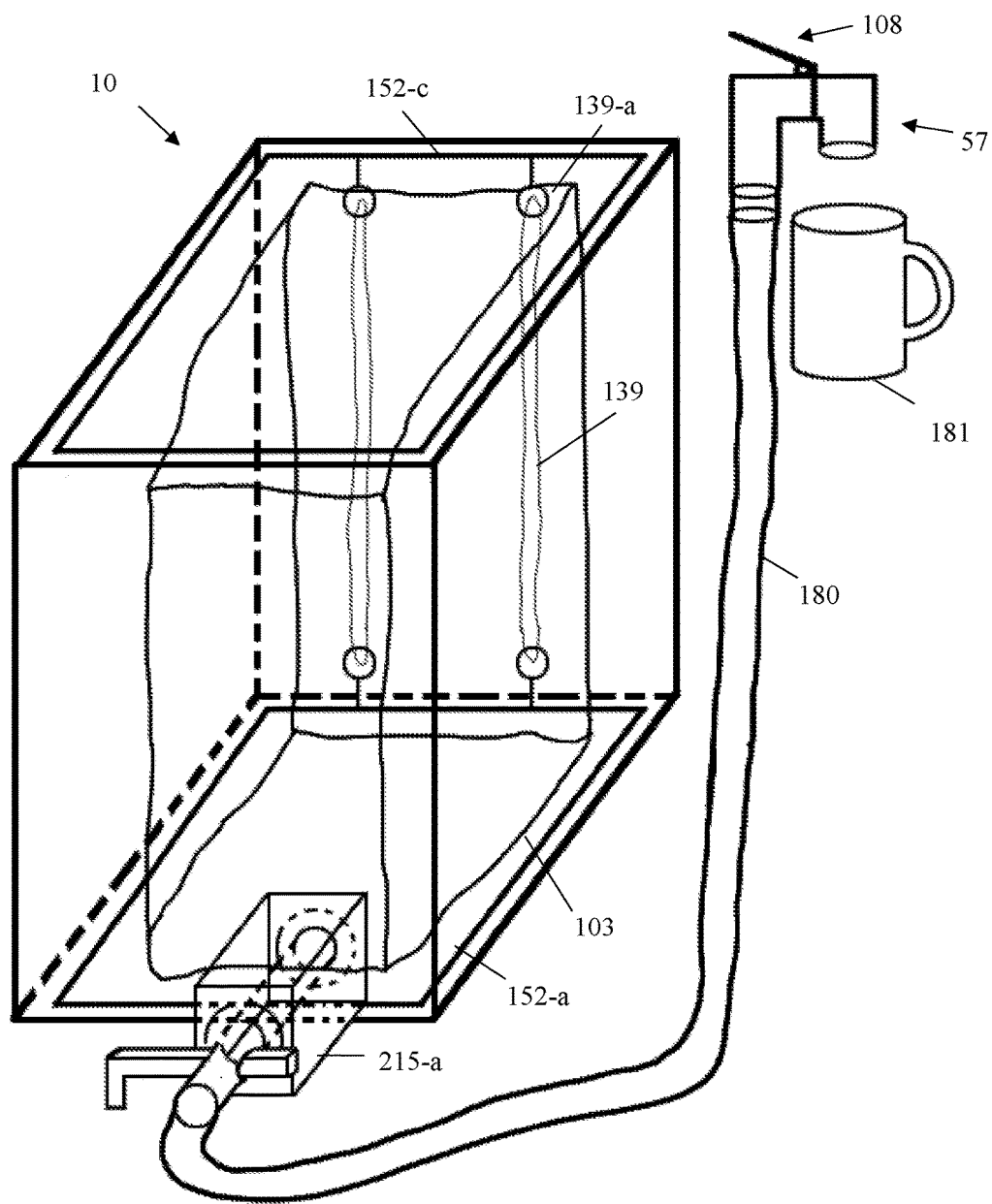
FIG. 40G illustrates another example of a self-propelling keg with a flexible hose connected to a bottom coupling, according to an aspect.

FIG. 40F illustrates a self-propelling keg 10 having a moveable top plate 152-*c* at the top and a stationary bottom plate 152-*a*, and a flexible hose 180, according to an aspect. Again, the keg 10 may include a V-shaped or cylindrical friction female coupling 215-*a* for receiving a corresponding male coupling. The coupling 215-*a* may include a safety relief valve 113-*a* (as seen in FIG. 40B) and may include a petcock valve 102. Similar to the keg shown in FIG. 40D, the beverage bag 103 may be pressed downwards onto the bottom plate 152-*a*, by the downward force of the top plate 152-*c* moving downwards. The top plate 152-*c* and the bottom plate 152-*c* may be held together by eye hooks 139-*a* and bands 139 (shown only in rear of FIG. 40F for visual clarity, and also shown in the example of FIG. 40G) such that the keg 10 may self-propel the contents of the bag 103 as it is emptied. As the top plate 152-*c* presses downwards on the bag 103, the contents of the bag may be propelled through a flexible hose 180, which may be attached to the bag 103 at a joint or hole 181. The hose 180 may then connect to a female coupling 215-*a* through which the contents of the bag 103 may be dispensed. The flexible hose 180 may, as an example, connect to a coupling at the top of the keg 10 with another outer flex hose, which may connect to a gate valve (as shown in FIG. 40G). As shown as an example, the flexible hose 180 may be included inside of the keg 10.

FIG. 40G illustrates another example of a self-propelling keg 10 with a flexible hose 180 connected to a bottom coupling 215-*a*, according to an aspect. Again, the keg 10 may self-propel by a downward-pressing top plate 152-*c*, for example, exerting pressure onto a bag 103. The downward pressure may push a beverage or food out of a coupling petcock valve 215-*a*, which may be located towards the bottom of the keg 10. The coupling 215-*a* may have a flexible hose 180 attached to it, through which a beverage or food may be dispensed as the weight of the bag 103 contents are pushed down by gravity and by the downward force of top plate 152-*c*. With the assistance of the force of gravity, less pressure tension is required on the rubber bands 139. The bands 139 and eyehooks 139-*a* may be provided at one end of the keg 10 or may be provided at more than one end of the keg 10 (shown only in rear of FIG. 40G for visual clarity). The end of the hose 180 may be attached to a pour spout having a gate valve, which may then dispense a food or beverage into a cup 181. As an example, the bag 103 may be capable of holding 10 gallons, the weight of which may be approximately 90 pounds with downward pressure. With downward movement instead of upward, less tension may be exerted on the bands 139. As shown as an example, the flexible hose 180 may be outside of the keg 10.

The beverage bag 103 of FIGS. 40B-40G may be of an elastic type material that may expand. The elasticity may add propulsion force, which may help to lift or push the beverage towards the pour spout 57 or coupling 215-*a*. The keg 10 may have multiple pour spouts 57 such that the user may position the keg 10 in different ways. No external energy source may be needed to propel or dispense a beverage or food from the container when pressure is applied to the beverage bag 103.

It should be understood that any keg 10 may include any combination of couplings, pressure relief safety valves, mixing paddles, and any other feature described herein.

Figure 41A:
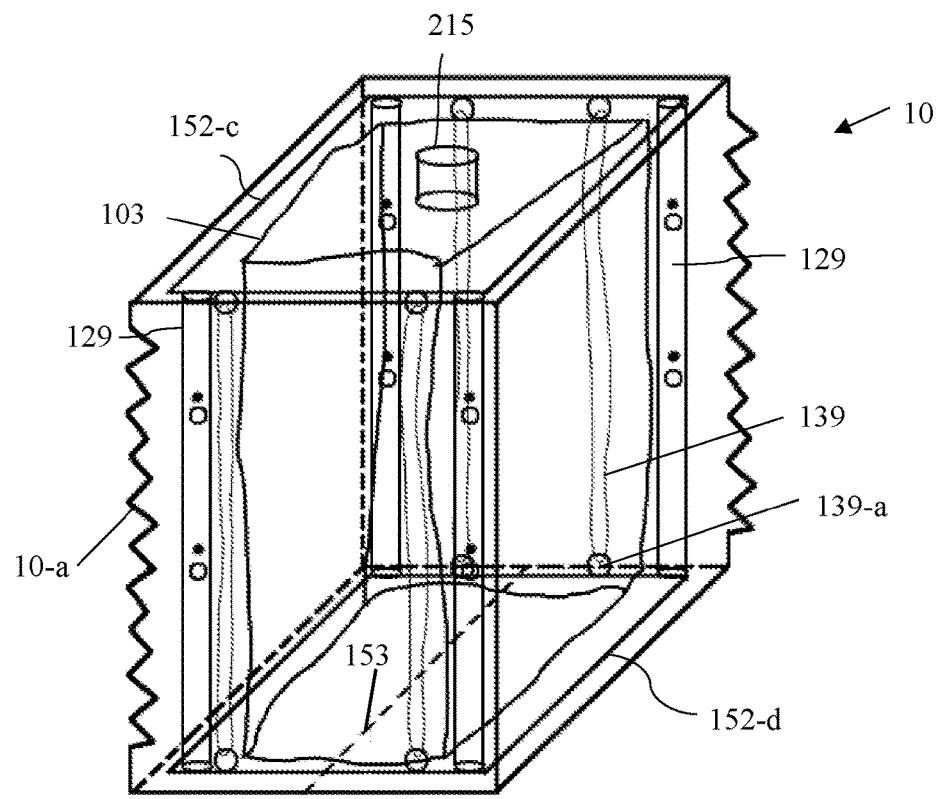
FIG. 41A illustrates a self-propelling keg having telescoping legs and in a filled state, according to an aspect.

FIG. 41A illustrates a self-propelling keg 10 having telescoping legs 129 and an accordion outer shell 10-*a*, in a filled state, according to an aspect. A keg having telescoping legs may or may not have an accordion outer shell 10-*a*. It should be understood that the keg 10 having telescoping legs 129 may also include any of the other features described herein, such as, for example, a coupling 215, and elastic bands 139 and eyehooks 139-*a*. The keg may include a top plate 152-*c* and a bottom plate 152-*d*. The plates may squeeze the inner bag 103 that may contain a liquid or food.

As the top plate 152-c and bottom plate 152-d work together, the inner bag 103 may be squeezed evenly to push all of the contents of the inner bag. The telescoping legs 129 may allow for the keg to be collapsible, to be stored and shipped flat. For example, the outer shell 10-a may be flattened or collapsed by using the accordion folds, and then the keg may also be folded into a smaller shape by folding along seams such as seam 153. The telescoping legs 129 may act as stanchion posts, supporting the structure of the keg 10, by connecting to the top plate and the bottom plate inside of the keg 10. In another example, posts that are fixed in length may be used in place of the telescoping legs 129. When fully extended, the legs 129 may be used to support the vertical stacking of the keg when it is full of products such as beverages or food. The keg 10 may be constructed of any suitable material that may be folded or collapsed, and again, may include seams for collapsing the keg 10, such as at 153. The outer shell 10-a of the box may expand similarly to an accordion, due to its accordion-like folds (shown on two edges of outer shell only for clarity), when the legs telescope and extend. When the legs collapse, the accordion box may compress. Thus, the accordion box and telescoping legs may assist in the keg taking up less space than a traditional steel or plastic keg. As an example, a keg 10 may be constructed by folding full folds of box sides over one another, such that an entire side of the keg 10 has two layers of cardboard or any other suitable material the keg may be constructed from. Multiple pieces of the adhesive used to secure the folds may be overlapping with each other for added durability.

Figure 41B:
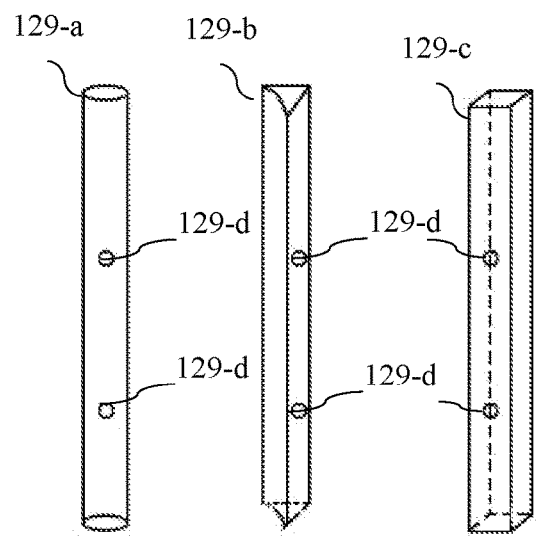
FIG. 41B illustrate three examples of telescoping legs, according to an aspect.

FIG. 41B illustrate three examples of telescoping legs 129-a-129-c, according to an aspect. The telescoping legs may be constructed in a variety of ways as shown, or in any other suitable design. The legs may also be fixed as an alternative to telescoping. The legs may be constructed from any suitable materials, such as metal, cardboard, bamboo, and so on. The telescoping legs 129-a-129-c may be locked into a desired length by fitting pegs or pins (not shown) that may be pushed into a hole 129-d. The pegs or pins may be spring-loaded and may snap or lock into place when inserted into a hole 129-d. The legs may be extendable without being telescoping, such as, for example, by having accordion folds, or any other suitable means.

Figure 41C:
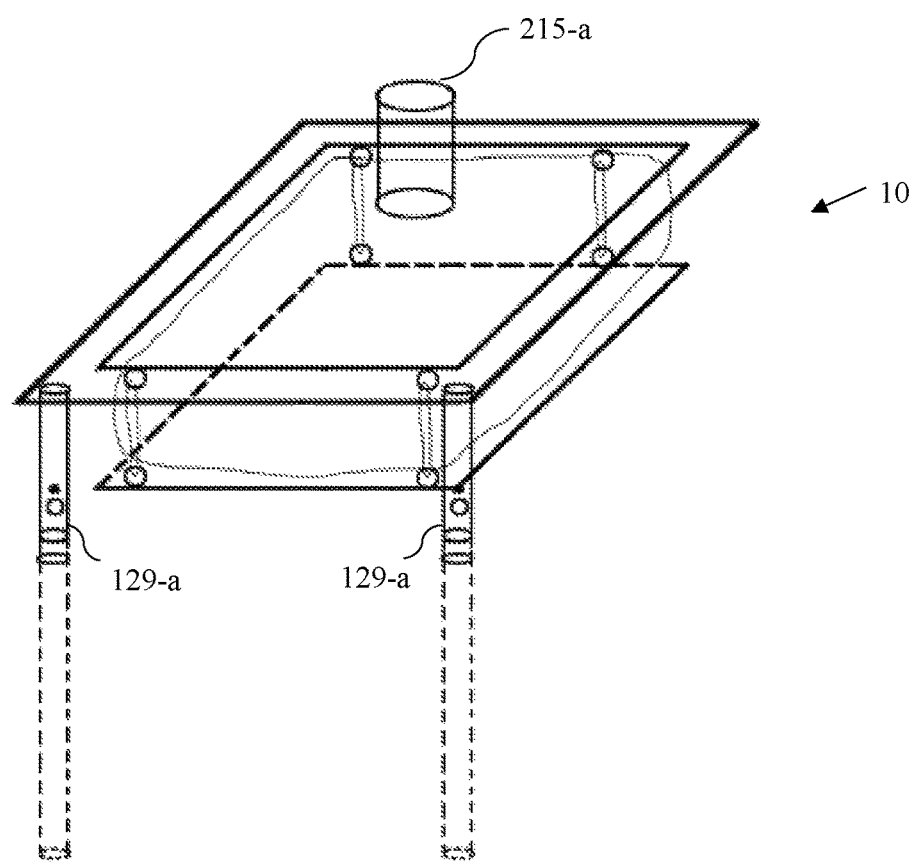
FIG. 41C illustrates an example of a keg in an empty state, with a frame having legs, showing the telescoping feature of the legs, according to an aspect.

FIG. 41C illustrates an example of a keg 10 in an empty state, with a frame having legs, showing the telescoping feature of the legs, according to an aspect. The telescoping legs 129 may be used for collapsing or folding the keg 10 such that the keg may be shipped or stored in a flat state, in an accordion box or flat packed in a folding box.

Figure 42A:
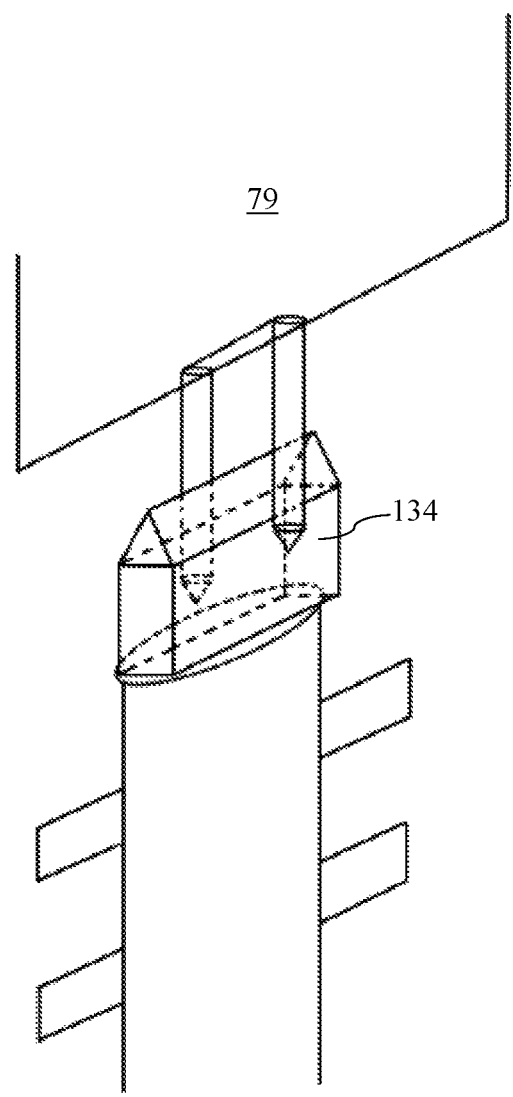
FIG. 42A illustrates a motor and motor shaft that may be associated with the auger screw conveyer shaft or paddle shaft, according to an aspect.

FIG. 42A illustrates a motor 79 and motor shaft that may be associated with the auger screw conveyer shaft or paddle shaft, according to an aspect. Motors may be connected to shafts or fixtures that they are to drive by hard connections. These type of connections may not be quick release or quick engage. Some other types of motors may be connected to a clutch, which may wear down after prolonged usage. The coupling may be made with a friction shaft fin 134 ("fin" or "fin pin"). The friction motor to shaft coupling may be a pin-fin friction coupling wherein the driving fin shaft may either slide into two pins on the end of the auger or paddle shaft, or the opposite may occur where the driving shaft may have two pins. The top of the fin 134 may be beveled to a pointed or triangular tip, as shown. An advantage of the beveled tips of the fin and pin may be that the fin and pin are prevented from butting together. If this occurs, then friction coupling cannot be completed. The motor driving shaft and the work-utility shaft may be free-wheeling, able to move and rotate to the side, which may allow the wedges to drive past each other to create a friction coupling. Another advantage may be that the container of food or drink in the keg 10 may be quick-change, and easily removed by the user so that it may be replaced with a new one. Another advantage may be that the inclusion of paddles within the keg itself may reduce mess and the need for cleaning, as a beverage or food may no longer need to be transferred into a separately container that has paddles.

FIGS. 42B-42D illustrate a side top perspective view, a top perspective view, and a top plan view, respectively, of an example of a motor coupling 135-a having a ridged cylinder design, according to an aspect.

Figure 42E:
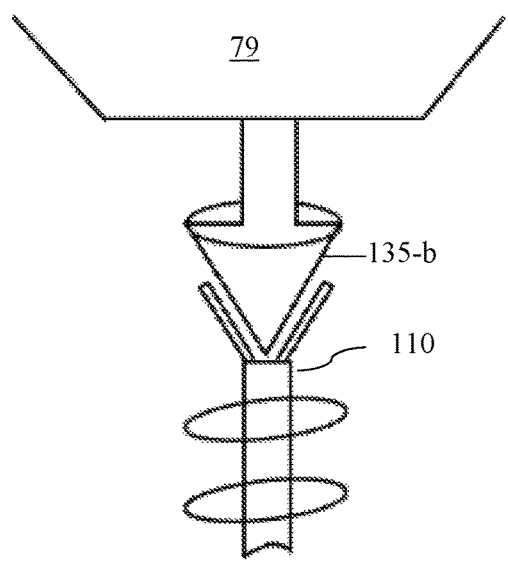
FIG. 42E illustrates a side perspective view of a motor coupling having a rough surface funnel design, according to an aspect.

FIG. 42E illustrates a side perspective view of a motor coupling having a rough surface funnel design, according to an aspect. The motor 79 may through the coupling 135-b drive the auger silo 110.

Figure 42F:
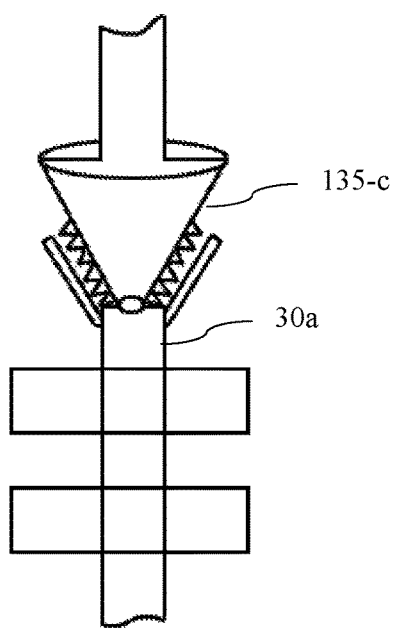
FIG. 42F illustrates a side perspective view of a motor coupling having teeth on the surface for gripping, according to an aspect.

FIG. 42F illustrates a side perspective view of a motor coupling having teeth on the surface for gripping, according to an aspect. The coupling, powered by a motor 79, may drive a paddle shaft 30a.

Figure 43A:
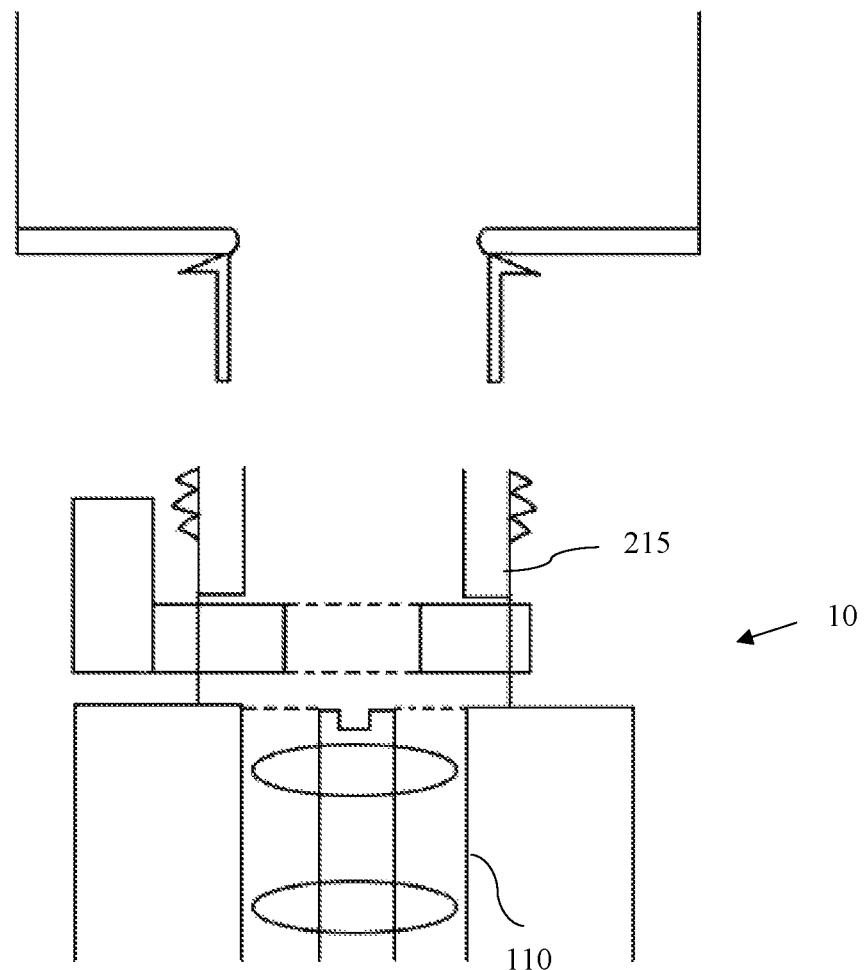
FIG. 43A illustrates a detailed partial side view of the keg of FIG. 35C, which may include an alternative example of a top opening and friction coupling, according to an aspect.

FIG. 43A illustrates a detailed partial side view of the keg 10 of FIG. 35C, which may include an alternative example of a top opening and friction coupling 215, according to an aspect.

Figure 43B:
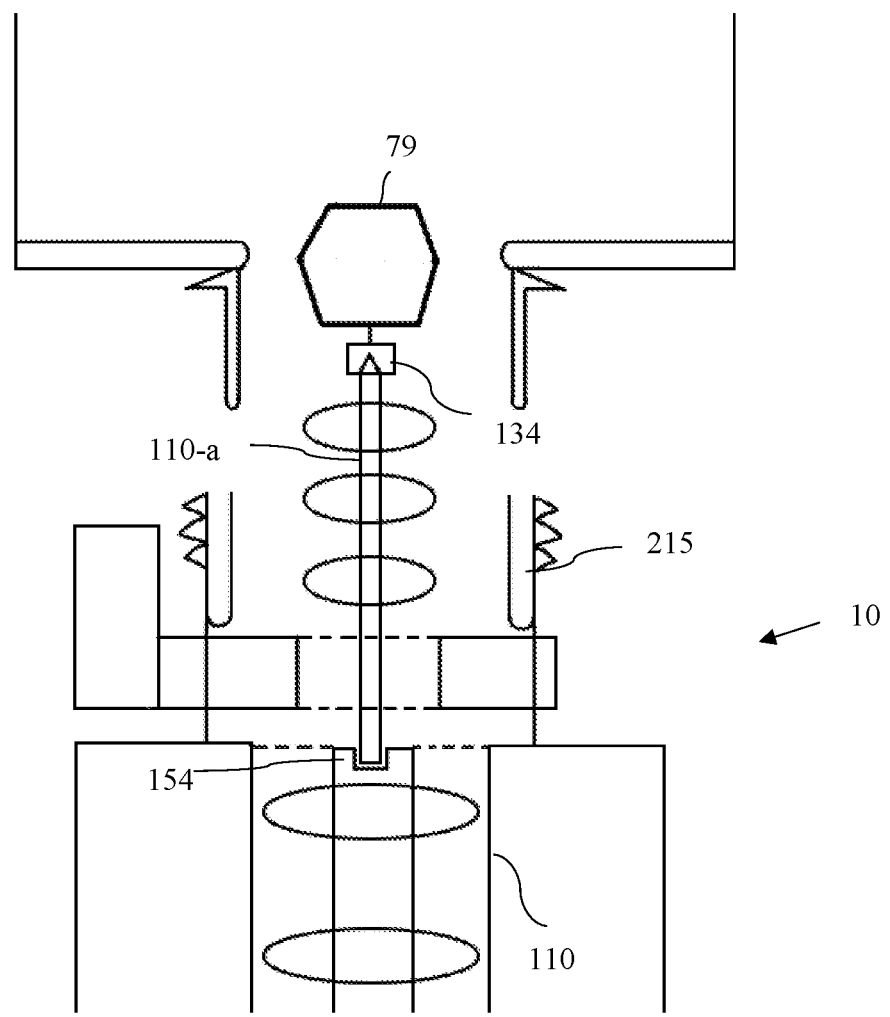
FIG. 43B illustrates a detailed partial side view of the keg as shown in FIG. 43A, with a motor and upper auger coupling associated with the auger, according to an aspect.

FIG. 43B illustrates a detailed partial side view of the keg 10 as shown in FIG. 43A, with a motor 79 and upper auger 110-a coupling associated with the auger 110, according to an aspect. The motor 79 may be associated with a fin pin 134, which may connect with an upper auger 110-a. The upper auger 110-a may be the driving auger, and may drive the auger 110. The friction coupling may be a vertical slot and may be cylindrical, with a sleeve where the top fin-pump male friction coupling glides into the sleeve slot 154 of the keg 10, similar to a male coupling into a female coupling. The wide opening of the fin male vertical coupling may be needed to allow the auger screw conveyer 110 to move in and out of the keg and connect to the lifting auger screw conveyor, and may also allow the driving auger to connect to the lifting auger in the keg.

Figure 44A:
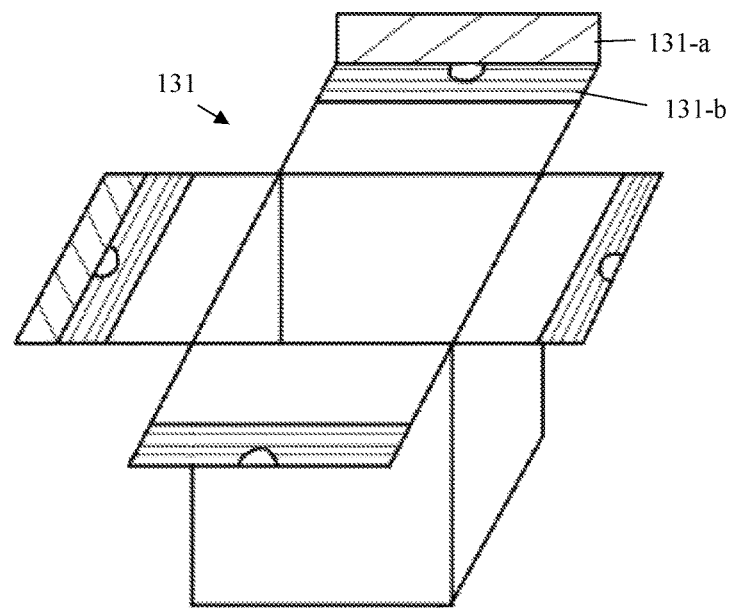
FIGS. 44A-44B illustrate a box, with the top unfolded and partially folded, respectively, constructed of bio-cardboard that may make up the outer shell of a keg, which may have a bio-plastic bag or bio-plastic bottle inside, according to an aspect.
Figure 44B:
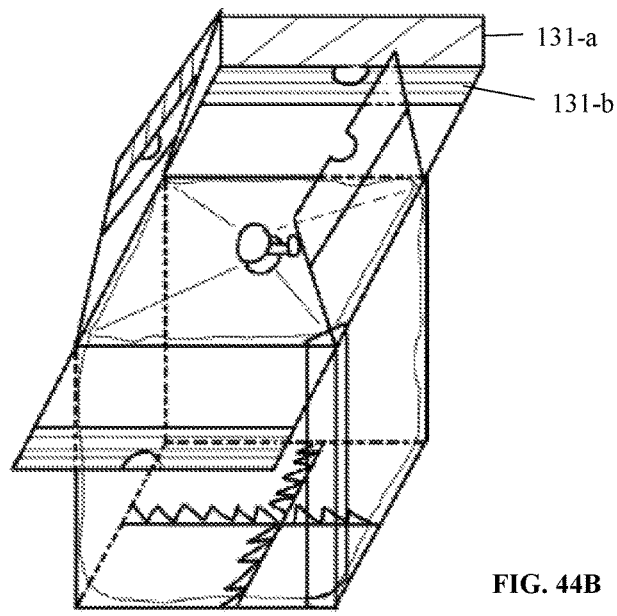

FIGS. 44A-44B illustrate a box 131, with the top unfolded and partially folded, respectively, constructed of bio-cardboard that may make up the outer shell 131 of a keg, which may have a bio-plastic bag or bio-plastic bottle inside (shown only in FIG. 44B for clarity), according to an aspect. The bio-cardboard keg may be printed with eco-friendly ink and eco-friendly glue or tape strips. Where adhesive is pre-applied to the box flaps or folds, as shown by 131-a and 131-b, a protective film may be placed over it and removed when the adhesive is needed. The protective film may be biodegradable. An advantage of the box may be that the beverage contained inside may be protected from UV sunlight. An advantage of the adhesive may be that boxes may be flat-packed for storage or shipping and later easily assembled. An advantage of having overlapping strips of adhesive 131-a and 131-b may be that the strength of the box is increased. The boxes may be constructed such that a user may assemble the boxes when needed, and may be folded along seams and glued or taped together with pre-applied glue or tape strips, for example. The folds of the box may overlap such that the strength of the box is increased. The box may include telescoping legs (as shown by 129-a in FIGS. 41B-41C) that allow for the box to be collapsed flat, and then re-assembled by the user. An advantage may be that a separate tape dispenser and/or knife for tape is not needed by the user.

Figure 45A:
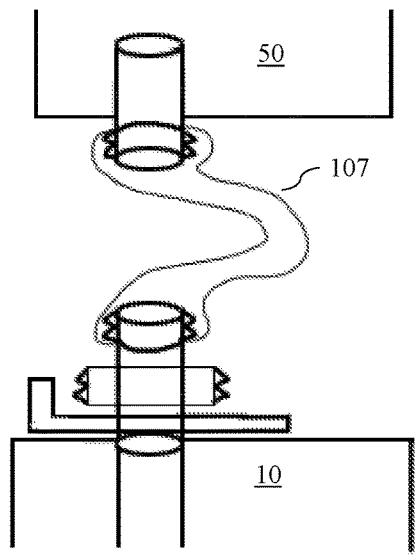
FIG. 45A illustrates a partial sectional side view of a keg connected to a beverage dispenser by a flexible bio-plastic or rubber hose/tube, according to an aspect.

FIG. 45A illustrates a partial sectional side view of a keg 10 connected to a beverage dispenser by a flexible bioplastic or rubber hose/tube 107, according to an aspect. The bio-plastic friction coupling of the hose/tube 107 on the keg 10 may be pushed on or pulled off.

Figure 45B:
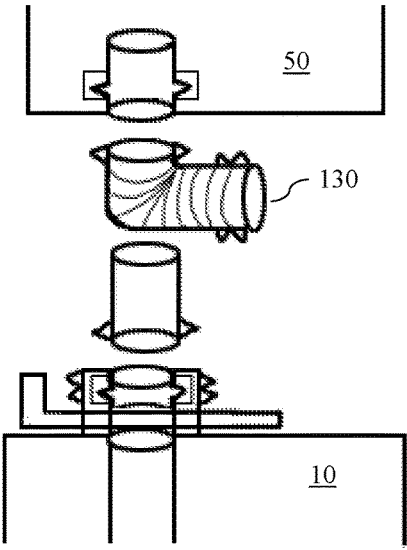
FIG. 45B illustrates a bio-plastic elbow, which may be used where space is limited in the beverage dispenser, according to an aspect.

FIG. 45B illustrates a bio-plastic elbow 130, which may be flexible, which may be used where space is limited in the beverage dispenser, connecting a dispenser 50 with a keg 10, according to an aspect. An advantage may be that the elbow allows flow of liquids where a hose/tube 107 may restrict liquid flow if bent at an angle. The keg 10 may include a straight twist lock coupling as part of the pump housing or as part of the keg pour spout opening.

Figure 45C:
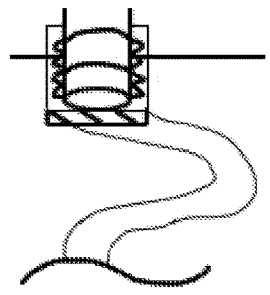
FIG. 45C illustrates a partial side view of a hose that may be attached to a screw-on cap, according to an aspect.

FIG. 45C illustrates a partial side view of a hose 107 that may be attached to a screw-on cap 11, according to an aspect. The hose 107 may allow for both horizontal and vertical product flow.

Figure 45D:
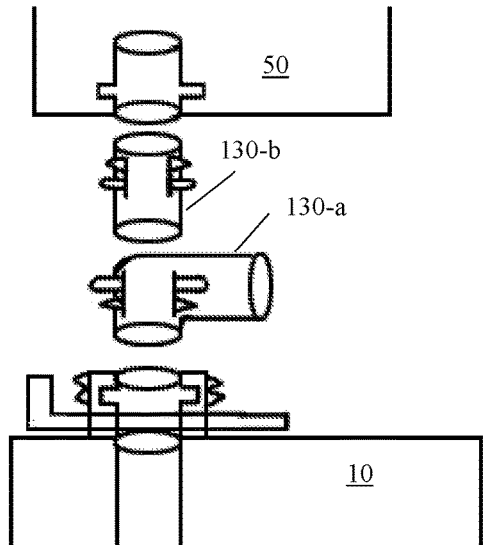
FIG. 45D illustrates a partial side view of an elbow that may be used for connecting a dispenser with a keg, according to an aspect.

FIG. 45D illustrates a partial side view of an elbow 130-*a* that may be used for connecting a dispenser 50 with a keg 10, according to an aspect. A fixed vertical elbow piece 130-*b* may allow for vertical product flow, and a bent elbow 130-*a* may be used for horizontal and vertical product flow between a dispenser 50 and a keg 10. Individual pieces used for connecting a dispenser 50 with a keg 10 may snap together and lock, for example, or may be connected by any other suitable means.

Figure 46A:
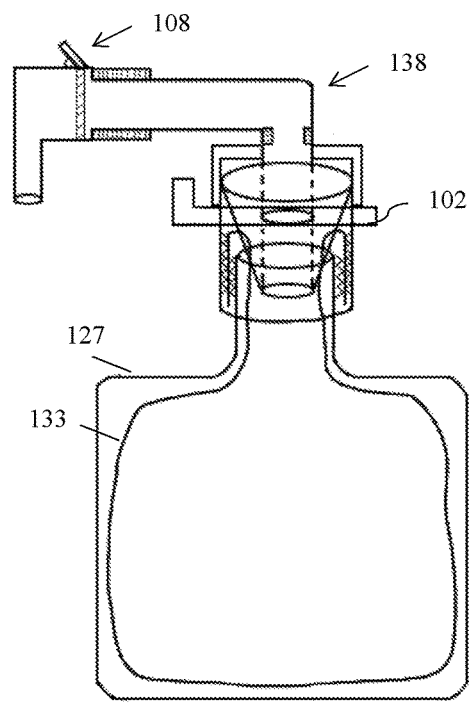
FIG. 46A illustrates a side view of a bottle fitted with a bio-plastic gate valve pour spout with a manually operated nozzle, according to an aspect.

FIG. 46A illustrates a side view of a bottle 127 fitted with a bio-plastic pour spout with a manually operated nozzle 138 having a gate valve 108, according to an aspect. The pour spout may be connected to a bio-plastic or bio-rubber hose 107 which may be connected to a screw on male V-friction coupling which may be received by a corresponding female V-friction coupling. The male coupling may include a petcock valve 102. This gate valve 108 pour spout 138 with gate valve 108 may be used with any keg whether the keg operates by gravity flow or self-propulsion. A keg or water bottle may also use a bio-plastic bladder bag liner ("bladder bag," "bladder bag liner," "balloon bladder," or "bladder liner") 133 inside of the keg or water bottle, to create a self-propulsion system. The keg or bottle using a rubber balloon self-propulsion system may be capable of holding ½ gallon to 10 gallons, for example, and or may be shaped and sized like small bottle and be capable of holding 12 ounces to 24 ounces, for example. The bio-plastic pour spout may be used with any existing bottle or container in standard market packaging.

Figure 46B:
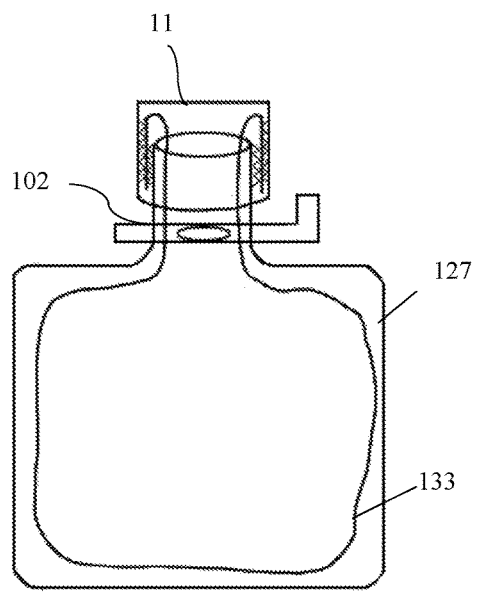
FIG. 46B illustrates a bottle with a bio-plastic screw-on top that may be used with a bottle for storing or shipping, according to an aspect.

FIG. 46B illustrates a bottle 127 with a bio-plastic screw-on top that may be used with a bottle 127 for storing or shipping, according to an aspect. The bottle may include a petcock valve, and may include a rubber balloon bag 133 for self-propulsion.

Figure 46C:
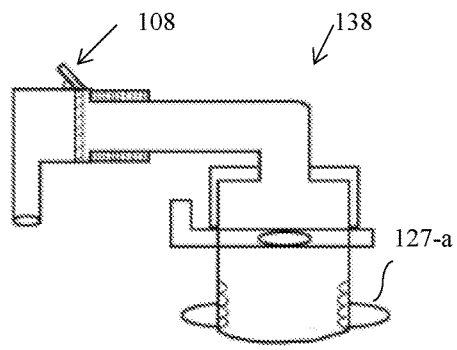
FIG. 46C illustrates a male friction coupling pour spout, which may be V-shaped or cylindrical, having a gate valve, which may include a petcock valve, and finger pull tabs, according to an aspect.

FIG. 46C illustrates an airtight seal such as a male friction coupling pour spout, which may be V-shaped or cylindrical, having a gate valve, which may include a petcock valve 102, and finger pull tabs 127-*a* for pulling over a spout, according to an aspect. The hose may include a bio-plastic ribbed surface, such as, for example, ribbed ridges, to accommodate a tight connection of the hose to the fitting, and may be pulled over another container, such as, for example, the opening and threads of a bottle neck, and may be used, for example, with any existing bottle such as for soda, water, beer, wine, and so on.

Figure 46D:
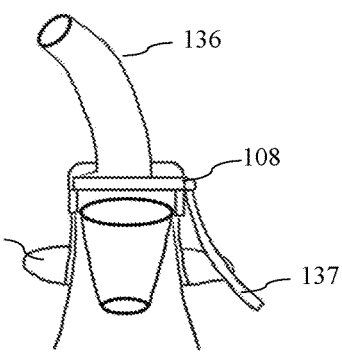
FIG. 46D illustrates an airtight seal bottle cap and pour spout that may be used with any existing bottle, such as, for example, a wine, champagne, or water bottle, according to an aspect.

FIG. 46D illustrates an airtight seal bottle cap and pour spout 136 that may be used with any existing bottle, such as, for example, a wine, champagne, or water bottle, according to an aspect. The bottle cap pour spout 136 may include a gate valve 108 and a lever 137 for manual operation of the spout. The pour spout 136 may also include finger pull tabs 127-*a*.

FIGS. 47A-47C illustrate a side view of a female V-shaped or cylindrical friction coupling adapter 97-*a*, a detailed view, and a side view, respectively, of the adapter 97-*a* inside of a bottle 127, according to an aspect. The female V-shaped or cylindrical friction coupling adapter 97-*a* may accommodate any size beverage container opening, such as, for example, a milk carton, 2 liter soda bottle, juice bottle, and so on. The hard V-shape coupling 15 may have a well tube 22-*a* attached to it, which may be telescopic. The female V-friction coupling 15 funnel may have a rubber boot or stretchable expansion membrane 126 that may stretch over the top of the neck of a container (shown as 127 in FIG. 47C), fitting snugly over the neck and giving a perfect seal. An advantage may be that the existing shape of bottles may not need to be altered and existing bottles may be able to use this coupling. Bottlers may, at the time of packaging, insert the adapter 97-*a* after filling the bottle, or users may insert it after removing a storage cap. This may allow users to use any existing packaging inside of the dispenser, by allowing the male V-friction coupling that is a part of the pump lead or pour spout housing to connect to existing bottles or other packaging via the female V-friction coupling. The adapter 97-*a* may also be a permanent part of bottle packaging. The adapter 97-*a* may, on the expansion membrane 126, include finger pull tabs 127-*a* which may aid in putting the adapter on a bottle, or pulling it off a bottle. An adapter with a stretchable expansion membrane 126 may also be used with, for example, aluminum cans and may assist in the opening of the cans, and the stretchable expansion membrane 126 may be used to keep a beverage airtight. As an example, a carbonated beverage may be covered using an expansion membrane 126 thus reducing the carbonation loss in the beverage.

FIG. 47B illustrates another example of a telescopic well tube of the adapter 97-*a*. The telescoping friction sleeve 22-*a* may slide to extend or retract and may be held in place by side-to-side friction. The telescopic well tube 22-*a* may include friction ridges 22-*b* along the sides, which may be flexible, and may assist in holding the well tube 22-*a* in position at a desired length. The friction ridges 22-*b* may also be used with a friction fin 22-*c*, for example, or may be used without a friction fin. A friction fin 22-*c* may be used as a larger flexible stopper for holding the well tube 22-*a* in place.

FIG. 47C illustrates a standard bottle 127 with its cap removed. The expansion membrane 126 of the adapter 97-*a* may allow any existing container to be adapted to use the V-shaped coupling. An existing bottle 127 may be placed into the dispenser, and the female adapter may be used with the coordinating male V- or cylindrical-shaped friction coupling of the dispenser. Again, the well tube 22-*a* of the adapter 97-*a* may include friction ridges 22-*b* which may assist in holding the well tube at a desired position.

FIG. 47D illustrates a side view of a bottle 127 with a bio-plastic bladder bag liner 133 having an expansion membrane top 126, similar to the adapter 97-*a* of FIG. 47A, such that the opening of the bio-plastic bag liner 133 may be able to stretch over the top of any size container 127, such as a bottle, growler, and so on, according to an aspect. The bio-plastic bag 133 may be thermally protective such that it may withstand temperatures below the freezing point of water and above the boiling point of water. A balloon bladder 133 may be stretched over top of a plastic bottle, with a snap or screw on cap placed on top, with a bio-rubber nipple in the top. The balloon bladder 133 may be used with, for example, a baby bottle, which may also be used with a double cap, having a top cap and a bottom cap. The bottom cap may have a female V-friction coupling, and the top cap may have a male V-friction coupling that may go into the female V-friction coupling when the top cap is screwed or snapped on over the bottom cap. The female cap may have friction tabs, which may be nipples that the balloon bladder top opening can stretch over. The nipple may create a friction hold and air barrier. The friction nipples may be around the bottom and sides of the coupling. A removable baby bottle nipple may go onto the top cap. A rubber flange may stop the nipple from pulling off into the baby's mouth, which may prevent choking.

FIG. 47E illustrates the side view of the bottle 127 with a bio-plastic bladder bag liner 133 having an expansion membrane top 126 of FIG. 47D, also having a storage unit 155 for holding extra bladder bag liners 133, according to an aspect. The storage unit 155 may be screwed on to the bottle 127 by threads 166 or attached by any other suitable means, and may hold extra bladder bag liners 133 such that the user may be able to keep extras with the container or bottle 127 and may not need to search for them.

It should be understood that any container that may use a bio-plastic bladder bag or rubber balloon bladder may also include a magazine or holder for spare bags, which may be attached to the container by any suitable means. The user may store extra bags in this magazine or holder, such that they can easily find replacement bags.

Figure 48A:
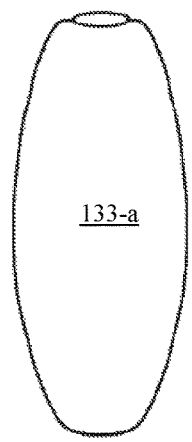
FIGS. 48A-48C illustrate a bladder liner in various states of being stretched, which may be used inside of a water bottle, according to an aspect.
Figure 48B:
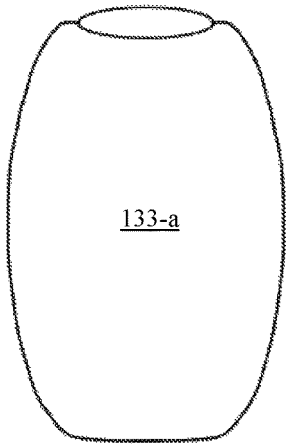
Figure 48C:
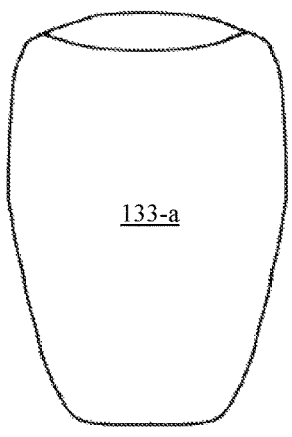

FIGS. 48A-48C illustrate a bladder liner in various states of being stretched, which may be used inside of a water bottle or keg of any size such as ½ gallon to 10 gallons, according to an aspect. Personal water bottles having a narrow neck may be difficult to clean. An advantage of a bladder liner 133-a may be that the liner may be disposable, such that water scum or bacteria does not accumulate inside of the bottle. The balloon liner may be made of bio-plastic material, and may be stretched over the top of the container. The flexibility may allow one type of liner to be used for a variety of sizes of containers or bottles and may also allow for self-propulsion in personal bottles. The balloon liner may also expand when being filled with a beverage, such that the elasticity of the liner may help to self-propel a beverage out when a user takes a drink. As an example, the self-propelling may be used for individuals with mobility issues, or athletes in competitive situations who are not able to tilt their head back to drink.

Figure 48D:
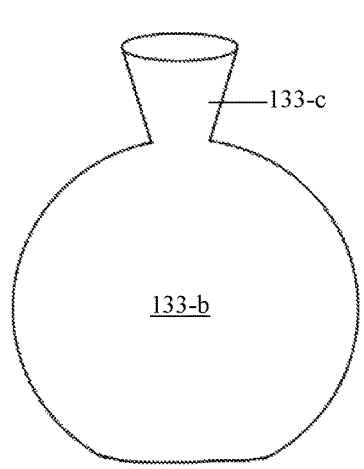
FIGS. 48D-48E illustrate side views of examples of a bladder liner having a V-shaped neck, according to an aspect.
Figure 48E:
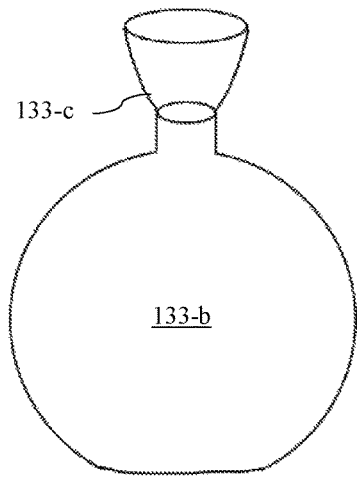

FIGS. 48D-48E illustrate side views of examples of a bladder liner 133-b having a V-shaped neck 133-c, according to an aspect. The V-shaped neck 133-c may aid in fitting the bladder liner or rubber balloon into any type of container for allowing the container to self-propel its contents.

Figure 48F:
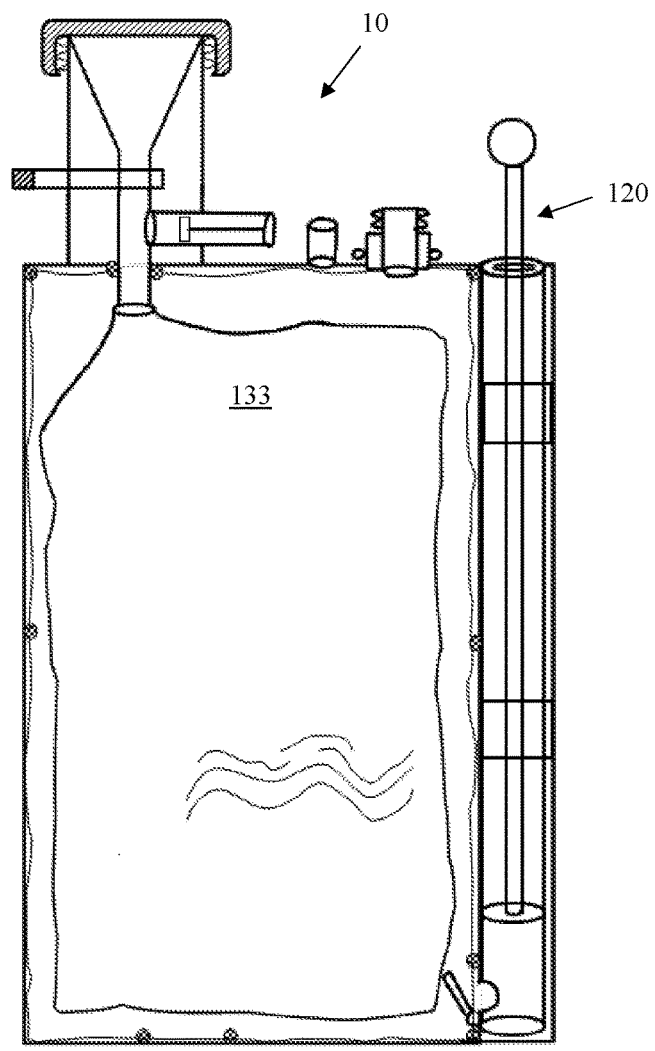
FIG. 48F illustrates a keg having an air pump and rubber balloon bladder, according to an aspect.

FIG. 48F illustrates a keg 10 having an air pump 120 and rubber balloon bladder 133, according to an aspect. The air pump 120 may be used to pump air into the space within the keg to propel liquid or food out of the flexible bladder 133. It should be understood that any keg may be constructed to be able to use a balloon bladder 103 to hold liquid or food, such that the balloon bladder 133 may be replaceable with a new bladder at any time.

FIGS. 49A-49B illustrate side views of a cylindrical friction coupling, having a male coupling 215-a and female coupling 215 in a coupled state and uncoupled state, respectively, that may be used with a keg, according to an aspect. In order to assist in an airtight seal, the male cylindrical coupling 215-a may be inserted into the female cylindrical coupling 215 and also may slide into a channel sleeve 167 that is deeper inside of the female cylindrical coupling 215. The channel sleeve 167 may be even with the leading edge of the female cylindrical coupling 215. An advantage may be that the cylindrical coupling may be more adaptive to the operation of the petcock valve and auger shaft, which may allow for better control of soft serve food, for example. The coupling may also be a rounded bull nose type coupling, as shown by 215-b, which may be in a U-shape, for better airtightness.

The cylindrical coupling may include metal plates where a metal-to-metal seal may take place, between a stainless steel male cylindrical coupling and a female stainless steel cylindrical coupling. The components may also be constructed from polymer plastic materials, for example, and may have flexible semi-plastic rubber seals where the male and female components meet.

Figure 49C:
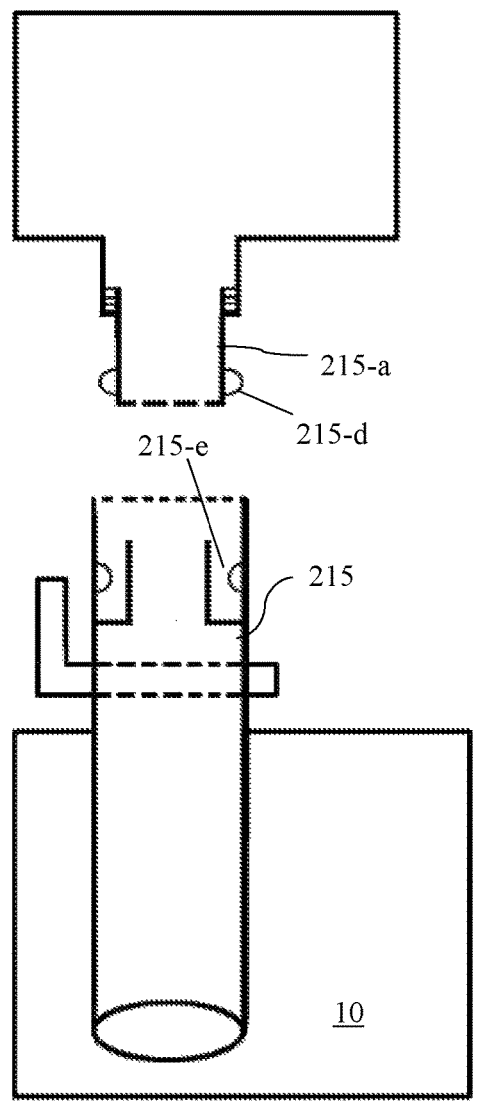
FIG. 49C illustrates a side view of another example of cylindrical friction coupling in an uncoupled state that may be used with a keg, according to an aspect.

FIG. 49C illustrates a side view of another example of cylindrical friction coupling with a female friction coupling 215 and a corresponding male friction coupling 215-a in an uncoupled state that may be used with a keg 10, according to an aspect. The coupling may for example snap and lock into place into a receiving channel. Snap pins 215-d may fit into snap pin cavities 215-e. Flexible rubber washers which may be constructed from rubber, for example, may be placed at the top of the channel to create an airtight barrier. Pins may also be used or a sleeve in the channel to create airtightness.

Figure 49D:
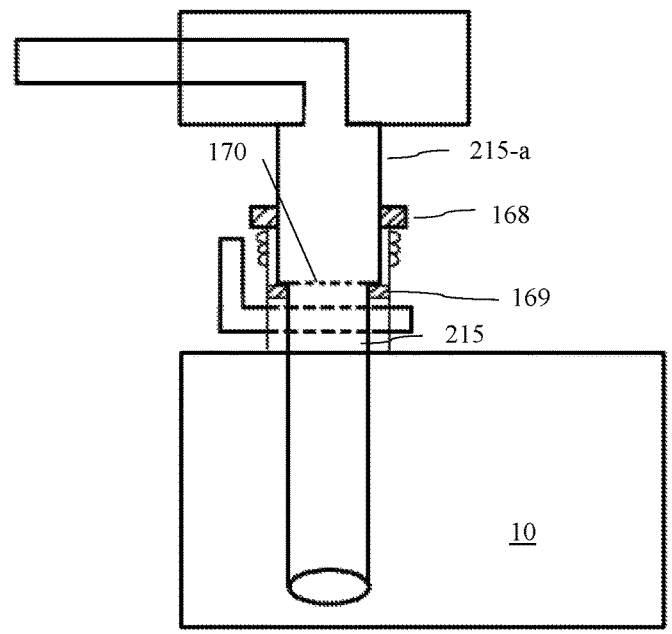
FIG. 49D illustrates a cylindrical coupling having a female friction coupling and a corresponding male friction coupling, with friction plates that may be used with a keg, according to an aspect.

FIG. 49D illustrates a cylindrical coupling having a female friction coupling 215 and a corresponding male friction coupling 215-a, with friction plates 170 that may be used with a keg 10, according to an aspect. With the use of the friction plates 170, the male coupling may not need to go into the female coupling, and instead, a seal may be provided by weight and friction. As another example, instead of a seal taking place with the sides of the male and female couplings, the airtight seal may be caused by a side shaft gasket plate on the male coupling and a bottom rubber seal or gasket at the end of the male coupling adjacent to a female flat plate. The friction plates 170 may be sandwiched between other elements in order to ensure a tighter seal, such as, for example, a gasket 169, a rubber seal 168, or any other suitable means for an airtight seal. The two friction plates 170 may be pressed together by weight, and the gasket 169 and rubber seal 168 may be flexible. The presence of the friction plates 170 may also allow for the channel of the female coupling 215 to be smaller.

Figure 49E:
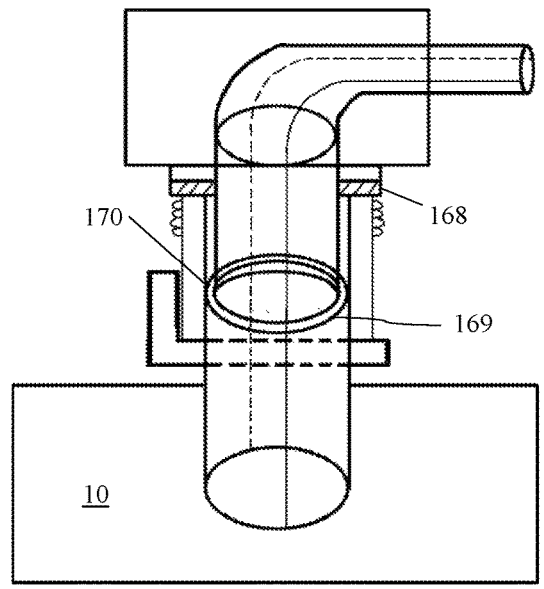
FIG. 49E illustrates a detailed view of the cylindrical coupling of FIG. 49D showing friction plates with a gasket, according to an aspect.

FIG. 49E illustrates a detailed view of the cylindrical coupling of FIG. 49D showing friction plates with a gasket 169, according to an aspect. The gasket 169 may allow for a tighter seal of the coupling. The bottom seal created by the friction plate 170 is also shown, and the rubber seal 168 at the top of the channel.

Figure 49F:
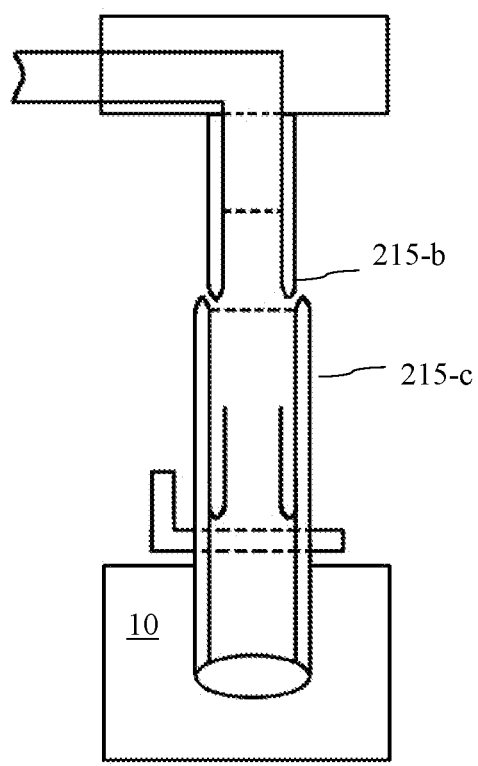
FIG. 49F illustrates a detailed view of the cylindrical coupling of FIGS. 49A-49B having a female bull nose or dolphin nose coupling and a corresponding male bull nose or dolphin nose coupling.

FIG. 49F illustrates a detailed view of the cylindrical coupling of FIGS. 49A-49B having a female bull nose or dolphin nose coupling 215-c and a corresponding male bull nose or dolphin nose coupling 215-b. The bull nose or dolphin nose shape may allow for better guiding of the male friction coupling 215-b while entering the female bull nose or dolphin nose friction coupling 215-c. The rounded U-shape of the bull nose or dolphin nose may have more surface area at the point than a V-shaped point, which may allow for a better and tighter seal. The better and tighter seal by a bull nose or dolphin nose may also prevent liquids from spilling out around the point of contact. An advantage may be that the airtightness may extend the shelf life of liquids or foods contained within the keg. Another advantage may be that a bull nose type coupling is universal and may be used with many different types of kegs or containers, and may allow the user of an auger conveyer within the container for a more even flow of the liquid or food inside.

Figure 50:
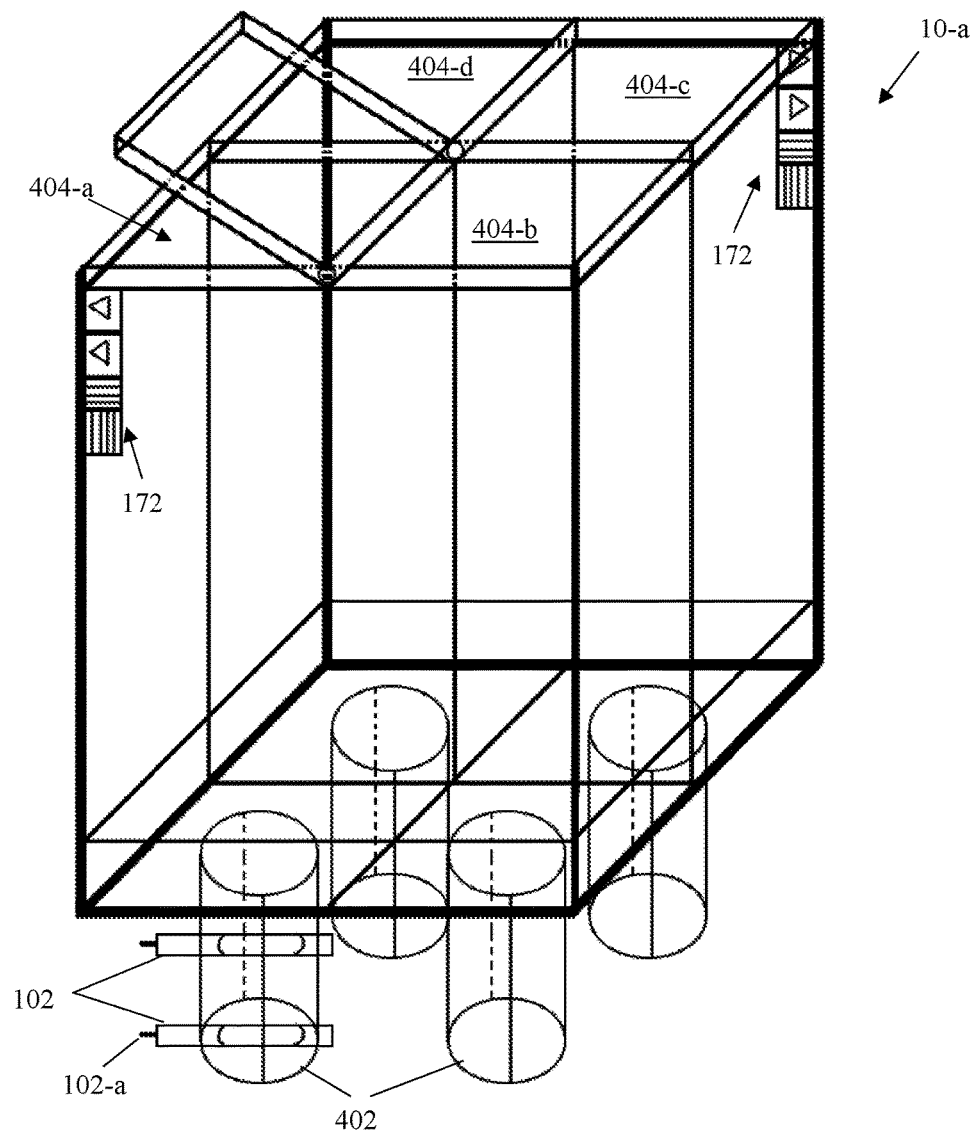
FIG. 50 illustrates a multi-use keg that may include multiple pods, according to an aspect.

FIG. 50 illustrates a multi-use keg 10-*a* that may include multiple pods ("pods" or "chambers") 404-*a*-404-*d*, according to an aspect. As shown as an example, one multi-use keg 10-*a* may, as an example, include four pods 404-*a*-404-*d*. A pod 404-*a* may include a chamber 402 having a petcock gate valve 102 (shown only in pod 404-*a* for visual clarity), and may include two petcock valves 102, which may be automatically opened by, for example, a stepper motor and may regulate flow of the keg contents. The gate valve may allow added flavor ingredients to flow from the main reservoir of the keg 10-*a* into a second reservoir chamber for mixing, which may be, as an example ½ ounce to 2 ounces in capacity. The gate valve may include a fin 102-*a*, which may jut out as a plate, and may be at a 90 degree angle to the gate valve 102, and may perform the action of a handle at the end of the petcock valve.

Each pod 404-*a*-404-*d* may also include an auger to assist in keeping product thoroughly mixed, as shown in FIG. 35C. An auger may be omitted for liquids, or may be included when using a keg 10-*a* for thicker foods.

The keg 10-*a* may include a lift lid that may be secured or opened with any suitable means, such as, for example, a hinge with a push button locking latch, for opening a pod 404-*a* and inserting a beverage or food to be dispensed.

The keg 10-*a* may include at least a scanner 172 for reading bar codes, QR codes, radio-frequency identification (RFID) near field communication (NFC), and any other similar machine-readable data. The scanner 172 may therefore be able to read information about the contents of each chamber 404-*a*, such as, for example, ingredients, the amount of sugar, recipes including the contents of the chamber, volume of each ingredient, and so on.

It should be understood that any of the materials used for constructing the keg may be biodegradable, such as, for example, bio-plastic that may be recycled by single-stream recycling processes.

It should be understood that a friction coupling in any of the above examples may be V-shaped or cylindrical, the male and female couplings corresponding with one another.

It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. An adapter system for an airtight connection of an adapter to a container, the adapter being configured for airtight filling and dispensing of contents of the container to and from the container, the adapter comprising: a gate valve, a tube extending from the gate valve to a female coupling, the female coupling being configured for insertion in a mouth of the container by having a top end and a bottom end, wherein the bottom end is narrower than the top end, wherein the gate valve is configured to be in an opened state to allow the airtight filling and dispensing, or to be in a closed state, wherein the airtight connection is formed when the gate valve is in the closed state, such that air is prevented from entering the container, and the adapter further comprising an airtight connector element for connecting the adapter to the container, the airtight connector element being associated with the female coupling.

2. The adapter system of claim 1 wherein the airtight connector element is a stretchable membrane having tabs for a user to grasp, the stretchable membrane being configured to stretch onto a neck of the container.

3. The adapter system of claim 1, further comprising a storage unit, the storage unit being capable of being removably associated with the container, the storage unit being configured to hold a supply of stretchable membranes.

4. The adapter system of claim 1, further comprising a telescopic well tube extending from the bottom end of the female coupling, the telescopic well tube being configured to be inserted into the container.

* * * * *